(12) United States Patent
Shigematsu et al.

(10) Patent No.: US 11,637,349 B2
(45) Date of Patent: *Apr. 25, 2023

(54) SUBSTRATE FOR LITHIUM ION BATTERY SEPARATORS AND LITHIUM ION BATTERY SEPARATOR

(71) Applicant: MITSUBISHI PAPER MILLS LIMITED, Tokyo (JP)

(72) Inventors: Toshihiro Shigematsu, Tokyo (JP); Tomohiro Sato, Tokyo (JP); Makoto Kato, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 961 days.

This patent is subject to a terminal disclaimer.

(21) Appl. No.: 16/323,334

(22) PCT Filed: Sep. 1, 2017

(86) PCT No.: PCT/JP2017/031631
§ 371 (c)(1),
(2) Date: Feb. 5, 2019

(87) PCT Pub. No.: WO2018/047742
PCT Pub. Date: Mar. 15, 2018

(65) Prior Publication Data
US 2021/0288382 A1    Sep. 16, 2021

(30) Foreign Application Priority Data

Sep. 8, 2016 (JP) .............................. JP2016-175507
Nov. 10, 2016 (JP) .............................. JP2016-219342
(Continued)

(51) Int. Cl.
*H01M 50/44* (2021.01)
*H01M 50/423* (2021.01)
(Continued)

(52) U.S. Cl.
CPC ......... *H01M 50/44* (2021.01); *H01M 50/423* (2021.01); *H01M 50/451* (2021.01); *H01M 50/454* (2021.01)

(58) Field of Classification Search
CPC .. H01M 50/423; H01M 50/44; H01M 50/451; H01G 9/02
(Continued)

(56) References Cited

U.S. PATENT DOCUMENTS

2007/0264577 A1    11/2007    Katayama et al.
2007/0287062 A1    12/2007    Tsukuda et al.
(Continued)

FOREIGN PATENT DOCUMENTS

JP    2005-293891    10/2005
JP    2006-176932    7/2006
(Continued)

OTHER PUBLICATIONS

English translation of WO 2007061108 (Year: 2007).*
(Continued)

*Primary Examiner* — Bethany L Martin
*Assistant Examiner* — Kourtney R S Carlson
(74) *Attorney, Agent, or Firm* — Wenderoth, Lind & Ponack, L.L.P.

(57) ABSTRACT

It is an object of the present invention to provide a substrate for lithium ion battery separators which has high adhesion to an inorganic particle layer, can be made thin and is excellent in tensile strength and cuttability and a lithium ion battery separator including the substrate for lithium ion battery separators. The substrate for lithium ion battery separators which contains heat-resistant fibers and synthetic resin short fibers contains fibrillated heat-resistant fibers having a modified freeness of not more than 300 ml as the heat-resistant fibers and has a content of the fibrillated heat-resistant fibers
(Continued)

having a modified freeness of not more than 300 ml of not less than 1.0 mass % to less than 5.0 mass % based on the total of all the fiber components contained in the substrate. The modified freeness is a value measured in accordance with JIS P8121-2:2012 except that an 80-mesh wire net having a wire diameter of 0.14 mm and an opening of 0.18 mm is used as a screening plate and the concentration of a sample is 0.1%.

3 Claims, 7 Drawing Sheets

(30) Foreign Application Priority Data

| Nov. 10, 2016 | (JP) | ............................. JP2016-219343 |
| Nov. 17, 2016 | (JP) | ............................. JP2016-223928 |
| Jun. 29, 2017 | (JP) | ............................. JP2017-127170 |
| Jul. 19, 2017 | (JP) | ............................. JP2017-139776 |

(51) Int. Cl.
*H01M 50/451* (2021.01)
*H01M 50/454* (2021.01)

(58) Field of Classification Search
USPC .......................................................... 429/123
See application file for complete search history.

(56) References Cited

U.S. PATENT DOCUMENTS

| 2009/0067119 A1 | 3/2009 | Katayama et al. | |
| 2009/0280308 A1* | 11/2009 | Tsukuda | ................. H01G 11/52 |
| | | | 428/338 |
| 2012/0251890 A1 | 10/2012 | Pascaly et al. | |
| 2015/0024250 A1* | 1/2015 | Kaji | ....................... D21H 25/04 |
| | | | 429/144 |
| 2017/0294637 A1 | 10/2017 | Sato et al. | |

FOREIGN PATENT DOCUMENTS

| JP | 2006-188770 | 7/2006 | | |
| JP | 2007-157723 | 6/2007 | | |
| JP | 2012-003873 | 1/2012 | | |
| JP | 2012-134024 | 7/2012 | | |
| JP | 2012-155941 | 8/2012 | | |
| JP | 2012-188774 | 10/2012 | | |
| JP | 2013-501082 | 1/2013 | | |
| JP | 2013-179034 | 9/2013 | | |
| JP | 2015-050043 | 3/2015 | | |
| WO | 2005/101432 | 10/2005 | | |
| WO | 2007/061108 | 5/2007 | | |
| WO | WO-2010038486 A1 * | 4/2010 | ............... B32B 5/26 |
| WO | 2011/046066 | 4/2011 | | |
| WO | 2016/043142 | 3/2016 | | |

OTHER PUBLICATIONS

English translation of WO 2011/046066. (Year: 2011).*
International Search Report dated Nov. 21, 2017 in International (PCT) Application No. PCT/JP2017/031631 with English translation.
International Preliminary Report on Patentability dated Mar. 12, 2019 in International (PCT) Application No. PCT/JP2017/031631.
Partial Supplementary European Search Report dated Feb. 7, 2020 in corresponding European Patent Application No. 17848682.5.
Extended European Search Report dated Mar. 27, 2020 in corresponding European Patent Application No. 17848682.5.

* cited by examiner

[Fig.1]
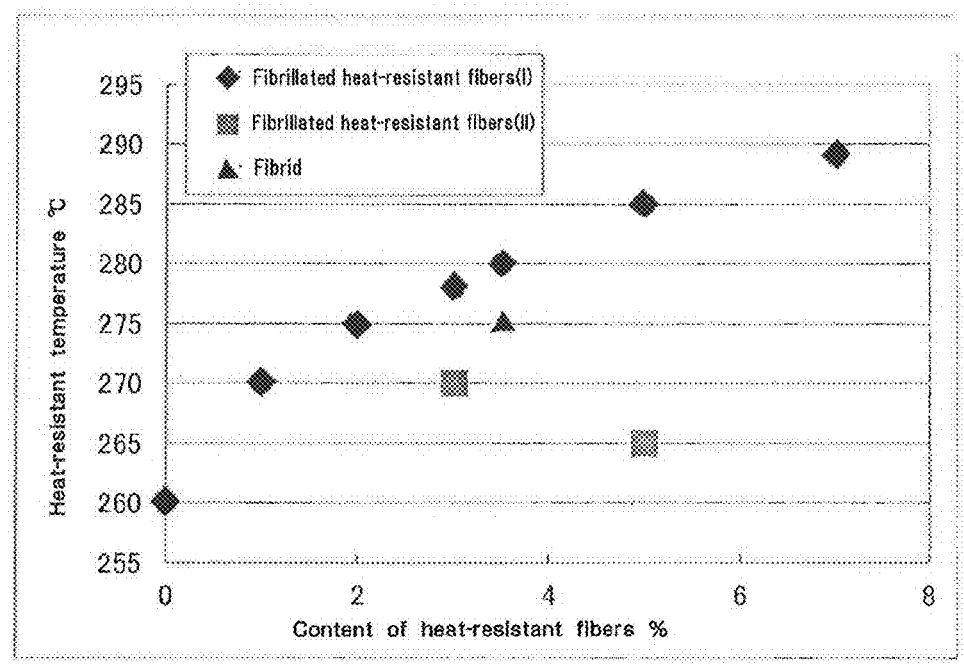
[Fig.2]
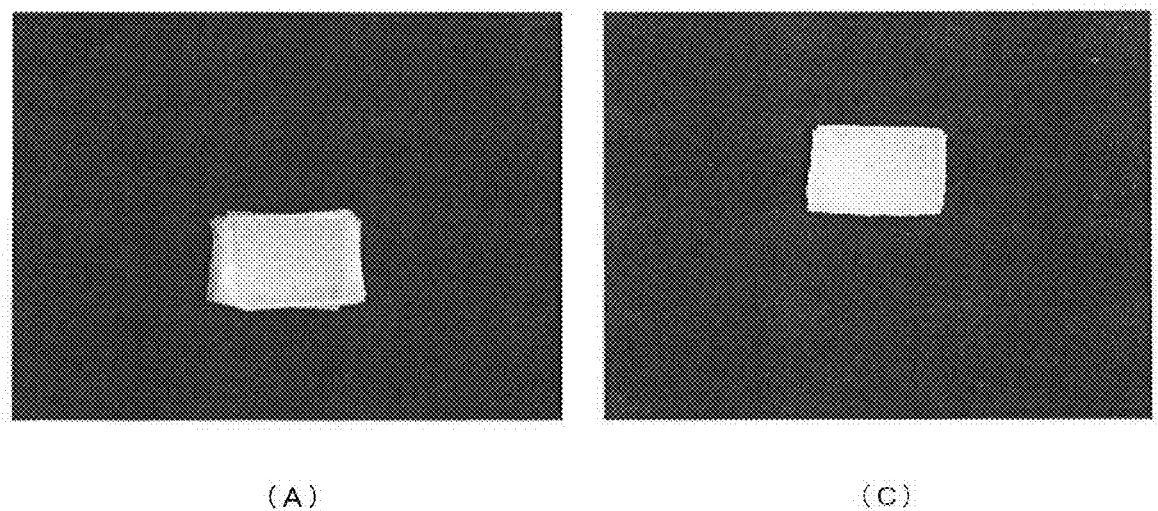
(A)  (C)

[Fig.3]
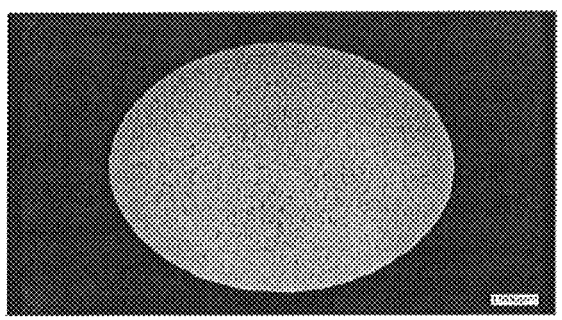
(A)
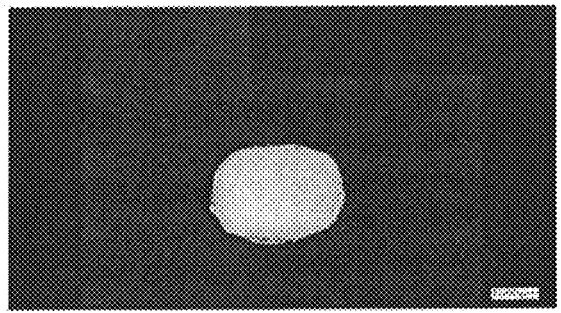
(B)
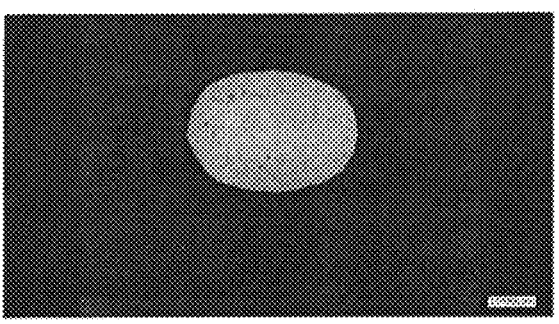
(C)
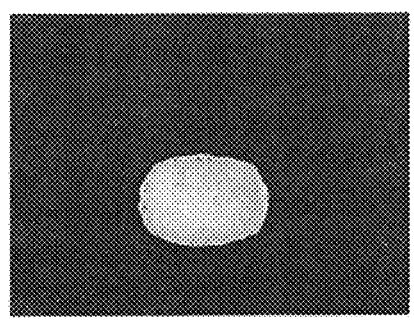
(D)

[Fig.4]
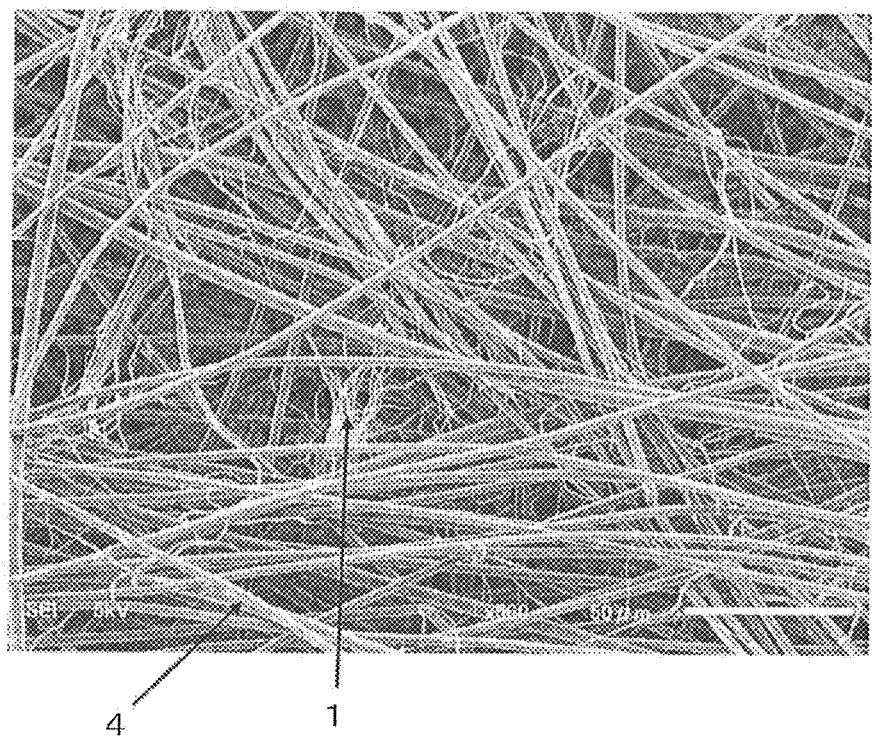

[Fig.5]
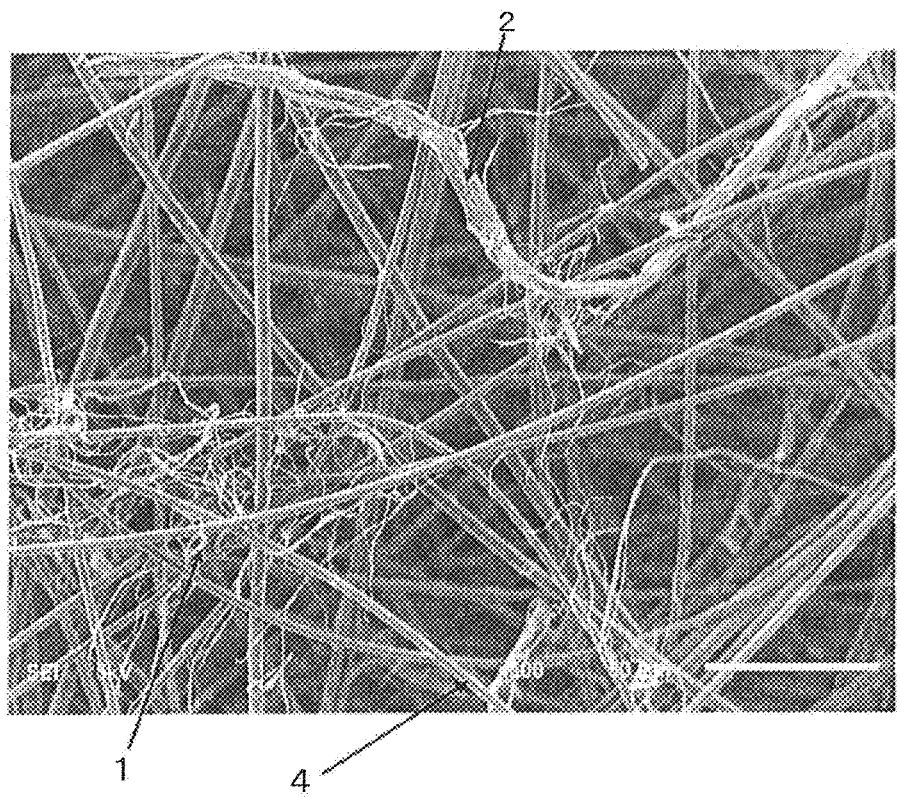

[Fig.6]
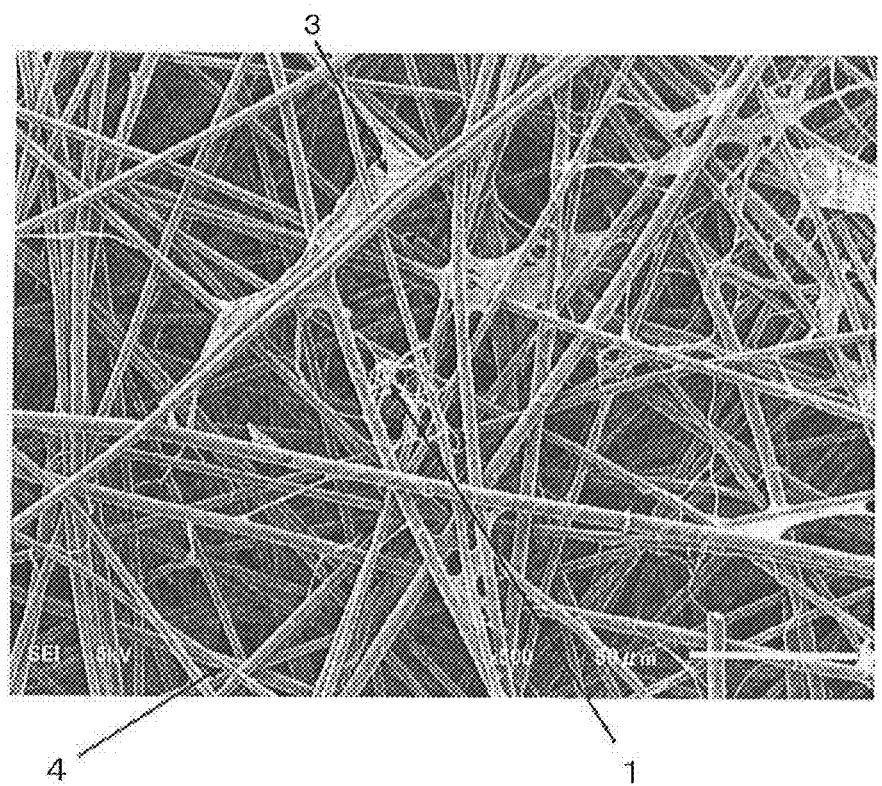

[Fig.7]
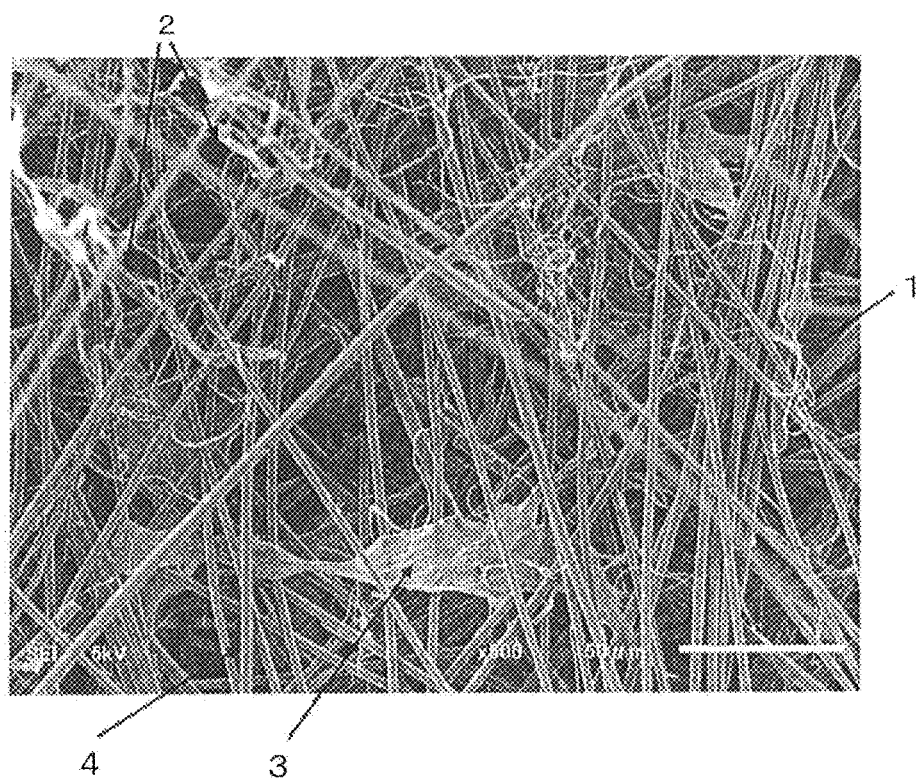

[Fig.8]
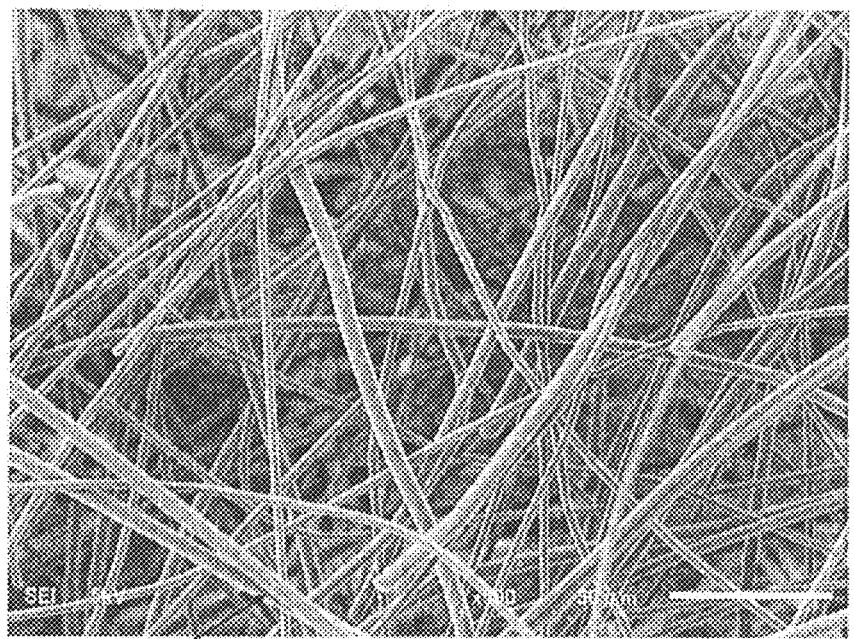
4

SUBSTRATE FOR LITHIUM ION BATTERY SEPARATORS AND LITHIUM ION BATTERY SEPARATOR

TECHNICAL FIELD

The present invention relates to a substrate for lithium ion battery separators and a lithium ion battery separator. The term "substrate for lithium ion battery separators" may be simply referred to as "substrate". The term "lithium ion battery separator" may be simply referred to as "separator".

BACKGROUND ART

The use of a lithium ion battery is now expanding to electric automobiles in addition to portable equipment in the past. In the field of electric automobiles, as compared with portable equipment, a large-sized lithium ion battery is employed.

As the lithium ion battery separator, a porous film made of a polyolefin such as polyethylene or polypropylene is often used. The porous film made of a polyolefin has a heat fuse function (shut-down function) that it melts and closes pores to prevent the movement of a lithium ion and shut down a current when the inside temperature of a battery rises up to 130° C. However, when the temperature further rises in some situation, the polyolefin has possibility that it itself melts to cause a short circuit, resulting in a thermal runaway. When a thermal runaway occurs in a large-sized lithium ion battery, damage caused thereby becomes enormous. Then, a heat-resistant separator for preventing this thermal runaway is attracting attention.

As the heat-resistant separator, there are disclosed a separator including a polyester nonwoven fabric and a porous film made of an organic polymer which swells with an electrolytic solution (refer to Patent Document 1) and a separator for electrochemical devices composed of a porous film containing at least one of a resin having a melting point of 80 to 130° C. and a resin absorbing an electrolytic solution by heating to swell, a porous substrate which is a nonwoven fabric and filler particles (inorganic particles) (refer to Patent Document 2). Each of these separators includes a substrate which is a nonwoven fabric, a porous film made of an organic polymer and a porous film containing inorganic particles (inorganic particle layer), and the porous films are formed on the substrate by coating.

As the separator including a substrate which is a nonwoven fabric and porous films, there is proposed a separator whose heat resistance is further enhanced by a substrate containing heat-resistant fibers such as aromatic polyamide ((poly)aramid), aromatic polyester, polyamide-imide or polyimide fibers. For example, there is disclosed a substrate which is a wet nonwoven fabric containing fibrillated heat-resistant fibers and synthetic short fibers as essential components, in which the preferred mass ratio of the fibrillated heat-resistant fibers to the synthetic short fibers is 7:1 to 1:19 (refer to Patent Document 3) or a substrate which has polyaramid fibers, is bonded to fibers made of at least one polymer and has a preferred mixing ratio of (the polyaramid fibers to the other polymer fibers) of 10:1 to 1:10 (refer to Patent Document 4).

There are also disclosed a substrate which is a nonwoven fabric containing synthetic resin short fibers and fibrillated lyocell fibers as essential fibers and further containing fibrillated heat-resistant fibers in an amount of preferably 5 to 60 mass % (refer to Patent Document 5) and a substrate which is a nonwoven fabric containing not less than 30 mass % of oriented crystallized polyester-based fibers and preferably further containing fibrillated heat-resistant fibers in an amount of preferably 5 to 60 mass % based on the total of all the fibers (refer to Patent Document 6).

In the substrates disclosed by Patent Documents 3 to 6, the lower limit of the preferred content of the heat-resistant fibers is 5 mass %. That is, it is disclosed that a substrate having a heat-resistant fiber content of not less than 5 mass % is preferred. However, since the heat-resistant fibers are mostly rigid, when the content thereof is not less than 5 mass %, the substrate is hardly smashed and it is difficult to reduce the thickness of the substrate. When the substrate is smashed by applying heat or a load, the resistance of the separator becomes high, when the substrate is cut to a predetermined width to be used in a separator, it is difficult to cut the substrate in the slitting step, and it is also difficult to cut by welding in the step of laminating an electrode. Further, as bonding force between the heat-resistant fibers and bonding force between the heat-resistant fiber and another fiber are low, when the content of the heat-resistant fibers is not less than 5 mass %, the tensile strength of the substrate becomes low and therefore, special care must be paid in the coating operation.

Patent Document 3 discloses a substrate which contains fibrillated heat-resistant fibers as an essential component to solve problems such as the deterioration of electrolytic solution retainability and a rise in the internal resistance of the separator which are caused by closing pores in the substrate with inorganic particles filled in the nonwoven fabric. In Examples, a substrate having a content of the fibrillated heat-resistant fibers of 20 to 60 mass % is manufactured. However, a substrate having a high content of the fibrillated heat-resistant fibers may have a problem that adhesion between the substrate and the inorganic particle layer deteriorates since inorganic particles are accumulated mainly on the surface of the substrate.

As the substrate on which the inorganic particle layer is to be formed, there is disclosed a substrate which contains polyethylene terephthalate (PET) fibers and achieves excellent coatability and post-processability by setting X-ray diffraction intensity derived from the PET fibers to a specific range (refer to Patent Document 7). Patent Document 7 teaches that fibers other than the PET fibers can be contained and the content ratio of the PET fibers and fibers other than the PET fibers is preferably 100:0 to 70:30 in terms of mass. A substrate containing 20 mass % of aramid fibers having a freeness of 300 ml is disclosed in Examples. However, Patent Document 7 merely teaches that "fibers other than the PET fibers can be contained as long as quality and productivity are not impaired" and does not take into consideration an effect obtained by b ending the fibers other than the PET fibers.

PRIOR ART DOCUMENTS

Patent Documents

Patent Document 1: JP-A 2005-293891
Patent Document 2: JP-A 2007-157723
Patent Document 3: JP-A 2012-3873
Patent Document 4: JP-A 2013-501082
Patent Document 5: WO2011/046066
Patent Document 6: JP-A 2012-134024
Patent Document 7: JP-A 2013-179034

DISCLOSURE OF THE INVENTION

Problem to be Solved by the Invention

It is an object of the present invention to provide a substrate for lithium ion battery separators which has high adhesion to an inorganic particle layer, can be made thin and is excellent in tensile strength and cuttability and a lithium ion battery separator including the substrate for lithium ion battery separators.

Means for Solving the Problem

The inventors of the present invention conducted intensive studies to solve the above problem and made the following invention.

(1-1) A substrate for lithium ion battery separators which comprises heat-resistant fibers and synthetic resin short fibers, wherein the substrate comprises fibrillated heat-resistant fibers having a modified freeness of not more than 300 ml as the heat-resistance fibers, and the content of the fibrillated heat-resistant fibers having a modified freeness of not more than 300 ml is not less than 1.0 mass % to less than 5.0 mass % based on the total of all the fiber components contained in the substrate.

(1-2) The substrate for lithium ion battery separators in the above paragraph (1-1), wherein the content of the synthetic resin short fibers is 90.0 to 99.0 mass % based on the total of all the fiber components contained in the substrate.

(1-3) The substrate for lithium ion battery separators in the above paragraph (1-1), wherein the content of the synthetic resin short fibers is more than 95.0 mass % to not more than 99.0 mass % based on the total of all the fiber components contained in the substrate.

(2-1) A substrate for lithium ion battery separators which comprises heat-resistant fibers and synthetic resin short fibers, wherein the substrate comprises fibrillated heat-resistant fibers having a modified freeness of not more than 300 ml and fibrillated heat-resistant fibers having a modified freeness of more than 300 ml as the heat-resistant fibers.

(2-2) The substrate for lithium ion battery separators in the above paragraph (2-1), wherein the total content of the fibrillated heat-resistant fibers having a modified freeness of not more than 300 ml and the fibrillated heat-resistance fibers having a modified freeness of more than 300 ml is not less than 2.0 mass % to less than 9.0 mass % based on the total of all the fiber components contained in the substrate.

(2-3) The substrate for lithium ion battery separators in the above paragraph (2-2), wherein the content of the fibrillated heat-resistant fibers having a modified freeness of not more than 300 ml is not less than 1.0 mass % to less than 5.0 mass % and the content of the fibrillated heat-resistant fibers having a modified freeness of more than 300 ml is not less than 1.0 mass % to less than 4.0 mass % based on the total of all the fiber components contained in the substrate.

(2-4) The substrate for lithium ion battery separators in the above paragraph (2-2) or (2-3), wherein the content of the synthetic resin short fibers is 90.0 to 98.0 mass % based on the total of all the fiber components contained in the substrate.

(3-1) A substrate for lithium ion battery separators which comprises heat-resistant fibers and synthetic resin short fibers, wherein the substrate comprises fibrillated heat-resistant fibers having a modified freeness of not more than 300 ml and fibrid made of para-aromatic polyamide having a modified freeness of not more than 300 ml as the heat-resistant fibers, and the content of the heat-resistant fibers is not less than 1.0 mass % to less than 5.0 mass % based on the total of all the fiber components contained in the substrate.

(3-2) The substrate for lithium ion battery separators in the above paragraph (3-1), wherein the content of the synthetic resin short fibers is 90.0 to 99.0 mass % based on the total of all the fiber components contained in the substrate.

(3-3) The substrate for lithium ion battery separators in the above paragraph (3-1), wherein the content of the synthetic resin short fibers is more than 95.0 mass % to not more than 99.0 mass % based on the total of all the fiber components contained in the substrate.

(4-1) A substrate for lithium ion battery separators which comprises heat-resistant fibers and synthetic resin short fibers, wherein the substrate contains fibrillated heat-resistant fibers having a modified freeness of not more than 300 ml, fibrid made of para-aromatic polyamide having a modified freeness of not more than 300 ml, and fibrillated heat-resistant fibers having a modified freeness of more than 300 ml as the heat-resistant fibers, and the total content of the heat-resistant fibers is not less than 2.0 mass % to less than 9.0 mass % based on the total of all the fiber components contained in the substrate.

(4-2) The substrate for lithium ion battery separators in the above paragraph (4-1), wherein the content of the fibrillated heat-resistant fibers having a modified freeness of not more than 300 ml is not less than 0.6 mass % to less than 4.6 mass %, the content of the fibrid made of para-aromatic polyamide having a modified freeness of not more than 300 ml is not less than 0.4 mass % to less than 2.5 mass %, and the content of the fibrillated heat-resistant fibers having a modified freeness of more than 300 ml is not less than 1.0 mass % to less than 4.0 mass % based on the total of all the fiber components contained in the substrate.

(4-3) The substrate for lithium ion battery separators in the above paragraph (4-1) or (4-2), wherein the content of the synthetic resin short fibers is 90.0 to 98.0 mass % based on the total of all the fiber components contained in the substrate.

(5-1) A lithium ion battery separator which is a combination of at least one composite selected from the group consisting of an inorganic particle layer containing inorganic particles, organic particle layer containing organic particles, porous film, microfiber layer, solid electrolyte and gel-like electrolyte and the substrate for lithium ion battery separators in any one of the above paragraphs (1-1) to (1-3), (2-1) to (2-4), (3-1) to (3-3) and (4-1) to (4-3).

(5-2) The lithium ion battery separator in the above paragraph (5-1), wherein the composite is an inorganic particle layer.

(5-3) The lithium ion battery separator in the above paragraph (5-1) or (5-2), wherein the inorganic particles are at least one type of inorganic particles selected from the group consisting of alumina, alumina hydrate and magnesium compound.

(5-4) The lithium ion battery separator in the above paragraph (5-2) which is constituted such that an inorganic particle layer A containing magnesium hydroxide having an average particle diameter of 2.0 to 4.0 μm and an inorganic particle layer B containing magnesium hydroxide having an average particle diameter of not less than 0.5 μm to less than 2.0 μm are formed on one side of the substrate in the mentioned order.

(5-5) The lithium ion battery separator in the above paragraph (5-2) having an inorganic particle layer A containing magnesium hydroxide having an average particle diameter of 2.0 to 4.0 μm on one side of the substrate and an inorganic particle layer B containing magnesium hydroxide having an average particle diameter of not less than 0.5 μm to less than 2.0 μm on the other side.

(5-6) The lithium ion battery separator in the above paragraph (5-4) or (5-5), wherein the coating weight of the inorganic particle layer A is lower than the coating weight of the inorganic particle layer B.

The term "modified freeness" is "a value measured in accordance with JIS P8121-2:2012 except that an 80-mesh wire net having a wire diameter of 0.14 mm and an opening of 0.18 mm is used as a screening plate and the concentration of a sample is 0.1%".

Effect of the Invention

The substrate for lithium ion battery separators of the present invention can be made thin and is excellent in tensile strength and cuttability. The lithium ion battery separator of the present invention which has the substrate for lithium ion battery separators of the present invention and an inorganic particle layer can attain an effect that adhesion between the substrate and the inorganic particle layer is high.

BRIEF DESCRIPTION OF THE DRAWINGS

FIG. 1 is a graph showing the relationship between the content of heat-resistant fibers and the heat-resistant temperature of a substrate.

FIG. 2 is an optical photomicrograph showing the thermal fluidity of the substrate.

FIG. 3 is an optical photomicrograph showing the thermal fluidity of the substrate.

FIG. 4 is an electron photomicrograph of a substrate containing fibrillated heat-resistant fibers having a modified freeness of not more than 300 ml as heat-resistant fibers.

FIG. 5 is an electron photomicrograph of a substrate containing fibrillated heat-resistant fibers having a modified freeness of not more than 300 ml and fibrillated heat-resistant fibers having a modified freeness of more than 300 ml as heat-resistant fibers.

FIG. 6 is an electron photomicrograph of a substrate containing fibrillated heat-resistant fibers having a modified freeness of not more than 300 ml and fibrid made of para-aromatic polyamide having a modified freeness of not more than 300 ml as heat-resistant fibers.

FIG. 7 is an electron photomicrograph of a substrate containing fibrillated heat-resistant fibers having a modified freeness of not more than 300 ml, fibrillated heat-resistant fibers having a modified freeness of more than 300 ml and fibrid made of para-aromatic polyamide having a modified freeness of not more than 300 ml as heat-resistant fibers.

FIG. 8 is an electron photomicrograph of a substrate containing no heat-resistant fibers.

PRACTICAL EMBODIMENT OF THE INVENTION

In the present invention, the substrate for lithium ion battery separators is a precursor sheet of a lithium ion battery separator which becomes a lithium ion battery separator by combining at least one composite selected from an inorganic particle layer containing inorganic particles, an organic particle layer containing organic particles, a porous film, a nanofiber layer, a solid electrolyte and a gel-like electrolyte. That is, the substrate of the present invention does not become a lithium ion battery separator by itself. From the viewpoint of heat resistance, the composite is preferably an inorganic particle layer. That is, a separator having a substrate and an inorganic particle layer is preferred.

In the present invention, as the inorganic particles, alumina's such as α-alumina, β-alumina and γ-alumina; alumina hydrates such as boehmite; and magnesium compounds such as magnesium oxide and magnesium hydroxide may be used. Out of these, α-alumina, alumina hydrates and magnesium hydroxide are preferably used as they have high stability to an electrolyte used in a lithium ion battery.

As the organic particles, polyethylene, polypropylene, polyacrylonitrile, polymethyl methacrylate, polyethylene oxide, polystyrene, polyvinyl idene fluoride, ethylene-vinyl monomer copolymer and polyolefin wax are used.

As a resin for the porous film, any resin is acceptable if it can be used to form a film but polyolefin-based resins such as polyethylene-based resin and polypropylene-based resin are preferred. As the polyethylene-based resin, not only a polyethylene-based resin alone such as super low-density polyethylene, low-density polyethylene, linear low-density polyethylene, intermediate-density polyethylene, high-density polyethylene or super high-density polyethylene but also an ethylene-propylene copolymer and a mixture of a polyethylene-based resin and another polyolefin-based resin are used. Examples of the polypropylene-based resin include homopropylene (propylene homopolymer), and random copolymers or block copolymers of an α-olefin such as ethylene, 1-butene, 1-pentene, 1-hexene, 1-heptene, 1-octene, 1-nonene or 1-decene and propylene. As means of combining the substrate and the porous film, lamination integration by thermal lamination and lamination integration using an adhesive may be employed.

The lithium ion battery in the present invention refers to a secondary battery in which a lithium ion moves between an anode and a cathode upon discharge and charge. Examples of the lithium ion battery include a lithium ion secondary battery and a lithium ion polymer secondary battery. The lithium ion battery includes a lithium ion secondary battery comprising a lithium storage material as a negative electrode active material and a metal lithium secondary battery comprising metal lithium as a negative electrode active material.

The lithium ion battery includes a cathode, a separator and an anode as members. In general, it has a structure that a cathode, a separator and an anode are laminated in the mentioned order. An electrolytic solution is absorbed into the cathode, the anode and the separator. The types of the laminate structure include a cylindrical type in which all the members are laminated together and then rolled, a roll flat type in which the cylindrical type is squashed to form two flat surfaces and curved both end parts, a ninety-nine-fold type in which leaf electrodes are inserted into a separator which has been folded 99 times and a leaf laminate type in which a leaf separator and leaf electrodes are laminated together.

A lithium storage material is used as the negative electrode active material of the lithium ion battery. Examples of the lithium storage material include carbon-based materials, silicon-based materials and composite oxides of a transition metal and lithium. The carbon-based materials are preferably used as they are excellent in balance between the amount of lithium able to be stored per mass and the difficulty of deterioration caused by the absorption and release of lithium. The carbon-based materials include graphite's such as natural graphite and artificial graphite; amorphous carbons such as hard carbon, soft carbon and mesoporous carbon; and nanocarbon materials such as carbon nanotube and graphene. The silicon-based materials are preferably used as the amount of lithium able to be stored per mass is large. The silicon-based materials include silicon, silicon monoxide (SiC) and silicon dioxide ($SiO_2$). Lithium titanate which is a type of a composite oxide of a transition metal and lithium is preferably used as deterioration caused by the absorption and release of lithium hardly occurs.

An example of the anode of the lithium ion battery is an electrode produced by coating an anode material containing the above negative electrode active material on metal foil. The anode material may be mixed with a binder such as polyvinylidene fluoride or styrene-butadiene copolymer; conductive agent such as carbon black or nanocarbon material; dispersant; and thickener as required. As the metal used in the metal foil, copper or aluminum is used.

Examples of the positive electrode active material of the lithium ion battery include a composite oxide of a transition metal and lithium, a composite salt having an olivine structure of a transition metal and lithium, and sulfur. An example of the composite oxide of a transition metal and lithium is a composite oxide of at least one transition metal selected from cobalt, nickel and manganese and lithium. A typical metal such as aluminum or magnesium and a transition metal such as titanium or chromium may be further combined with the composite oxide. An example of the composite salt having an olivine structure of a transition metal and lithium is a composite salt having an olivine structure of at least one transition metal selected from iron and manganese and lithium.

An example of the cathode of the lithium ion battery is an electrode produced by coating a cathode material containing the above positive electrode active material on metal foil. The cathode material may be mixed with a binder such as polyvinylidene fluoride or acrylic acid ester copolymer; conductive agent such as carbon black or nanocarbon material; dispersant; and thickener as required. An example of the metal used in the metal foil is aluminum.

Examples of the electrolytic solution of the lithium ion battery include a solution prepared by dissolving a lithium salt in a polar solvent and a solution prepared by dissolving a lithium salt in an ion liquid. Examples of the polar solvent used in the electrolytic solution of the lithium secondary battery include carbonates such as propylene carbonate (PC), ethylene carbonate (EC), diethyl carbonate (DEC) and ethyl methyl carbonate (EMC); and fatty acid esters such as ethyl acetate, propyl acetate and ethyl propionate. Examples of the lithium salt used in the electrolytic solution of the lithium secondary battery include lithium hexafluorophosphate ($LiPF_6$) and lithium tetrafluoroborate ($LiBF_4$). As the solid electrolyte, a solution prepared by dissolving a lithium salt in polyethylene glycol or derivative thereof, polymethacrylic acid derivative, polysiloxane or derivative thereof, or gel-like polymer such as polyvinylidene fluoride is used.

The substrate of the present invention contains heat-resistant fibers and synthetic resin short fibers, and fibrillated heat-resistant fibers having a modified freeness of not more than 300 ml are contained as the heat-resistant fibers as an essential component.

In the present invention, the following expressions may be used.
Fibrillated heat-resistant fibers having a modified freeness of not more than 300 ml fibrillated heat-resistant fibers (I)
Fibrillated heat-resistant fibers having a modified freeness of more than 300 ml: fibrillated heat-resistant fibers (II) Fibrid made of para-aromatic polyamide having a modified freeness of not more than 300 ml: fibrid The reason that the substrate of the present invention contains the fibrillated heat-resistant fibers (I) as an essential component is given below. FIG. 1 is a graph showing the relationship between the content of the heat-resistant fibers and the heat resistant temperature of the substrate. Polyethylene terephthalate (PET)-based synthetic resin short fibers are used as the synthetic resin short fibers. A substrate (12 cm in a width direction×25 cm in a flow direction) was prepared. Then, the four corners of the substrate were fixed by Cellophane tape without applying tension to an aluminum frame measuring 20 cm×20 cm. Subsequently, a hot air gun (trade name: WEP 858D mini-station) was fixed to ensure that the distance between the ejection port having a diameter of 7.5 mm of the hot air gun and the central point of the substrate became 3 cm. Then, hot air was applied to the substrate at a flow rate of 5.3 l/min for 20 seconds to take the maximum temperature (° C.) at which a hole was not formed as "heat-resistant temperature". When the content of the heat-resistant fibers is 3 mass %, the heat-resistant temperature of the substrate containing the fibrillated heat-resistant fibers (I) is 278° C. whereas the heat-resistant temperature of the substrate containing the fibrillated heat-resistant fibers (II) is 270° C. When the content of the heat-resistant fibers is 3.5 mass %, the heat-resistant temperature of the substrate containing the fibrillated heat-resistant fibers (I) is 280° C. whereas the heat-resistant temperature of the substrate containing fibrid is 275° C. Further, as the content of the heat-resistant fibers becomes higher, the heat-resistant temperature of the substrate containing the fibrillated heat-resistant fibers (I) tends to become higher but the heat-resistant temperature of the substrate containing the fibrillated heat-resistant fibers (II) tends to become lower.

FIG. 2 and FIG. 3 are optical photomicrographs showing the thermal fluidity of a substrate when the heat resistant fiber content was changed. Substrates (1 cm×1 cm) were placed one upon another to ensure that the total weight became 0.03 g and sandwiched between two slide glass plates and fixed by aluminum tape. Then, three iron blocks (40 g each) were placed on the assembly which was then put into an electric furnace for 20 minutes. The areas of the substrates taken out from the electric furnace were measured by an optical microscope. FIG. 2 are photos taken when the temperature of the electric furnace was 300° C., wherein FIG. 2(A) shows a substrate having a content of the heat-resistant fibers of 0 mass % and FIG. 2(C) shows a substrate having a content of the heat-resistant fibers (II) of 3.0 mass %. When the temperature of the electric furnace is 300° C., it is understood that even the substrate containing no heat-resistant fibers has low thermal fluidity. FIG. 3 are photos taken when the temperature of the electric furnace was 350° C., wherein FIG. 3(A) shows a substrate having a content of the heat-resistant fibers of 0 mass %, FIG. 3(B) shows a substrate having a content of the fibrillated heat-resistant fibers (I) of 3.5 mass %, FIG. 3(C) shows a substrate having a content of the fibrillated heat-resistant fibers (II) of 3.0 mass %, and FIG. 3(D) shows a substrate having a content of fibrid of 3.5 mass %. The substrates taken out from the electric furnace flowed by heat and had an area ($cm^2$) of (A) 4.9, (B) 0.7, (C) 1.7 and (D) 0.7. It is understood that a heat flow is suppressed in the substrate containing the fibrillated heat-resistant fibers (I) or fibrid.

It is understood from the evaluation results of heat-resistant temperature and thermal fluidity that the substrate containing the fibrillated heat-resistant fibers (I) as an essential component is excellent as it has the highest heat-resistant temperature and suppresses a heat flow.

The substrate (1) for lithium ion battery separators of the present invention contains the fibrillated heat-resistant fibers (I) as heat-resistant fibers, and the content of the fibrillated heat-resistant fibers (I) is not less than 1.0 mass % to less than 5.0 mass % based on the total of all the fiber components contained in the substrate.

The content of the fibrillated heat-resistant fibers (I) is not less than 1.0 mass % to less than 5.0 mass %, preferably not less than 2.0 mass %, more preferably not less than 3.0 mass % based on the total of all the fiber components contained in the substrate (1) of the present invention. The content is preferably is less than 4.5 mass %. When the content of the fibrillated heat-resistant fibers (I) is not less than 5.0 mass %, it is difficult to smash the substrate to reduce the thickness of the substrate. Further, tensile strength lowers and a coating solution for forming an inorganic particle layer hardly permeates the substrate, whereby the adhesion of the inorganic particle layer deteriorates and internal resistance becomes worse. Meanwhile, when the content of the fibrillated heat-resistant fibers (I) is less than 1.0 mass %, though the tensile strength of the substrate becomes high, the effect of improving a leakage current becomes low. When the weight of the substrate is reduced, the coating solution easily permeates and therefore goes through to the rear side to stain a running roll and degrade the surface quality of the separator.

Patent Document 3 (JP-A 2012-3873), Patent Document 5 (WO2011/046066), Patent Document 6 (JP-A 2012-134024) and Patent Document 7 (JP-A 2013-179034) listed in the Prior Art Documents disclose substrates containing fibrillated heat-resistant fibers. The lowest value of the preferred content of the fibrillated heat-resistant fibers is 5 mass %. In Examples of these patent documents, mainly substrates having a thickness of not less than 17 μm were manufactured and evaluated. When the inventors of the present invention studied these substrates in detail, they found the following fact. For example, in the evaluation of the internal resistance of the battery, even when a substrate having a thickness of not less than 17 μm had a content of the fibrillated heat-resistant fibers of 10.0 mass % or 4.0 mass %, it showed low internal resistance. When a substrate having a small thickness of not more than 15 μm had a content of the fibrillated heat-resistant fibers (I) of 4.0 mass %, it showed low internal resistance. However, when the substrate had a content of the fibrillated heat-resistance fibers (I) of 10.0 mass %, it showed high internal resistance. Even when the substrate (1) of the present invention having a content of the fibrillated heat-resistant fibers (I) of not less than 1.0 mass % to less than 5.0 mass % is thick or thin, it has an effect that cuttability and adhesion to the inorganic particle layer are excellent and an advantageous effect that internal resistance can be reduced.

The content of the synthetic resin short fibers is preferably not less than 90.0 mass %, more preferably not less than 92.0 mass %, much more preferably not less than 94.0 mass %, particularly preferably more than 95.0 mass % based on the total of all the fiber components contained in the substrate (1) of the present invention. The content is preferably not more than 99.0 mass %, more preferably not more than 98.0 mass %, much more preferably not more than 96.0 mass %. When the content of the synthetic resin short fibers is more than 99.0 mass %, though the tensile strength of the substrate becomes high, the effect of improving a leakage current may become low. When the content of the synthetic resin short fibers is less than 90.0 mass % and the weight of the substrate is reduced, mechanical strength becomes low, whereby the substrate may be broken at the time of forming the inorganic particle layer.

The most preferred substrate (1) of the present invention is a substrate containing the fibrillated heat-resistant fibers (I) and the synthetic resin short fibers as fiber components. In this case, the content of the synthetic resin short fibers is more than 95.0 mass % to not more than 99.0 mass % based on the total of all the fiber components contained in the substrate (1) of the present invention. It is preferably not more than 98.0 mass %, more preferably not more than 97.0 mass %. It is preferably more than 95.5 mass %.

The substrate (2) for lithium ion battery separators of the present invention contains the fibrillated heat-resistant fibers (I) and the fibrillated heat-resistant fibers (II) as heat-resistant fibers.

The total content of the fibrillated heat-resistant fibers (I) and the fibrillated heat-resistant fibers (II) is preferably not less than 2.0 mass % to less than 9.0 mass % based on the total of all the fiber components contained in the substrate (2) of the present invention. It is more preferably not less than 3.0 mass %, much more preferably not less than 3.5 mass %. It is more preferably less than 8.0 mass %, much more preferably less than 6.0 mass %, particularly preferably less than 5.0 mass %. When the total content of the fibrillated heat-resistant fibers (I) and (II) is not less than 9.0 mass %, it is difficult to reduce the thickness of the substrate. Further, since tensile strength lowers and the coating solution for forming the inorganic particle layer hardly permeates the substrate, whereby adhesion to the inorganic particle layer may deteriorate and internal resistance may become worse. When the total content of the fibrillated heat-resistant fibers (I) and (II) is less than 2.0 mass %, though the tensile strength of the substrate becomes high, the effect of improving a leakage current may become low. When the weight of the substrate is reduced, the coating solution easily permeates and goes through to the rear side to stain a traveling roll and degrade the surface quality of the separator.

It is preferred that the content of the fibrillated heat-resistant fibers (I) should be not less than 1.0 mass % to less than 5.0 mass % and that the content of the fibrillated heat-resistant fibers (II) should be not less than 1.0 mass % to less than 4.0 mass % based on the total of all the fiber components contained in the substrate (2) of the present invention.

The content of the fibrillated heat-resistant fibers (I) is preferably not less than 1.0 mass % to less than 5.0 mass %, more preferably not less than 2.0 mass % to less than 5.0 mass %, much more preferably not less than 2.5 mass % to less than 4.0 mass %, particularly preferably not less than 2.5 mass % to less than 3.5 mass % based on the total of all the fiber components contained in the substrate (2) of the present invention. Within this range, the fibrillated heat-resistant fibers (I) include a small number of thick stem fibers which are not fibrillated and a large number of fibrillated fine fibers, whereby there is no obstacle to the control of the thickness of the substrate and the cuttability of the separator, and the diameter of each pore becomes small. Therefore, the coating solution hardly goes through to the rear side and the retainability of the electrolytic solution becomes high, thereby producing the effect of improving the resistance of the separator. When the content is not less than 5.0 mass %, tensile strength may lower, and the inorganic particles are accumulated mainly on the surface of the substrate, whereby the resistance of the separator may become worse and adhesion between the substrate and the inorganic particle layer may deteriorate. When the content is less than 1.0 mass %, the effect obtained by blending the fibrillated heat-resistant fibers (I) may be rarely observed.

The content of the fibrillated heat-resistant fibers (II) is preferably not less than 1.0 mass % to less than 4.0 mass %, more preferably 1.0 to 3.0 mass %, much more preferably 1.0 to 2.0 mass %, particularly preferably 1.0 to 1.5 mass % based on the total of all the fiber components contained in the substrate (2) of the present invention. When the fibrillated heat-resistant fibers (TI) are used in this range, though the fibrillated heat-resistant fibers (I) are contained, there is no obstacle to the control of the thickness of the substrate and the cuttability of the separator, the resistance of the separator rarely becomes worse, and adhesion between the substrate and the inorganic particle layer rarely deteriorates. Since the fibrillated heat-resistance fibers (II) include relatively thick stem fibers remaining besides the fibrillated fine fibers, the compression resistance of the substrate improves and the short-circuit resistance of the separator becomes high.

The content of the synthetic resin short fibers is preferably not less than 90.0 mass %, more preferably not less than 92 mass %, much more preferably not less than 94.0 mass %, particularly preferably more than 95.0 mass % based on the total of all the fiber components contained in the substrate (2) of the present invention. The content is preferably not more than 98.0 mass %, more preferably not more than 97.0 mass %, much more preferably not more than 96.0 mass %. When the content of the synthetic resin short fibers is more than 98.0 mass %, though the tensile strength of the substrate becomes high, the effect of improving a leakage current may become low in the case of the low weight of the substrate. When the content of the synthetic resin short fibers is less than 90.0 mass % and the weight of the substrate is reduced, mechanical strength becomes low, whereby the substrate may be broken at the time of forming the inorganic particle layer.

The most preferred substrate (2) of the present invention is a substrate containing the fibrillated heat-resistant fibers (I) and (II) and the synthetic resin short fibers as fiber components. In this case, the content of the synthetic resin short fibers is preferably more than 91.0 mass % to not more than 98.0 mass % based on the total of all the fiber components contained in the substrate of the present invention. It is more preferably not more than 97.0 mass %, much more preferably not more than 96.0 mass %. It is more preferably more than 95.0 mass %.

The substrate (3) for lithium ion battery separators of the present invention contains the fibrillated heat-resistant fibers (I) and fibrid as heat-resistant fibers.

The total content of the fibrillated heat-resistance fibers (I) and fibrid is not less than 1.0 mass % to less than 5.0 mass % based on the total of all the fiber components contained in the substrate (3) of the present invention. It is preferably not less than 1.6 mass %, more preferably not less than 2.1 mass %, particularly preferably not less than 2.5 mass %. When the total content of the fibrillated heat-resistant fibers (I) and fibrid is not less than 5.0 mass %, it is difficult to reduce the thickness of the substrate. Since the inorganic particle layer for forming the inorganic particle layer hardly permeates the substrate, adhesion to the inorganic particle layer may deteriorate and internal resistance may become worse. When the total content of the fibrillated heat-resistant fibers (I) and fibrid is less than 1.0 mass %, though the tensile strength of the substrate becomes high, the effect of improving a leakage current may become low. When the weight of the substrate is reduced, the coating solution easily permeates, whereby the inorganic particle layer may go through to the rear side to stain the traveling roll of a coating device and degrade the surface quality of the separator.

In the substrate (3) of the present invention, the content of the fibrillated heat-resistant fibers (I) is preferably more than 50 was %, more preferably not less than 60 mass %, much more preferably not less than 70 mass %, particularly preferably not less than 80 mass % based on the total content of the fibrillated heat-resistant fibers (I) and fibrid. The content of the fibrillated heat-resistant fibers (I) is preferably not more than 92 mass %, more preferably not more than 88 mass %, much more preferably not more than 84 mass %.

In the substrate (3) of the present invention, when the content of the fibrillated heat-resistant fibers (I) is more than 50 mass % and the fibrillated heat-resistant fibers (I) are used in combination with fibrid, the substrate can be made thin, there is no obstacle to the cuttability of the separator, and the diameters of pores become small, whereby the coating solution hardly goes through to the rear side and the retainability of the electrolytic solution improves with the result that the resistance of the separator hardly becomes worse and adhesion to the inorganic particle layer hardly deteriorates. The fibrid has a thin leaf-like fibrous form and greatly shrinks when moisture existent in the crystal structure is dried off and removed, thereby strengthening a network formed by the fibrillated heat-resistant fibers (I) and the synthetic resin short fibers. Therefore, even when the substrate has low weight, the strength characteristic of the substrate can be maintained and a leakage current can be prevented, thereby improving the short-circuit resistance of the separator.

In the substrate (3) of the present invention, when the content of the fibrillated heat-resistant fibers (I) is not more than 50 mass % and the substrate is thin, internal resistance may rise. When the content of the fibrillated heat-resistant fibers (I) is not more than 50 mass % and the weight of the substrate is reduced, the strength characteristic of the substrate may be hardly maintained and a leakage current may be hardly prevented. When the content of the fibrillated heat-resistant fibers (I) is more than 92 mass %, tensile strength may lower, and the inorganic particle layer hardly permeates the substrate, whereby the inorganic particles are accumulated mainly on the surface of the substrate with the result that the resistance of the separator may become worse and adhesion between the substrate and the inorganic particle layer may deteriorate.

The content of the synthetic resin short fibers is preferably not less than 90.0 mass %, more preferably not less than 92.0 mass %, much more preferably not less than 94.0 mass %, particularly preferably more than 95.0 mass % based on the total of all the fiber components contained in the substrate (3) of the present invention. It is preferably not more than 99.0 mass %, more preferably not more than 98.0 mass %, much more preferably not more than 97.0 mass %. When the content of the synthetic resin short fibers is more than 99.0 mass %, though the tensile strength of the substrate becomes high, the effect of improving a leakage current may become low. When the content of the synthetic resin short fibers is less than 90.0 mass % and the weight of the substrate is reduced, mechanical strength becomes low, whereby the substrate may be broken at the time of forming the inorganic particle layer.

The most preferred substrate (3) of the present invention is a substrate containing the fibrillated heat-resistant fibers (I), fibrid and the synthetic resin short fibers as fiber components. In this case, the content of the synthetic resin short fibers is preferably 96.0 to 99.0 mass % based on the total of all the fiber components contained in the substrate (3) of the present invention. It is more preferably not more than 98.0 mass %, much more preferably not more than 97.0 mass %. It is particularly preferably not less than 96.5 mass %.

The substrate (4) for lithium ion battery separators of the present invention contains the fibrillated heat-resistant fibers (I), the fibrillated heat-resistant fibers (II) and fibrid as heat-resistant fibers.

The total content of the fibrillated heat-resistant fibers (I) and (II) and fibrid is preferably not less than 2.0 mass % to less than 9.0 mass %, more preferably not less than 3.0 mass % to less than 9.0 mass %, much more preferably not less than 3.5 mass % to less than 7.0 mass %, particularly preferably not less than 3.5 mass % to less than 5.0 mass % based on the total of all the fiber components contained in the substrate (4) of the present invention. When the total content of the two different fibrillated heat-resistant fibers (I) and (II) and fibrid is not less than 9.0 mass %, it is difficult to reduce the thickness of the substrate. Tensile strength may lower, and the coating solution for forming the inorganic particle layer may hardly permeate the substrate, whereby adhesion to the inorganic particle layer may deteriorate and internal resistance may become worse. When the total content of the wo different fibrillated heat-resistant fibers (I) and (II) and fibrid is less than 2.0 mass %, though the tensile strength of the substrate becomes high, the effect of improving a leakage current may become low. When the weight of the substrate is reduced, the coating solution easily permeates and may go through to the rear side to stain a travelling roll and degrade the surface quality of the separator.

The content of the fibrillated heat-resistant fibers (I) is preferably not less than 0.6 mass % to less than 4.6 mass %, more preferably not less than 1.0 mass % to less than 4.6 mass %, much more preferably not less than 1.5 mass % to less than 4.0 mass %, particularly preferably 2.0 to 3.0 mass % based on the total of all the fiber components contained in the substrate (4) of the present invention. When the fibrillated heat-resistant fibers (I) are used in this range, the fibrillated heat-resistant fibers (I) include a small number of thick stem fibers which are not fibrillated and a large number of fibrillated fine fibers, whereby there is no obstacle to the control of the thickness of the substrate and the cuttability of the separator, and the diameters of pores become small. Therefore, the coating solution hardly goes through to the rear side and the retainability of the electrolytic solution improves with the result that the resistance of the separator becomes better. When the content of the fibrillated heat-resistant fibers (I) is not less than 4.6 mass %, tensile strength may lower, and the resistance of the separator may become worse and adhesion between the substrate and the inorganic particle layer may deteriorate since the inorganic particles are accumulated mainly on the surface of the substrate. When the content of the fibrillated heat-resistant fibers (I) is less than 0.6 mass %, the effect obtained by blending the fibrillated heat-resistant fibers may not be observed.

The content of the fibrillated heat-resistant fibers (II) is preferably not less than 1.0 mass % to less than 4.0 mass %, more preferably 1.0 to 3.0 mass %, much more preferably 1.0 to 2.0 mass %, particularly preferably 1.0 to 1.5 mass % based on the total of all the fiber components contained in the substrate (4) of the present invention. When the fibrillated heat-resistant fibers (II) are used in this range, though fibrid and the fibrillated heat-resistant fibers (I) are contained, there is no obstacle to the control of the thickness of the substrate and the cuttability of the separator, the resistance of the separator rarely becomes worse and adhesion between the substrate and the inorganic particle layer rarely deteriorates. Since the fibrillated heat-resistant fibers (II) include relatively thick stem fibers remaining besides the fibrillated fine fibers, the compression resistance of the substrate and the short-circuit resistance of the separator improve.

The content of fibrid is preferably not less than 0.4 mass % to less than 2.5 mass %, more preferably not less than 0.4 mass % to less than 2.0 mass %, much more preferably not less than 0.4 mass % to less than 1.5 mass %, particularly preferably not less than 0.4 mass % to less than 1.0 mass % based on the total of all the fiber components contained in the substrate (4) of the present invention. When fibrid is used in this range, though the fibrillated heat-resistant fibers (I) and (II) are contained, there is no obstacle to the control of the thickness of the substrate and the cuttability of the separator, the resistance of the separator rarely becomes worse, and adhesion between the substrate and the inorganic particle layer rarely deteriorates. Further, the fibrid has a thin leaf-like form and greatly shrinks when moisture existent in the crystal structure is dried off and removed, thereby strengthening a network formed by the fibrillated heat-resistant fibers (I) and (II) and the synthetic resin short fibers. Therefore, even when the weight is low, the strength characteristic of the substrate can be maintained and a leakage current can be prevented, thereby improving the short-circuit resistance of the separator.

Although the total content of the fibrillated heat-resistant fibers (I) and (II) and fibrid is not less than 2.0 mass % to less than 9.0 mass % based on the total of all the fiber components contained in the substrate (4) of the present invention, when the total content of the fibrillated heat-resistant fibers (I) and fibrid is not less than 5.0 mass %, the inorganic particle layer hardly permeates the substrate, whereby adhesion to the inorganic particle layer may deteriorate. In addition, when the content of fibrid is not less than 2.5 mass % and the weight of the substrate is low, internal resistance may become worse.

The content of the synthetic resin short fibers is preferably not less than 90.0 mass %, more preferably not less than 92.0 mass %, much more preferably not less than 93.0 mass %, particularly preferably more than 95.0 mass % based on the total of all the fiber components contained in the substrate (4) of the present invention. It is preferably not more than 98.0 mass %, more preferably not more than 97.5 mass %, much more preferably not more than 97.0 mass %, particularly preferably not more than 96.5 mass %. When the content of the synthetic resin short fibers is more than 98.0 mass %, though the tensile strength of the substrate becomes high, the effect of improving a leakage current may become low. When the content of the synthetic resin short fiber is less than 90.0 mass- and the weight of the substrate is reduced, mechanical strength becomes low, whereby the substrate may be broken at the time of forming the inorganic particle layer.

In the present invention, as the fibrillated heat resistant fibers, heat-resistant fibers which are made of a heat-resistant resin such as wholly aromatic polyamide (aramid), wholly aromatic polyester, polyimide, polyamide imide, polyether ether ketone, polyphenylene sulfide, polybenzimidazole, poly-p-phenylene benzoisothiazole, poly-p-phenylene benzobisoxazole or polytetrafluoroethylene and fibrillated are used. Out of these, wholly aromatic polyamide which has high affinity for an electrolytic solution and is easily fibrillated is preferred.

The fibrillated heat-resistant fibers can be obtained by processing heat-resistant fibers with a refiner, beater, mill, grinding machine, rotary homogenizer which applies shear force with a high-speed rotary blade, double cylinder type high-speed homogenizer which produces shear force between an cylindrical inner blade rotating at a high speed and a fixed outer blade, ultrasonic crusher which refines with ultrasonic shock, or high-pressure homogenizer which lets a fiber suspension pass through a small-diameter orifice by applying a pressure difference to accelerate the speed of the suspension and collides the fiber suspension to rapidly decelerate its speed so as to apply shear force and cutting force to the fibers.

In the present invention, the term "fibrid" refers to a thin leaf-like or flaky piece having fine fibrils and fine heat-resistant fibers in which a water molecule or moisture is existent in a crystal structure in an amorphous state without forming a strong fiber crystal structure. The fibrid is obtained by collecting a product obtained by introducing a fiber forming high-molecular weight polymer solution into an aqueous coagulation bath without drying it and fibrillating it by beating as required. For example, it is fibrid which is produced by mixing a polymer solution with a precipitating agent for it in the presence of shear force, or an amorphous water-containing product having molecular orientation formed from a high-molecular weight polymer solution showing optical anisotropy and may be beaten as required.

The fibrid can be obtained by beating with a refiner, beater, mill, grinding machine, rotary homogenizer which applies shear force with a high-speed rotary blade, double cylinder type high-speed homogenizer which produces shear force between an cylindrical inner blade rotating at a high speed and a fixed outer blade, ultrasonic crusher which refines with ultrasonic shock, or high-pressure homogenizer which lets a fiber suspension pass through a small-diameter orifice by applying a pressure difference to accelerate the speed of the suspension and collides the fiber suspension to rapidly decelerate its speed so as to apply shear force and cutting force to the fibers.

In the present invention, the fibrid greatly shrinks when moisture existent in the crystal structure is removed by heating or pressure reduction to strengthen the fiber network, thereby improving the strength characteristic of the substrate.

The modified freeness of the fibrillated heat-resistant fibers (I) in the present invention is not more than 300 ml, preferably 0 to 200 ml, more preferably 0 to 100 ml. When the modified freeness of all the fibrillated heat-resistant fibers is more than 300 ml, a large number of thick stem fibers are existent, thereby making it difficult to control the thickness and deteriorating the cuttability of the separator. Since the permeability of an ion is hindered and the retainability of the electrolytic solution is deteriorated by the existence of thick stem fibers, the resistance of the separator becomes high. Further, there is a great need to increase the load or temperature of a heat calendar for the control of thickness, whereby the fusion area of a binder fiber is widened and the permeability of an ion is hindered, thereby further raising the resistance of the separator. When the modified freeness is less than 0 ml, the fibrillation of the fibrillated heat-resistance fibers proceeds too much, whereby the number of fine fibers to be bonded by a predetermined amount of a binder fiber is increased and therefore, tensile strength may lower.

The modified freeness of the fibrillated heat-resistant fibers (TI) in the present invention is more than 300 ml, preferably more than 300 ml to less than 700 ml, more preferably more than 300 ml to less than 600 ml, much more preferably more than 300 ml to less than 450 ml. When the modified freeness is not less than 700 ml, fibrillation does not proceed much, whereby it is difficult to control the thickness and the cuttability of the separator may deteriorate due to the existence of a large number of thick stem fibers. Since the permeability of an ion is hindered and the retainability of the electrolytic solution is deteriorated by the existence of thick stem fibers, the resistance of the separator may become high.

In the present invention, the modified freeness of the fibrid is preferably 0 to 300 ml, more preferably 0 to 200 ml, much more preferably 0 to 100 ml. When the modified freeness is more than 300 ml, the fiber width of the fibrid becomes large and the resistance of the separator may become high.

The texture (density unevenness) of the substrate becomes worse and the mechanical strength of the substrate becomes low, whereby the substrate may be broken at the time of forming the inorganic particle layer. Further, the cuttability of the separator may deteriorate.

Preferably, the fibrillated heat-resistance fibers (I) have a mass-weighted average fiber length of 0.02 to 1.00 mm. The length-weighted average fiber length is preferably 0.02 to 0.50 mm. When the average fiber length is smaller than the preferred range, the fibrillated heat-resistant fibers may drop off from the substrate. When the average fiber length is larger than the preferred range, the defibration of fibers deteriorates and a dispersion failure tends to occur.

Preferably, the fibrillated heat-resistant fibers (II) have a mass-weighted average fiber length of 1.00 to 1.50 mm. The length-weighted average fiber length is preferably 0.50 to 1.00 mm. When the average fiber length is smaller than the above range, the effect of improving short-circuit resistance becomes low. When the average fiber length is larger than the preferred range, it may be difficult to reduce the thickness of the substrate and cuttability may deteriorate.

The mass-weighted average fiber length of the fibrid is preferably 0.30 to 1.00 mm. The length-weighted average fiber length of the fibrid is preferably 0.10 to 0.50 mm. When the average fiber length is smaller than the preferred range, the fibrid may drop off from the substrate. When the average fiber length is larger than the preferred range, the textile of the substrate may become worse and the internal resistance of the substrate may become high.

When the fibrid has the above mass-weighted average fiber length and the above length-weighted average fiber length, if the content of the fibrid in the substrate is low, a fine network structure is formed by the fibers between fibrids and between fibrid and other fibers, whereby a thin substrate having high tensile strength is easily obtained without impairing cuttability.

When the fibrillated heat-resistant fibers (I) and (II) and the fibrid have the above mass-weighted average fiber lengths and the above length-weighted average fiber lengths, if the contents of the heat-resistance fibers in the substrate are low, a fine network structure is formed by the fibers between the heat-resistant fibers and between the heat-resistant fibers and the synthetic resin short fibers, whereby a substrate which has high tensile strength and can be made thin is easily obtained without impairing cuttability.

In the present invention, the mass-weighted average fiber length and the length-weighted average fiber length are mass-weighted average fiber length ($L(w)$) and length-weighted average fiber length ($L(l)$) measured in a projection fiber length (Proj) mode with KajaaniFiberLab V3.5 (manufactured by Metso Automation), respectively.

The average fiber width of the fibrillated heat-resistance fibers (I) is preferably 0.5 to 20.0 μm, more preferably 3.0 to 16.0 μm, much more preferably 5.0 to 15.0 μm. When the average fiber width is larger than 20.0 μm, it may be difficult to reduce the thickness of the substrate or cuttability may deteriorate. When the average fiber width is smaller than 0.5 μm, the fibrillated heat-resistant fibers (I) may drop off from the substrate.

The average fiber width of the fibrillated heat-resistant fibers (II) is preferably 5.0 to 40.0 μm, more preferably 5.0 to 35.0 μm, much more preferably 5.0 to 30.0 μm. When the average fiber width is larger than 40.0 μm, it may be difficult to reduce the thickness of the substrate or cuttability may deteriorate. When the average fiber length is smaller than 5.0 μm, short-circuit resistance may not improve.

The average fiber width of the fibrid is preferably 3.0 to 40.0 μm, more preferably 5.0 to 35.0 μm, much more preferably 10.0 to 30.0 μm. When the average fiber width is larger than 40.0 μm, the internal resistance of the substrate tends to become high, it may be difficult to reduce the thickness, or cuttability may deteriorate. When the average fiber length is smaller than 3.0 μm, the fibrid beating time becomes long, thereby greatly reducing productivity.

In the present invention, the average fiber width is a fiber width measured by using KajaaniFiberLab V.3.5 (manufactured by Metso Automation).

In Examples of the present invention, the modified freeness, mass-weighted average fiber length, length-weighted average fiber length and average fiber width of the heat-resistant fibers are the measurement values (A) of raw materials before the manufacture of the substrate. In the present invention, the measurement values (B) of the heat-resistant fibers taken out from the substrate were measured to check the differences between the measurement values (A) and the measurement values (B). A substrate containing polyethylene terephthalate-based synthetic resin short fibers and the fibrillated heat-resistant fibers (I) was put in an alkali-resistant plastic vessel. Then, a high-concentration alkali solution (for example, an 48 mass % potassium hydroxide aqueous solution) was added to the vessel, and a stirrer was inserted into the solution. Thereafter, the solution was stirred for one day while the vessel was immersed in a 40 to 60° C. hot bath to dissolve the PET-based synthetic resin short fibers completely. Then, the fibrillated heat-resistant fibers (I) in the vessel were filtered out with a filter, neutralized, rinsed fully and dried to obtain the fibrillated heat-resistant fibers (I) taken out from the substrate. The modified freeness and others of the fibrillated heat-resistant fibers (I) taken out from the substrate were measured as the measurement values (B). When the measurement values (A) before the manufacture of the substrate and the measurement values (B) were compared with each other, there were not so much differences between the measurement values (A) and (B), and it could be confirmed that measurement values (A) ≈ measurement values (B).

| <measurement values (A)> | |
|---|---|
| Modified freeness | 50 ml |
| Mass-weighted average fiber length | 0.58 mm |
| Length-weighted average fiber length | 0.33 mm |
| Average fiber width | 15.5 μm |

| <measurement values (B)> | |
|---|---|
| Modified freeness | 49 ml |
| Mass-weighted average fiber length | 0.55 mm |
| Length-weighted average fiber length | 0.31 mm |
| Average fiber width | 16.1 μm |

In the present invention, the synthetic resin short fibers are short fibers (staple) which are made of a synthetic resin such as polyolefin, polyester, polyvinyl acetate, ethylene-vinyl acetate copolymer, polyamide, acryl, polyvinyl chloride, polyvinylidene chloride, polyvinyl ether, polyvinyl ketone, polyether polyvinyl alcohol, diene, polyurethane, phenol, melamine, furan, urea, aniline, unsaturated polyester, fluorine, silicone or derivative thereof and are not fibrillated. The tensile strength and thrust strength of the substrate can be enhanced by containing the synthetic resin short fibers.

The synthetic resin short fibers may be fibers made of a single resin or composite fibers made of two or more resins. The synthetic resin short fibers contained in the substrate of the present invention may be of one type or two or more types. Examples of the composite fibers include core-sheath, eccentric, side-by-side, sea-island, orange and multiple bimetal type composite fibers.

The fineness of the synthetic resin short fibers is preferably 0.01 to 0.6 dtex, more preferably 0.02 to 0.3 dtex. When the fineness of the synthetic resin short fibers is more than 0.6 dtex, the number of fibers in the thickness direction becomes small, whereby the pore size distribution of the substrate becomes wide with the result that a leakage current may become large. Further, it is difficult to reduce the thickness, and strength characteristic tends to deteriorate. When the fineness of the synthetic resin short fibers is less than 0.01 dtex, the fibers become very expensive, the stable production of the fibers may be difficult, and dewaterability may deteriorate at the time of producing the substrate by a wet papermaking method.

The fiber length of the synthetic short fibers is preferably 1 to 10 mm, more preferably 1 to 5 mm. When the fiber length is larger than 10 mm, the texture may become worse. When the fiber length is smaller than 1 mm, the mechanical strength of the substrate lowers, whereby the substrate may be broken at the time of forming the inorganic particle layer.

The substrate of the present invention may contain fibers other than the heat-resistant fibers and the synthetic resin short fibers. For example, cellulose fibers, pulp products and fibrillated products of cellulose fibers, pulp products of synthetic resins and inorganic fibers may be used. The inorganic fibers include glass, alumina, silica, ceramic and Rockwool fibers. The cellulose fibers may be natural cellulose or regenerated cellulose fibers.

FIG. 4 is an electron photomicrograph of a substrate containing the fibrillated heat-resistant fibers (I) 1 as the heat-resistant fibers. FIG. 5 is an electron photomicrograph of a substrate containing the fibrillated heat-resistant fibers (I) 1 and the fibrillated heat-resistant fibers (II) 2 as the heat-resistant fibers. FIG. 6 is an electron photomicrograph of a substrate for lithium ion secondary battery separators which contains the fibrillated heat-resistant fibers (I) 1 and the fibrid 3. FIG. 7 is an electron photomicrograph of a substrate for lithium ion secondary battery separators which contains the fibrillated heat-resistant fibers (I) 1, the fibrillated heat-resistant fibers (II) 2 and the fibrid 3 as the heat-resistant fibers. FIG. 8 is an electron photomicrograph of a substrate containing no heat-resistant fibers. The fibrid 3 is thin leaf-like whereas the fibrillated heat-resistant fibers (I) 1 and (II) 2 are not thin leaf-like but microfibers which have been finely separated in a direction parallel mainly to the fiber axis. Since the fibrillated heat-resistant fibers (I) 1 in particular are highly fibrillated, they easily get entangled with the synthetic resin short fibers 4 and are easily spread into the entire substrate. Therefore, as described above, the substrate containing the fibrillated heat-resistant fibers (I) 1 as an essential component becomes the most excellent substrate which has the highest heat-resistant temperature and suppresses a heat flow.

The thickness of the substrate of the present invention is preferably not smaller than 6 μm, more preferably not smaller than 8 μm, much more preferably not smaller than 10 μm. Further, it is preferably not larger than 20 μm, more preferably not larger than 18 μm, much more preferably not larger than 15 μm. Even when the thickness of the substrate is set to the above range, the substrate of the present invention can reduce internal resistance and retain tensile strength required for the coating step or the electrode lamination step, whereby work efficiency in each step including the papermaking property of the substrate is not impaired. When the thickness of the substrate is larger than 20 μm, the resistance of the separator may become too high. Further, a high-capacity battery may not be obtained. When the thickness of the substrate is smaller than 6 μm, the strength of the substrate becomes too low, whereby the substrate may be broken at the time of handling or coating.

The density of the substrate of the present invention is preferably not lower than 0.40 $g/cm^3$, more preferably not lower than 0.45 $g/cm^3$, and preferably not higher than 0.75 $g/cm^3$, more preferably not higher than 0.70 $g/cm^3$. When the density is lower than 0.40 $g/cm^3$, the strength of the substrate becomes too low, whereby the substrate may be broken at the time of handling or coating. When the density is higher than 0.75 $g/cm^3$, the resistance of the separator may become too high.

The substrate of the present invention is preferably a wet nonwoven fabric produced by a wet paper-making method. The wet paper-making method is to produce a wet nonwoven fabric by dispersing fibers in water to obtain homogeneous paper-making slurry and filtering the paper-making slurry with a paper machine. Examples of the paper machine include a cylinder paper machine, fourdrinier paper machine, inclination type paper machine, inclination short net paper machine and composite machines thereof. In the process for producing a wet nonwoven fabric, a water-jet interlacing treatment may be carried out as required. As the treatment of a wet nonwoven fabric, a heat treatment, calender or heat calender may be carried out.

The lithium ion battery separator of the present invention is constituted by combining at least one composite selected from the group consisting of an inorganic particle layer containing inorganic particles, an organic particle layer containing organic particles, a porous film, a nanofiber layer, a solid electrolyte and a gel-like electrolyte with the substrate of the present invention. Out of these, a separator having the substrate and the inorganic particle layer is most preferred.

The particle diameter of each of the inorganic particles is preferably 0.02 to 4.00 μm, more preferably 0.10 to 3.00 μm. When the particle diameter is too large, it may be difficult to form an inorganic particle layer having an appropriate thickness, or surface unevenness may become large. When the particle diameter is too small, the inorganic particles may be hardly dispersed or easily drop off from the substrate, and the amount of a binder must be increased to prevent drop-off, thereby deteriorating internal resistance. The particle diameter as used herein is the D50 (median diameter) of a volume distribution measured by a laser diffraction scattering method.

The inorganic particle Layer may contain a binder. As the binder, various organic polymers may be used. The polymers include organic polymers such as styrene-butadiene copolymer elastomer, acrylonitrile-butadiene copolymer elastomer, (meth)acrylic acid ester polymer elastomer, styrene-(meth)acrylic acid ester polymer elastomer and polyvinylidene fluoride polymer.

The content of the binder in the inorganic particle layer is preferably 2 to 200 mass % based on the total weight of the inorganic particles. It is particularly preferably 5 to 50 mass %. When the amount of the binder is too small, the inorganic particles may easily drop off from the substrate. When the amount of the binder is too large, the inorganic particle layer becomes too fine, thereby reducing ion permeability.

The separator having the substrate and the inorganic particle layer can be produced by forming the inorganic particle layer on at least one side of the substrate. To form the inorganic particle layer on at least one side of the substrate, there is a method in which slurry for forming the inorganic particle layer (coating solution) is prepared by dispersing or dissolving components constituting the inorganic particle layer in a medium such as water or an organic solvent and coated on the substrate.

As the medium for preparing the slurry for forming the inorganic particle layer, any medium is acceptable if it can dissolve or disperse the binder and the inorganic particles uniformly. For example, aromatic hydrocarbons such as toluene, cyclic ethers such as tetrahydrofuran (THF), ketones such as methyl ethyl ketone (MEK), alcohols such as isopropyl alcohol, N-methyl-2-pyrrolidone (NMP), N,N dimethylacetamide (DMAc), N,N-dimethylformamide (DMF), dimethyl sulfoxide (DMSO) and water may be used as required. These media may be mixed together as required. The medium in use is preferably a medium which does not swell or dissolve the substrate.

To apply the coating solution, for example, coating system such as blade, rod, reverse roll, lip, die, curtain or air knife coating system, printing system such as flexography, screen, offset, gravure or inkjet printing system, or transfer system such as roll transfer or film transfer system may be selected and used as required.

As a device for applying the coating solution to the substrate to form the inorganic particle layer, various coating devices may be used. For example, devices having coating system such as gravure, die, lip, blade, curtain, air knife, rod, roll, reverse roll coater, kiss or dip coating system; printing system such as flexography, screen, offset, gravure or inkjet printing system, or transfer system such as roll transfer or film transfer system may be used.

The coating weight of the inorganic particle layer which depends on the substrate is preferably 1 to 30 $g/m^2$, more preferably 3 to 20 $g/m^2$, much more preferably 5 to 15 $g/m^2$ as a dried (absolute dried) coating weight per one side of the substrate. When the coating weight of the inorganic particle layer is lower than 1 $g/m^2$, almost all the coating solution permeates the inside of the substrate at the time of forming the inorganic particle layer, whereby the inorganic particle layer may not be formed on the surface of the substrate. When the coating weight is higher than 30 $g/m^2$, the separator becomes thick, whereby the energy density per volume of the battery becomes low and the basis weight of the separator becomes heavy, thereby reducing the energy density per mass of the battery.

To the inorganic particle layer, various additives such as a dispersant exemplified by polyacrylic acid and sodium carboxymethyl cellulose, thickener exemplified by hydroxyethyl cellulose, sodium carboxymethyl cellulose and polyethylene oxide, wetting agent, antiseptic and defoaming agent may be added as required besides the above inorganic particles and the binder. In general, a nonaqueous coating solution prepared by using an organic solvent as a medium has low surface tension whereas an aqueous coating solution prepared by using water as a medium has high surface tension. Both the nonaqueous coating solution and the aqueous coating solution can be applied to the substrate of the present invention without a problem as the substrate has high coating solution receptivity.

A preferred example of the separator of the present invention having the substrate of the present invention and the inorganic particle layer is a separator having an inorganic particle layer A containing magnesium hydroxide having an average particle diameter of 2.0 to 4.0 μm and an inorganic particle layer B containing magnesium hydroxide having an average particle diameter of not less than 0.5 μm to less than 2.0 μm both of which are formed on one side of the substrate of the present invention in the mentioned order. The inorganic particle layer A is obtained by applying a coating solution "a" containing magnesium hydroxide having an average particle diameter of 2.0 to 4.0 μm to one side of the substrate. The inorganic particle layer B is obtained by applying a coating solution "b" containing magnesium hydroxide having an average particle diameter of not less than 0.5 μm to less than 2.0 μm to the inorganic particle layer A.

The average particle diameter of magnesium hydroxide contained in the inorganic particle layer A is larger than the average particle diameter of magnesium hydroxide contained in the inorganic particle layer B. Therefore, the inorganic particle layer A hardly permeates the inside of the substrate and hardly produces a pinhole as compared with the inorganic particle layer B but tends to become rather thick. The inorganic particle layer B easily permeates the inside of the substrate and produces a pinhole as compared with the inorganic particle layer A but tends to become thin. Therefore, in the separator having the inorganic particle layer A and the inorganic particle layer B on one side of the substrate in the mentioned order, the inorganic particle layer A prevents the inorganic particle layer B from permeating the inside of the substrate, thereby making it possible to form the homogeneous inorganic particle layers on the surface of the separator. As a result, the production of a pinhole can be prevented and internal resistance can be made low though the separator is thin.

Since the inorganic particle layer A easily adheres to the substrate and has high layer strength, a defect is hardly produced at the time of producing the separator, thereby obtaining excellent production stability.

Further, as the average particle diameter of magnesium hydroxide contained in the inorganic particle layer A is larger than the average particle diameter of magnesium hydroxide contained in the inorganic particle layer B, in the case of the same coating weight, the inorganic particle layer A becomes thicker than the inorganic particle layer B. Therefore, in the case of separators having the same total coating weight of the inorganic particle layer A and the inorganic particle layer B, a separator having a lower coating weight of the inorganic particle layer A than the coating weight of the inorganic particle layer B can be made thinner advantageously. When the coating weight of the inorganic particle layer A is higher than the coating weight of the inorganic particle layer B, the content of magnesium hydroxide having a relatively large average particle diameter becomes high, whereby the separator may become thick.

Another preferred example of the separator of the present invention having the substrate of the present invention and the inorganic particle layers is a separator having an inorganic particle layer A containing magnesium hydroxide having an average particle diameter of 2.0 to 4.0 μm on one side of the substrate of the present invention and an inorganic particle layer B containing magnesium hydroxide having an average particle diameter of not less than 0.5 μm to less than 2.0 μm on the other side of the substrate. The inorganic particle layer A is obtained by applying a coating solution "a" containing magnesium hydroxide having an average particle diameter of 2.0 to 4.0 μm to one side of the substrate. The inorganic particle layer B is obtained by applying a coating solution "b" containing magnesium hydroxide having an average particle diameter of not less than 0.5 μm to less than 2.0 μm to the other side of the substrate opposite to the above side on which the inorganic particle layer A has been formed.

The average particle diameter of magnesium hydroxide contained in the inorganic particle layer A is larger than the average particle diameter of magnesium hydroxide contained in the inorganic particle layer B. Therefore, the inorganic particle layer A hardly permeates the inside of the substrate as compared with the inorganic particle layer B and hardly produces a pinhole but tends to become rather thick. The inorganic particle layer B easily permeates the inside of the substrate and produces a pinhole as compared with the inorganic particle layer A but tends to become thin. Then, by forming the inorganic particle layer A and the inorganic particle layer B on different sides of the substrate, the production of a pinhole can be prevented and a thin separator having low internal resistance can be obtained.

Since the inorganic particle layer A and the inorganic particle layer B easily adhere to the substrate and have high layer strength, a defect is hardly produced at the time of producing the separator, thereby obtaining excellent production stability.

Since the average particle dimeter of magnesium hydroxide contained in the inorganic particle layer A is larger than the average particle diameter of magnesium hydroxide contained in the inorganic particle layer B, in the case of the same coating weight, the inorganic particle layer A is thicker than the inorganic particle layer B. Therefore, in the case of separators having the same total coating weight of the inorganic particle layer A and the inorganic particle layer B, a separator having a lower coating weight of the inorganic particle layer A than the coating weight of the inorganic particle layer B can be made thinner advantageously. When the coating weight of the inorganic particle layer A is higher than the coating weight of the inorganic particle layer B, the content of magnesium hydroxide having a relatively large average particle diameter becomes high, whereby the separator may become thick.

The average particle diameter of magnesium hydroxide contained in the inorganic particle layer A is preferably 2.2 to 3.7 μm, more preferably 2.5 to 3.5 μm.

The dried coating weight of the inorganic particle layer A is preferably 2.0 to 10.0 $g/m^2$, more preferably 2.5 to 8.0 $g/m^2$, much more preferably 3.0 to 6.0 $g/m^2$. When the coating weight is higher than 10.0 $g/m^2$, the separator may become too thick. When the coating weight is lower than 2.0 $g/m^2$, a pinhole may be easily produced.

The average particle diameter of magnesium hydroxide contained in the inorganic particle layer B is preferably 0.5 to 1.5 μm, more preferably 0.5 to 1.3 μm, particularly preferably 0.5 to 1.0 μm.

The dried coating weight of the inorganic particle layer B is preferably 2.5 to 10.0 g/m$^2$, more preferably 3.0 to 8.5 g/m$^2$, much more preferably 3.5 to 7.0 g/m$^2$. When the coating weight is higher than 10.0 g/m$^2$, the separator may become too thick. When the coating weight is lower than 2.5 g/m$^2$, a pinhole may be easily produced.

The dried coating weight ratio (dried coating weight of inorganic particle layer A/dried coating weight of inorganic particle layer B) of the inorganic particle layer A and the inorganic particle layer B is preferably not less than 0.23 to less than 1.00, more preferably not less than 0.33 to less than 0.95, much more preferably not less than 0.43 to less than 0.90. When the dried coating weight ratio of the inorganic particle layer A and the inorganic particle layer B is not less than 1.00, the separator may become thick and when the dried coating weight ratio is less than 0.23, a pinhole may be easily produced.

The basis weight of the separator of the present invention is preferably 9 to 35 g/m$^2$, more preferably 10 to 30 g/m$^2$, much more preferably 12 to 25 g/m$^2$. When the weight is higher than 35 g/m$^2$, internal resistance may become too high. When the weight is lower than 9 g/m$^2$, a pinhole may be easily produced and sufficiently high strength may be hardly obtained.

The thickness of the separator of the present invention is preferably 9 to 35 μm, more preferably 10 to 30 μm, much more preferably 12 to 28 μm. When the thickness is larger than 35 μm, the separator becomes too thick and internal resistance may become high. When the thickness is smaller than 9 μm, a pinhole may be easily produced and sufficiently high strength may be hardly obtained.

EXAMPLES

The following examples are provided for the purpose of further illustrating the present invention but are in no way to be taken as limiting. Percentage (%) and parts in Examples are all based on mass unless otherwise noted. The coating weight is dried coating weight.

In <<Example 1>> to <<Example 4>>, the following physical properties of substrates for lithium ion battery separators and lithium ion battery separators were measured and evaluated.
<Basis Weight of Substrate and Coating Weight of Inorganic Particle Layer>

The basis weights of the substrates and the separators were measured in accordance with JIS P8124. The coating weight of the inorganic particle layer was calculated by subtracting the basis weight of the substrate from the basis weight of the separator.
<Thicknesses of Substrate and Separator>

The thicknesses of the substrate and the separator were measured under a load of 5 N by using an external micrometer specified in JIS B7502.
<Adhesion Between Substrate and Inorganic Particle Layer>

Five test pieces measuring 100 mm in a width direction× 100 mm in a flow direction were cut out from each separator, and cellophane tape measuring 10 mm in width×50 mm in length was lightly attached to the inorganic particle layer of each of the separators in a flow direction and a width direction to reciprocate a 1 kg stainless cylinder twice. Thereafter, the cellophane tape was removed from the inorganic particle layer, and the separator was visually checked and evaluated based on the following criteria. Separators evaluated up to Δ can be actually used.

○: inorganic particle layer remains on substrate surface
Δ: about half of inorganic particle layer peels off from substrate
X: almost all inorganic particle layer peels off from substrate
<Cuttability of Separator>

Each separator was slit into 8 rolls measuring 50 mm in a width direction×200 m in a flow direction, and both edge surfaces were visually checked and evaluated based on the following criteria. Separators evaluated up to Δ can be actually used.

○: both edge surfaces are not fluffed
Δ: both edge surfaces are slightly fluffed
X: both edge surfaces are markedly fluffed
<Manufacture of Battery for Evaluation>

A pouch type lithium ion battery for evaluation having a design capacity of 30 mAh was manufactured by using each separator, lithium manganate as a cathode, a mesocarbon microbeadas an anode and a 1 mol/L diethyl carbonate/ethylene carbonate (volume ratio of 7/3) mixed solvent solution of lithium hexafluorophosphate as an electrolytic solution in such a manner that the inorganic particle layer of each separator was opposed to the anode and evaluated for the following internal resistance and leakage current.
<Evaluation of Internal Resistance>

After five cycles of shake-down charging/discharging, each consisting of 60 mA constant current charging, 4.2 V constant voltage charging (1 hour), 60 mA constant current discharging and the next cycle when the voltage became 2.8 V, were carried out for each battery, 60 mA constant current charging, 4.2 V constant voltage charging (1 hour), 30 minutes of 6 mA constant current discharging (discharge amount of 3 mAh), the measurement of voltage right before the end of discharging (voltage "a"), 60 mA constant current charging, 4.2 V constant voltage charging (1 hour), 2 minutes of 90 mA constant current discharging (discharge amount of 3 mAh) and the measurement of voltage (voltage "b") right before the end of discharging were carried out to obtain internal resistance from the expression internal resistance $\Omega$=(voltage "a"–voltage "b")/(90 mA−6 mA). Separators evaluated up to Δ can be actually used.

⊚: internal resistance of less than 3.5Ω
○: internal resistance of not less than 3.5Ω to less than 4.0Ω
Δ: internal resistance of not less than 4.0Ω to less than 5.0Ω
X: internal resistance of not less than 5.0Ω
<Evaluation of Leakage Current>

The charging capacity of each battery for evaluation was measured after 30 mA constant current charging and 4.2 V constant voltage charging (termination current of 3 mA) were carried out for the first time. Each separator was classified into the following 4 levels according to charging capacity. A charging capacity greatly exceeding 30 mAh which is a design capacity means that a leakage current is produced in the battery. Batteries evaluated up to ○ can be actually used.

⊚: first charging capacity of less than 32 mAh
○: first charging capacity of not less than 32 mAh to less than 37 mAh
Δ: first charging capacity of not less than 37 mAh to less than 42 mAh
X: first charging capacity of not less than 42 mAh <Evaluation of Tensile Strength>

A sample piece measuring 250 mm in a flow direction×50 mm in a width direction was cut out from each substrate in such a manner that its long side was arranged in a flow direction to carry out a tensile test at a tensile speed of 200 mm/min by using a desk-top material testing machine (STA-1150 of ORIENTEC Co., Ltd.) in accordance with JIS P8113. The maximum value of tensile stress is taken as tensile strength. In general, higher tensile strength is more preferred. When tensile strength is low, tension applied to the substrate must be precisely controlled at the time of coating and manufacturing a battery, thereby causing a problem that a large-scaled apparatus is required for this control.

◎: tensile strength of not less than 1,000 N/m

○: tensile strength of not less than 700 N/m to less than 1,000 N/m

Δ: tensile strength of not less than 400 N/n to less than 700 N/m

X: tensile strength of less than 400 N/m

Example 1

Example 1-1

<Manufacture of Substrate>

55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 4.5 parts by mass of fibrillated heat-resistant fibers obtained by fibrillating a pulp-like product of wholly aromatic polyamide fibers (average fiber length of 1.7 mm, average fiber diameter of 10 μm) to a modified freeness of up to 50 ml with a high-pressure homogenizer were dispersed in water with a pulper to prepare homogeneous papermaking slurry having a concentration of 0.5 mass %, and a wet paper web was obtained by using an inclination type paper machine and dried with a cylinder drier having a surface temperature of 135° C. to obtain a sheet. The obtained sheet was calendered with a heat calender having a steel roll plated with chromium and having a surface temperature of 195° C. as one of the rolls and a resin roll having a hardness of Shore A92 as the other roll and a linear pressure of 100 kN/m to produce a substrate 1-1 having a basis weight of 10 g/m² and a thickness of 15 μm.

<Preparation of Coating Solution>

100 parts of boehmite having a volume average particle diameter of 0.9 μm and a specific surface area of 5.5 m²/g was mixed with 120 parts of a 0.3% aqueous solution of a carboxymethyl cellulose sodium salt having a viscosity at 25° C. of a 1 mass % solution thereof of 200 mPa·s and fully stirred, and then the resulting solution was mixed with 300 parts of a 0.5% aqueous solution of a carboxymethyl cellulose sodium salt having a viscosity at 25° C. of a 1 mass % aqueous solution thereof of 7,000 mPa·s and 10 parts of a commercially available styrene butadiene rubber (SBR)-based binder for lithium ion batteries (TRD2001 of JSR Corporation) (solid concentration of 48% and stirred to prepare a coating solution.

<Manufacture of Separator>

The coating solution was applied to one side of the above substrate 1-1 with a kiss reverse gravure coater to a coating weight of 12 g/m² and dried to manufacture a separator having an inorganic particle layer.

Example 1-2

A substrate 1-2 having a basis weight of 10 g/m² and a thickness of 15 μm was manufactured in the same manner as the substrate 1-1 except that 59.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 1.0 part by mass of fibrillated heat-resistant fibers having a modified freeness of 50 ml were used. Then, the coating solution prepared in Example 1-1 was applied to a coating weight of 12 g/m² in the same manner as in Example 1-1 and dried to manufacture a separator.

Example 1-3

A substrate 1-3 having a basis weight of 8 g/m² and a thickness of 11 μm was manufactured by using the papermaking slurry of Example 1-1 in the same manner as the substrate 1-1. Then, the coating solution prepared in Example 1-1 was applied to a coating weight of 12 g/m² in the same manner as in Example 1-1 and dried to manufacture a separator.

Example 1-4

A substrate 1-4 having a basis weight of 8 g/m² and a thickness of 11 μm was manufactured in the same manner as the substrate 1-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 4.5 parts by mass of fibrillated heat-resistant fibers obtained by fibrillating cut fibers (average fiber length of 3.0 mm, average fiber diameter of 20 μm) of polyarylate fibers (wholly aromatic polyester fibers) to a modified freeness of up to 250 ml with a high-pressure homogenizer were used. Then, the coating solution prepared in Example 1-1 was applied to a coating weight of 12 g/m² in the same manner as in Example 1-1 and dried to manufacture a separator.

Comparative Example 1-1

A substrate 1-5 having a basis weight of 8 g/m² and a thickness of 12 μm was manufactured in the same manner as the substrate 1-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used. Then, the coating solution prepared in Example 1-1 was applied to a coating weight of 12 g/m² in the same manner as in Example 1-1 and dried to manufacture a separator.

Comparative Example 1-2

A substrate 1-6 having a basis weight of 8 g/m² and a thickness of 11 μm was manufactured in the same manner as the substrate 1-1 except that 55.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 5.0 parts by mass of fibrillated heat-resistant fibers having a modified freeness of 50 ml were used and heat calender was carried out at a steel roll surface temperature of 195° C. and a linear pressure of 120 kN/m to make the substrate uniform in thickness. Then, the coating solution prepared in Example 1-1 was applied to a coating weight of 12 g/m² in the same manner as in Example 1-1 and dried to manufacture a separator.

Comparative Example 1-3

A substrate 1-7 having a basis weight of 8 g/m² and a thickness of 11 µm was manufactured in the same manner as the substrate 1-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 10.0 parts by mass of fibrillated heat-resistant fibers having a modified freeness of 50 ml were used and heat calender was carried out at a steel roll surface temperature of 195° C. and a linear pressure of 175 kN/m to make the substrate uniform in thickness. Then, the coating solution prepared in Example 1-1 was applied to a coating weight of 12 g/m² in the same manner as in Example 1-1 and dried to manufacture a separator.

Comparative Example 1-4

A substrate 1-8 having a basis weight of 8 g/m² and a thickness of 11 µm was manufactured in the same manner as the substrate 1-1 except that wholly aromatic polyamide fibers which had been fibrillated to a modified freeness of up to 320 ml by using a grinding apparatus were used in place of the fibrillated heat-resistant fibers. Then, the coating solution prepared in Example 1-1 was applied to a coating weight of 12 g/m² in the same manner as in Example 1-1 and dried to manufacture a separator.

Example 1-5

A substrate 1-9 having a basis weight of 7 g/m² and a thickness of 10 µm was manufactured by using the papermaking slurry of Example 1-1 in the same manner as the substrate 1-1. Then, the coating solution prepared in Example 1-1 was applied to a coating weight of 12 g/m² in the same manner as in Example 1-1 and dried to manufacture a separator.

Comparative Example 1-5

A substrate 1-10 having a basis weight of 7 g/m² and a thickness of 10 µm was manufactured by using the papermaking slurry of Comparative Example 1-1 in the same manner as the substrate 1-1. Then, the coating solution prepared in Example 1-1 was applied to a coating weight of 12 g/m² in the same manner as in Example 1-1 and dried to manufacture a separator.

Example 1-6

A substrate 1-11 having a basis weight of 8 g/m² and a thickness of 11 µm was manufactured in the same manner as the substrate 1-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 4.5 parts by mass of fibrillated heat-resistant fibers having a modified freeness of 50 ml and 5.5 parts by mass of solvent spun cellulose fibers obtained by refining solvent spun cellulose fibers having an average fiber diameter of 10 µm and a fiber length of 4 mm by using a refiner and beating them to a modified freeness of 90 ml were used. Then, the coating solution prepared in Example 1-1 was applied to a coating weight of 12 g/m² in the same manner as in Example 1-1 and dried to manufacture a separator.

Example 1-7

A substrate 1-12 having a basis weight of 8 g/m² and a thickness of 11 µm was manufactured in the same manner as the substrate 1-11 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 4.5 parts by mass of fibrillated heat-resistant fibers having a modified freeness of 50 ml and 6.5 parts by mass of solvent spun cellulose fibers which were beaten to a modified freeness of 90 ml were used. Then, the coating solution prepared in Example 1-1 was applied to a coating weight of 12 g/m² in the same manner as in Example 1-1 and dried to manufacture a separator.

Example 1-8

A substrate 1-13 having a basis weight of 7 g/m² and a thickness of 10 µm was manufactured in the same manner as the substrate 1-1 except that 56.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 4.0 parts by mass of fibrillated heat-resistant fibers having a modified freeness of 50 ml were used. Then, the coating solution prepared in Example 1-1 was applied to a coating weight of 12 g/m² in the same manner as in Example 1-1 and dried to manufacture a separator.

Example 1-9

A substrate 1-14 having a basis weight of 7 g/m² and a thickness of 10 µm was manufactured in the same manner as the substrate 1-1 except that 57.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm and 3.0 parts by mass of fibrillated heat-resistant fibers having a modified freeness of 50 ml were used. Then, the coating solution prepared in Example 1-1 was applied to a coating weight of 12 g/m² in the same manner as in Example 1-1 and dried to manufacture a separator.

Example 1-10

A substrate 1-15 having a basis weight of 12 g/m² and a thickness of 18 µm was manufactured by using the papermaking slurry of Example 1-8 in the same manner as the substrate 1-13. Then, the coating solution prepared in Example 1-1 was applied to a coating weight of 15 g/m² in the same manner as in Example 1-1 and dried to manufacture a separator.

Comparative Example 1-6

A substrate 1-16 having a basis weight of 12 g/m² and a thickness of 18 μm was manufactured in the same manner as the substrate 1-7 except that heat calender was carried out by using the papermaking slurry of Comparative Example 1-3 at a steel roll surface temperature of 195° C. and a linear pressure of 120 kN/m to make the substrate uniform in thickness. Then, the coating solution prepared in Example 1-1 was applied to a coating weight of 15 g/m² in the same manner as in Example 1-1 and dried to manufacture a separator.

TABLE 1

Table 1-1

| | | | Ex. 1-1 Sub. 1-1 | Ex. 1-2 Sub. 1-2 | Ex. 1-3 Sub. 1-3 | Ex. 1-4 Sub. 1-4 | Ex. 1-5 Sub. 1-9 |
|---|---|---|---|---|---|---|---|
| Fiber blending | oriented crystallized PET-based synthetic resin short fibers 0.06 dtex × 3 mm | pbm | 55.5 | 59.0 | 55.5 | 55.5 | 55.5 |
| | Undrawn PET-based synthetic resin short fibers 0.2 dtex × 3 mm | pbm | 40.0 | 40.0 | 40.0 | 40.0 | 40.0 |
| | Fibrillated heat-resistant fibers | pbm | 4.5 | 1.0 | 4.5 | 4.5 | 4.5 |
| | Beaten melt spun cellulose fibers | pbm | 0.0 | 0.0 | 0.0 | 0.0 | 0.0 |
| Fibrillated heat-resistant fibers | Modified freeness | ml | 50 | 50 | 50 | 250 | 50 |
| | Mass-weighted average fiber length | mm | 0.58 | 0.58 | 0.58 | 0.82 | 0.58 |
| | Length-weighted average fiber length | mm | 0.33 | 0.33 | 0.33 | 0.45 | 0.33 |
| | Fiber width | μm | 15.5 | 15.5 | 15.5 | 19.5 | 15.5 |
| Linear pressure of heat calender | | kN/m | 100 | 100 | 100 | 100 | 100 |
| Physical properties | Basis weight of substrate | g/m² | 10 | 10 | 8 | 8 | 7 |
| | Thickness of substrate | μm | 15 | 15 | 11 | 11 | 10 |
| | Coating weight of coating layer | g/m² | 12 | 12 | 12 | 12 | 12 |
| | Thickness of separator | μm | 25 | 25 | 21 | 21 | 20 |
| Evaluation | Adhesion between substrate and coating layer | — | ○ | ○ | ○ | ○ | ○ |
| | Cuttability of separator | — | ○ | ○ | ○ | ○ | ○ |
| | Internal resistance | — | ◎ | ◎ | ◎ | ○ | ◎ |
| | Leakage current | — | ◎ | ○ | ◎ | ○ | ◎ |
| | Tensile strength | — | ◎ | ◎ | ○ | ○ | ○ |

| | | | Ex. 1-6 Sub. 1-11 | Ex. 1-7 Sub. 1-12 | Ex. 1-8 Sub. 1-13 | Ex. 1-9 Sub. 1-14 | Ex. 1-10 Sub. 1-15 |
|---|---|---|---|---|---|---|---|
| Fiber blending | oriented crystallized PET-based synthetic resin short fibers 0.06 dtex × 3 mm | pbm | 50.0 | 49.0 | 56.0 | 57.0 | 56.0 |
| | Undrawn PET-based synthetic resin short fibers 0.2 dtex × 3 mm | pbm | 40.0 | 40.0 | 40.0 | 40.0 | 40.0 |
| | Fibrillated heat-resistant fibers | pbm | 4.5 | 4.5 | 4.0 | 3.0 | 4.0 |
| | Beaten melt spun cellulose fibers | pbm | 5.5 | 6.5 | 0.0 | 0.0 | 0.0 |
| Fibrillated heat-resistant fibers | Modified freeness | ml | 50 | 50 | 50 | 50 | 50 |
| | Mass-weighted average fiber length | mm | 0.58 | 0.58 | 0.58 | 0.58 | 0.58 |
| | Length-weighted average fiber length | mm | 0.33 | 0.33 | 0.33 | 0.33 | 0.33 |
| | Fiber width | μm | 15.5 | 15.5 | 15.5 | 15.5 | 15.5 |
| Linear pressure of heat calender | | kN/m | 100 | 100 | 100 | 100 | 100 |
| Physical properties | Basis weight of substrate | g/m² | 8 | 8 | 7 | 7 | 12 |
| | Thickness of substrate | μm | 11 | 11 | 10 | 10 | 18 |
| | Coating weight of coating layer | g/m² | 12 | 12 | 12 | 12 | 15 |
| | Thickness of separator | μm | 21 | 21 | 20 | 20 | 30 |
| Evaluation | Adhesion between substrate and coating layer | — | ○ | ○ | ○ | ○ | ○ |
| | Cuttability of separator | — | ○ | ○ | ○ | ○ | ○ |
| | Internal resistance | — | ◎ | ◎ | ◎ | ◎ | ○ |
| | Leakage current | — | ◎ | ◎ | ◎ | ◎ | ◎ |
| | Tensile strength | — | ○ | Δ | ○ | ○ | ◎ |

Ex.: Example
Sub.: Substrate
pbm: part by mass

TABLE 2

Table 1-2

| | | | C. Ex. 1-1 Sub. 1-5 | C. Ex. 1-2 Sub. 1-6 | C. Ex. 1-3 Sub. 1-7 | C. Ex. 1-4 Sub. 1-8 | C. Ex. 1-5 Sub. 1-10 | C. Ex. 1-6 Sub. 1-16 |
|---|---|---|---|---|---|---|---|---|
| Fiber blending | oriented crystallized PET-based synthetic resin short fibers 0.06 dtex × 3 mm | pbm | 60.0 | 55.0 | 50.0 | 55.5 | 60.0 | 50.0 |
| | Undrawn PET-based synthetic resin short fibers 0.2 dtex × 3 mm | pbm | 40.0 | 40.0 | 40.0 | 40.0 | 40.0 | 40.0 |
| | Fibrillated heat-resistant fibers | pbm | 0.0 | 5.0 | 10.0 | 4.5 | 0.0 | 10.0 |
| | Beaten melt spun cellulose fibers | pbm | 0.0 | 0.0 | 0.0 | 0.0 | 0.0 | 0.0 |
| Fibrillated heat-resistant fibers | Modified freeness | ml | — | 50 | 50 | 320 | — | 50 |
| | Mass-weighted average fiber length | mm | — | 0.58 | 0.58 | 1.30 | — | 0.58 |
| | Length-weighted average fiber length | mm | — | 0.33 | 0.33 | 0.59 | — | 0.33 |
| | Fiber width | μm | — | 15.5 | 15.5 | 25.2 | — | 15.5 |
| Linear pressure of heat calender | | kN/m | 100 | 120 | 175 | 100 | 100 | 120 |
| Physical properties | Basis weight of substrate | g/m² | 8 | 8 | 8 | 8 | 7 | 12 |
| | Thickness of substrate | μm | 11 | 11 | 11 | 11 | 10 | 18 |
| | Coating weight of coating layer | g/m² | 12 | 12 | 12 | 12 | 12 | 15 |
| | Thickness of separater | μm | 21 | 21 | 21 | 21 | 20 | 30 |
| Evaluation | Adhesion between substrate and coating layer | | ○ | Δ | Δ | ○ | ○ | Δ |
| | Cuttability of separator | | ○ | Δ | X | Δ | ○ | X |
| | Internal resistance | | ◎ | Δ | X | ○ | ◎ | ○ |
| | Leakage current | | Δ | ◎ | ◎ | Δ | X | ◎ |
| | Tensile strength | | ○ | ○ | Δ | ○ | ○ | ○ |

C. Ex.: Comparative Example
Sub.: Substrate
pbm: part by mass

The substrates manufactured in Examples 1-1 to 1-10 contained the fibrillated heat-resistant fibers (I) and the synthetic resin short fibers, and the content of the fibrillated heat-resistant fibers (I) was not less than 1.0 mass to less than 5.0 mass % based on the total of all the fiber components contained in the substrate. The separators having the respective substrates of Examples 1-1 to 1-10 and the inorganic particle layer had high adhesion between the substrate and the inorganic particle layer and excellent cuttability. Further, they had low internal resistance and little leakage current, and especially the separators of Examples 1-1 to 1-9 had excellent strength characteristic though the substrates had a small thickness of not more than 15 μm.

The substrates of Examples 1-6 and 1-7 contained fibers other than the fibrillated heat-resistant fibers (I) and the synthetic resin short fibers. From comparison between Example 1-6 and Example 1-7, the substrate of Example 1-6 having a synthetic resin short fiber content of not less than 90.0 mass % was superior in strength characteristic.

Since the substrates of Comparative Examples 1-1 and 1-5 did not contain the fibrillated heat-resistant fibers (I), when the basis weight of the substrate was reduced, a leakage current was apt to be produced.

The substrates of Comparative Examples 1-2 and 1-3 contained the fibrillated heat-resistant fibers (I) and the synthetic resin short fibers, and the content of the fibrillated heat-resistant fibers (I) was not less than 5.0 mass % based on the total of all the fiber components contained in the substrate. Therefore, as the coating solution hardly permeated the substrate, adhesion between the substrate and the inorganic particle layer lowered. In the evaluation of cuttability, a large amount of fluff remained on the edge surfaces. Further, it was found that the linear pressure had to be raised to control the thickness of the substrate to a predetermined value by heat calender, thereby making it difficult to reduce the thickness of the substrate. As a result, the internal resistance of the battery deteriorated. In Comparative Example 1-3, the substrate creased at the time of coating as tensile strength also lowered, and the separator shrank in width or was broken as tension could not be controlled in the step of laminating an electrode.

Since the substrate of Comparative Example 1-4 did not contain the fibrillated heat-resistant fibers (I) and contained only the fibrillated heat-resistant fibers (II), cuttability was low and fluff was slightly seen on the edge surfaces. The leakage current deteriorated.

Although the substrates of Examples 1-10 and Comparative Example 1-6 had a thickness of 18 μm, the content of the fibrillated heat-resistant fibers (I) was 4.0 mass % in the substrate of Example 1-10 and 10.0 mass % in the substrate of Comparative Example 1-6. In the case of a thick substrate, even when the content of the fibrillated heat-resistant fibers (I) was not less than 5.0 mass %, internal resistance was low. Although the substrates of Example 1-8 and Comparative Example 1-3 had a thickness of 10 to 11 µm, the content of the fibrillated heat-resistant fibers (I) was 4.0 mass % in the substrate of Example 1-8 and 10.0 mass % in the substrate of Comparative Example 1-3. In the case of a thin substrate, as the content of the fibrillated heat-resistant fibers (I) was less than 5.0 mass %, internal resistance became low.

Example 2

Example 2-1

<Manufacture of Substrate>
55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of fibrillated heat-resistant fibers obtained by fibrillating a pulp-like product of wholly aromatic polyamide fibers (average fiber length of 1.7 mm, average fiber diameter of 10 µm) to a modified freeness of up to 350 ml with a high-pressure homogenizer and 3.5 parts by mass of fibrillated heat-resistant fibers obtained by fibrillating a pulp-like product of wholly aromatic polyamide fibers to a modified freeness of up to 50 ml with a high-pressure homogenizer were dispersed in water with a pulper to prepare homogeneous papermaking slurry having a concentration of 0.5 mass %, and a wet paper web was obtained by using an inclination type paper machine and dried with a cylinder drier having a surface temperature of 135° C. to obtain a sheet. The obtained sheet was calendered with a heat calender having a steel roll plated with chromium and having a surface temperature of 195° C. as one of the rolls and a resin roll having a hardness of Shore A92 as the other roll and a linear pressure of 100 kN/m to manufacture a substrate 2-1 having a basis weight of 10 g/m$^2$ and a thickness of 15 µm.
<Preparation of Coating Solution>
100 parts of boehmite having a volume average particle diameter of 0.9 µm and a specific surface area of 5.5 m$^2$/g was mixed with 120 parts of a 0.3° aqueous solution of a carboxymethyl cellulose sodium salt having a viscosity at 25° C. of a 1 mass % aqueous solution thereof of 200 mPa·s and fully stirred, and then the resulting solution was mixed with 300 parts of a 0.5% aqueous solution of a carboxymethyl cellulose sodium salt having a viscosity at 25° C. of a 1 mass % aqueous solution thereof of 7,000 mPa·s and 10 parts of a commercially available styrene butadiene rubber (SBR)-based binder for lithium ion batteries (TRD2001 of JSR Corporation) (solid concentration of 48%) and stirred to prepare a coating solution.
<Manufacture of Separator>
The coating solution was applied to one side of the above substrate 2-1 with a kiss reverse gravure coater to a coating weight of 12 g/m$^2$ and dried to manufacture a separator having an inorganic particle layer.

Example 2-2

A substrate 2-2 having a basis weight of 10 g/m$^2$ and a thickness of 15 µm was manufactured in the same manner as the substrate 2-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.5 parts by mass of fibrillated wholly aromatic polyamide fibers having a modified freeness of 350 ml and 1.0 part by mass of fibrillated wholly aromatic polyamide fibers having a modified freeness of 50 ml were used. Then, the coating solution prepared in Example 2-1 was applied to a coating weight of 12 g/m$^2$ in the same manner as in Example 2-1 and dried to manufacture a separator.

Example 2-3

A substrate 2-3 having a basis weight of 10 g/m$^2$ and a thickness of 15 µm was manufactured in the same manner as the substrate 2-1 except that 58.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 1.0 part by mass of fibrillated wholly aromatic polyamide fibers having a modified freeness of 350 ml and 1.0 part by mass of fibrillated wholly aromatic polyamide fibers having a modified freeness of 50 ml were used. Then, the coating solution prepared in Example 2-1 was applied to a coating weight of 12 g/m$^2$ in the same manner as in Example 2-1 and dried to manufacture a separator.

Example 2-4

A substrate 2-4 having a basis weight of 9 g/m$^2$ and a thickness of 14 µm was manufactured in the same manner as the substrate 2-1 except that 54.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 3.5 parts by mass of fibrillated wholly aromatic polyamide fibers having a modified freeness of 50 ml were used. Then, the coating solution prepared in Example 2-1 was applied to a coating weight of 12 g/m$^2$ in the same manner as in Example 2-1 and dried to manufacture a separator.

Example 2-5

A substrate 2-5 having a basis weight of 7 g/m$^2$ and a thickness of 11 µm was manufactured in the same manner as the substrate 2-1 except that 51.2 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.9 parts by mass of fibrillated wholly aromatic polyamide fibers having a modified freeness of 350 ml and 4.9 parts by mass of fibrillated wholly aromatic polyamide fibers having a modified freeness of 50 ml were used and heat calender was carried out at a steel roll surface temperature of 195° C. and a linear pressure of 110 kN/m to make the substrate uniform in thickness. Then, the coating solution prepared in Example 2-1 was applied to a coating weight of 12 g/m$^2$ in the same manner as in Example 2-1 and dried to manufacture a separator.

Example 2-6

A substrate 2-6 having a basis weight of 7 g/m$^2$ and a thickness of 11 µm was manufactured in the same as the substrate 2-1 except that 54.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 3.5 parts by mass of fibrillated polyarylate fibers obtained by fibrillating cut fibers (average fiber length of 3.0 mm, average fiber diameter of 20 μm) of polyarylate fibers (wholly aromatic polyester fibers) to a modified freeness of up to 250 ml with a high-pressure homogenizer were used. Then, the coating solution prepared in Example 2-1 was applied to a coating weight of 12 g/m² in the same manner as in Example 2-1 and dried to manufacture a separator.

Comparative Example 2-1

A substrate 2-7 having a basis weight of 7 g/m² and a thickness of 10 μm was manufactured in the same manner as the substrate 2-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for binders having a fineness of 0.2 dtex and a fiber length of 3 mm were used. Then, the coating solution prepared in Example 2-1 was applied to a coating weight of 12 g/m² in the same manner as in Example 2-1 and dried to manufacture a separator.

Example 2-7

A substrate 2-8 having a basis weight of 7 g/m² and a thickness of 11 μm was manufactured in the same manner as the substrate 2-1 except that 52.5 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 2.5 parts by mass of fibrillated wholly aromatic polyamide fibers having a modified freeness of 350 ml and 5.0 parts by mass of fibrillated wholly aromatic polyamide fibers having a modified freeness of 50 ml were used and heat calender was carried out at a steel roll surface temperature of 195° C. and a linear pressure of 120 kN/m to make the substrate uniform in thickness. Then, the coating solution prepared in Example 2-1 was applied to a coating weight of 12 g/m² in the same manner as in Example 2-1 and dried to manufacture a separator.

Example 2-8

A substrate 2-9 having a basis weight of 7 g/m² and a thickness of 11 μm was manufactured in the same manner as the substrate 2-1 except that 52.5 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 4.0 parts by mass of fibrillated wholly aromatic polyamide fibers having a modified freeness of 350 ml and 3.5 parts by mass of fibrillated heat-resistant fibers having a modified freeness of 50 ml were used and heat calender was carried out at a steel roll surface temperature of 195° C. and a linear pressure of 125 kN/m to make the substrate uniform in thickness. Then, the coating solution prepared in Example 2-1 was applied to a coating weight of 12 g/m² in the same manner as in Example 2-1 and dried to manufacture a separator.

Example 2-9

A substrate 2-10 having a basis weight of 7 g/m² and a thickness of 11 μm was manufactured in the same manner as the substrate 2-1 except that 50.8 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 4.1 parts by mass of fibrillated wholly aromatic polyamide fibers having a modified freeness of 350 ml and 5.1 parts by mass of fibrillated heat-resistant fibers having a modified freeness of 50 ml were used and heat calender was carried out at a steel roll surface temperature of 195° C. and a linear pressure of 135 kN/m to make the substrate uniform in thickness. Then, the coating solution prepared in Example 2-1 was applied to a coating weight of 12 g/m⁷ in the same manner as in Example 2-1 and dried to manufacture a separator.

Example 2-10

A substrate 2-11 having a basis weight of 7 g/m² and a thickness of 11 μm was manufactured in the same manner as the substrate 2-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short, fibers for binders having a fineness of 0.2 dtex and a fiber length of 3 mm, 3.5 parts by mass of fibrillated wholly aromatic polyamide fibers having a modified freeness of 350 ml, 4.5 parts by mass of fibrillated wholly aromatic polyamide fibers having a modified freeness of 50 ml and 2.0 parts by mass of solvent spun cellulose fibers obtained by refining solvent spun cellulose fibers having an average fiber diameter of 10 μm and a fiber length of 4 mm with a refiner and beating to a modified freeness of 90 ml were used. Then, the coating solution prepared in Example 2-1 was applied to a coating weight of 12 g/m² in the same manner as in Example 2-1 and dried to manufacture a separator.

Example 2-11

A substrate 2-13 having a basis weight of 7 g/m² and a thickness of 11 μm was manufactured in the same manner as the substrate 2-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm, 3.5 parts by mass of fibrillated wholly aromatic polyamide fibers having a modified freeness of 350 ml, 4.5 parts by mass of fibrillated wholly aromatic polyamide fibers having a modified freeness of 50 ml and 3.0 parts by mass of solvent spun cellulose fibers obtained by refining solvent spun cellulose fibers having an average fiber diameter of 10 μm and a fiber length of 4 mm with a refiner and beating to a modified freeness of 90 ml were used. Then, the coating solution prepared in Example 2-1 was applied to a coating weight of 12 g/m² in the same manner as in Example 2-1 and dried to manufacture a separator.

Example 2-12

A substrate 2-14 having a basis weight of 6 g/m² and a thickness of 10 μm was manufactured by using the papermaking slurry of Example 2-1 in the same manner as the substrate 2-1. Then, the coating solution prepared in Example 2-1 was applied to a coating weight of 12 g/m² in the same manner as in Example 2-1 and dried to manufacture a separator.

Comparative Example 2-2

A substrate 2-12 having a basis weight of 6 g/m² and a thickness of 10 μm was manufactured in the same manner as the substrate 2-1 except that heat calender was carried out by using the papermaking slurry of Comparative Example 2-1 at a steel roll surface temperature of 195° C. and a linear pressure of 90 kN/m to make the substrate uniform in thickness. Then, the coating solution prepared in Example 2-1 was applied to a coating weight of 12 g/m² in the same manner as in Example 2-1 and dried to manufacture a separator.

Comparative Example 2-3

A substrate 2-15 having a basis weight of 7 g/m² and a thickness of 11 μm was manufactured in the same manner as the substrate 2-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm and 8.9 parts by mass of fibrillated wholly aromatic polyamide fibers having a modified freeness of 350 ml were used and heat calender was carried out at a steel roll surface temperature of 195° C. and a linear pressure of 175 kN/m to make the substrate uniform in thickness. Then, the coating solution prepared in Example 2-1 was applied to a coating weight of 12 g/m² in the same manner as in Example 2-1 and dried to manufacture a separator.

Comparative Example 2-4

A substrate 2-16 having a basis weight of 7 g/m² and a thickness of 11 μm was manufactured in the same manner as the substrate 2-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for binders having a fineness of 0.2 dtex and a fiber length of 3 mm and 8.9 parts by mass of fibrillated heat-resistant fibers having a modified freeness of 50 ml were used and heat calender was carried out at a steel roll surface temperature of 195° C. and a linear pressure of 160 kN/m to make the substrate uniform in thickness. Then, the coating solution prepared in Example 2-1 was applied to a coating weight of 12 g/m² in the same manner as in Example 2-1 and dried to manufacture a separator.

TABLE 3

Table 2-1

| | | | Ex. 2-1 Sub. 2-1 | Ex. 2-2 Sub. 2-2 | Ex. 2-3 Sub. 2-3 | Ex. 2-4 Sub. 2-4 | Ex. 2-5 Sub. 2-5 | Ex. 2-6 Sub. 2-6 |
|---|---|---|---|---|---|---|---|---|
| Fiber blending | oriented crystallized PET-based synthetic resin short fibers 0.06 dtex × 3 mm | Pbm | 55.5 | 55.5 | 58.0 | 54.0 | 51.2 | 54.0 |
| | Undrawn PET-based synthetic resin short fibers 0.2 dtex × 3 mm | Pbm | 40.0 | 40.0 | 40.0 | 40.0 | 40.0 | 40.0 |
| | Fibrillated heat-resistant fibers (I) | Pbm | 3.5 | 1.0 | 1.0 | 3.5 | 4.9 | 3.5 |
| | Fibrillated heat-resistant fibers (II) | Pbm | 1.0 | 3.5 | 1.0 | 2.5 | 3.9 | 2.5 |
| | Beaten melt spun cellulose fibers | Pbm | 0.0 | 0.0 | 0.0 | 0.0 | 0.0 | 0.0 |
| Fibrillated heat-resistant fibers (I) | Modified freeness | ml | 50 | 50 | 50 | 50 | 50 | 250 |
| | Mass-weighted average fiber length | mm | 0.58 | 0.58 | 0.58 | 0.58 | 0.58 | 0.82 |
| | Length-weighted average fiber length | mm | 0.33 | 0.33 | 0.33 | 0.33 | 0.33 | 0.45 |
| | Fiber width | μm | 15.5 | 15.5 | 15.5 | 15.5 | 15.5 | 19.5 |
| Fibrillated heat-resistant fibers (II) | Modified freeness | ml | 350 | 350 | 350 | 350 | 350 | 350 |
| | Mass-weighted average fiber length | mm | 1.30 | 1.30 | 1.30 | 1.30 | 1.30 | 1.30 |
| | Length-weighted average fiber length | mm | 0.59 | 0.59 | 0.59 | 0.59 | 0.59 | 0.59 |
| | Fiber width | μm | 25.2 | 25.2 | 25.2 | 25.2 | 25.2 | 25.2 |
| Linear pressure of heat calender | | kN/m | 100 | 100 | 100 | 100 | 110 | 100 |
| Physical properties | Basis weight of substrate | g/m² | 10 | 10 | 10 | 9 | 7 | 7 |
| | Thickness of substrate | μm | 15 | 15 | 15 | 14 | 11 | 11 |
| | Coating weight of coating layer | g/m² | 12 | 12 | 12 | 12 | 12 | 12 |
| | Thickness of separator | μm | 25 | 25 | 25 | 24 | 21 | 21 |

TABLE 3-continued

| Evaluation | Adhesion between substrate and coating layer | — | ○ | ○ | ○ | ○ | ○ | ○ |
|---|---|---|---|---|---|---|---|---|
| | Cuttability of separator | — | ○ | ○ | ○ | ○ | ○ | ○ |
| | Internal resistance | — | ◎ | ◎ | ◎ | ○ | ○ | ○ |
| | Leakage current | — | ◎ | ◎ | ◎ | ◎ | ◎ | ○ |
| | Tensile strength | — | ◎ | ◎ | ◎ | ○ | ○ | ○ |

| | | | Ex. 2-7 Sub. 2-8 | Ex. 2-8 Sub. 2-9 | Ex. 2-9 Sub. 2-10 | Ex. 2-10 Sub. 2-11 | Ex. 2-11 Sub. 2-13 | Ex. 2-12 Sub. 2-14 |
|---|---|---|---|---|---|---|---|---|
| Fiber Blending | oriented crystallized PET-based synthetic resin short fibers 0.06 dtex × 3 mm | pbm | 52.5 | 52.5 | 50.8 | 50.0 | 49.0 | 55.5 |
| | Undrawn PET-based synthetic resin short fibers 0.2 dtex × 3 mm | pbm | 40.0 | 40.0 | 40.0 | 40.0 | 40.0 | 40.0 |
| | Fibrillated heat-resistant fibers (I) | pbm | 5.0 | 3.5 | 5.1 | 4.5 | 4.5 | 3.5 |
| | Fibrillated heat-resistant fibers (II) | pbm | 2.5 | 4.0 | 4.1 | 3.5 | 3.5 | 1.0 |
| | Beaten melt spun cellulose fibers | pbm | 0.0 | 0.0 | 0.0 | 2.0 | 3.0 | 0.0 |
| Fibrillated heat-resistant fibers (I) | Modified freeness | ml | 50 | 50 | 50 | 50 | 50 | 50 |
| | Mass-weighted average fiber length | mm | 0.58 | 0.58 | 0.58 | 0.58 | 0.58 | 0.58 |
| | Length-weighted average fiber length | mm | 0.33 | 0.33 | 0.33 | 0.33 | 0.33 | 0.33 |
| | Fiber width | μm | 15.5 | 15.5 | 15.5 | 15.5 | 15.5 | 15.5 |
| Fibrillated heat-resistant fibers (II) | Modified freeness | ml | 350 | 350 | 350 | 350 | 350 | 350 |
| | Mass-weighted average fiber length | mm | 1.30 | 1.30 | 1.30 | 1.30 | 1.30 | 1.30 |
| | Length-weighted average fiber length | mm | 0.59 | 0.59 | 0.59 | 0.59 | 0.59 | 0.59 |
| | Fiber width | μm | 25.2 | 25.2 | 25.2 | 25.2 | 25.2 | 25.2 |
| Linear pressure of heat calender | | kN/m | 120 | 125 | 135 | 100 | 100 | 100 |
| Physical properties | Basis weight of substrate | g/m$^2$ | 7 | 7 | 7 | 7 | 7 | 6 |
| | Thickness of substrate | μm | 11 | 11 | 11 | 11 | 11 | 10 |
| | Coating weight of coating layer | g/m$^2$ | 12 | 12 | 12 | 12 | 12 | 12 |
| | Thickness of separator | μm | 21 | 21 | 21 | 21 | 21 | 20 |
| Evaluation | Adhesion between substrate and coating layer | — | △ | △ | △ | ○ | ○ | ○ |
| | Cuttability of separator | — | △ | △ | △ | ○ | ○ | ○ |
| | Internal resistance | — | △ | △ | △ | ○ | ○ | ◎ |
| | Leakage current | — | ◎ | ◎ | ◎ | ◎ | ◎ | ◎ |
| | Tensile strength | — | ○ | ○ | △ | ○ | △ | ○ |

Ex.: Example
Sub.: Substrate
pbm: part by mass

TABLE 4

Table 2-2

| | | | C. Ex. 2-1 Sub. 2-7 | C. Ex. 2-2 Sub. 2-12 | C. Ex. 2-3 Sub. 2-15 | C. Ex. 2-4 Sub. 2-16 |
|---|---|---|---|---|---|---|
| Fiber blending | oriented crystallized PET-based synthetic resin short fibers 0.06 dtex × 3 mm | pbm | 60.0 | 60.0 | 51.1 | 51.1 |
| | Undrawn PET-based synthetic resin short fibers 0.2 dtex × 3 mm | pbm | 40.0 | 40.0 | 40.0 | 40.0 |

TABLE 4-continued

|  |  |  |  |  |  |  |
|---|---|---|---|---|---|---|
|  | Fibrillated heat-resistant fibers (I) | pbm | 0.0 | 0.0 | 0.0 | 8.9 |
|  | Fibrillated heat-resistant fibers (II) | pbm | 0.0 | 0.0 | 8.9 | 0.0 |
|  | Beaten melt spun cellulose fibers | pbm | 0.0 | 0.0 | 0.0 | 0.0 |
| Fibrillated heat-resistant fibers (I) | Modified freeness | ml | — | — | — | 50 |
|  | Mass-weighted average fiber length | mm | — | — | — | 0.58 |
|  | Length-weighted average fiber length | mm | — | — | — | 0.33 |
|  | Fiber width | μm | — | — | — | 15.5 |
| Fibrillated heat-resistant fibers (II) | Modified freeness | ml | — | — | 350 | — |
|  | Mass-weighted average fiber length | mm | — | — | 1.30 | — |
|  | Length-weighted average fiber length | mm | — | — | 0.59 | — |
|  | Fiber width | μm | — | — | 25.2 | — |
| Linear pressure of heat calender |  | kN/m | 100 | 90 | 175 | 160 |
| Physical properties | Basis weight of substrate | g/m² | 7 | 6 | 7 | 7 |
|  | Thickness of substrate | μm | 10 | 10 | 11 | 11 |
|  | Coating weight of coating layer | g/m² | 12 | 12 | 12 | 12 |
|  | Thickness of separator | μm | 20 | 20 | 20 | 20 |
| Evaluation | Adhesion between substrate and coating layer | — | ○ | ○ | X | Δ |
|  | Cuttability of separator | — | ○ | ○ | X | X |
|  | Internal resistance | — | ◉ | ◉ | X | X |
|  | Leakage current | — | X | X | ○ | ◉ |
|  | Tensile strength | — | ○ | ○ | Δ | Δ |

C. Ex.: Comparative Example
Sub.: Substrate
pbm: part by mass

The substrates manufactured in Examples 2-1 to 2-12 contained the fibrillated heat-resistant fibers (I), the fibrillated heat-resistant fibers (II) and the synthetic resin short fibers, had high adhesion to the inorganic particle layer and was excellent in cuttability. Further, internal resistance was low, a leakage current was little, and strength characteristic was excellent.

Out of the substrates manufactured in Examples 2-1 to 2-12, the substrates of Examples 2-1 to 2-8 and Example 2-12 having a total content of the fibrillated heat-resistant fibers (I) and the fibrillated heat-resistant fibers (II) of not less than 2.0 mass % to less than 9.0 mass % based on the total of all the fiber components contained in the substrates were excellent in strength characteristic. The separators having the respective substrates of Examples 2-1 to 2-6 and Example 2-12 having a total content of the fibrillated heat-resistant fibers (I) and the fibrillated heat-resistant fibers (II) of not less than 2.0 mass % to less than 9.0 mass %, a content of the fibrillated heat-resistant fibers (I) of not less than 1.0 mass % to less than 5.0 mass % and a content of the fibrillated heat-resistant fibers (II) of not less than 1.0 mass % to less than 4.0 mass % and the inorganic particle layer had high adhesion between the substrate and the inorganic particle layer and excellent cuttability. Further, they had low internal resistance, little leakage current and excellent strength characteristic though the substrates had a small thickness of not more than 15 μm.

Out of the substrates manufactured in Examples 2-1 to 2-12, the substrate of Example 2-7 contained the fibrillated heat-resistant fibers (I), the fibrillated heat-resistant fibers (II) and the synthetic resin short fibers and had a total content of the fibrillated heat-resistant fibers (I) and the fibrillated heat-resistant fibers (II) of not less than 2.0 mass % to less than 9.0 mass % and a content of the fibrillated heat-resistant fibers (I) of not less than 5.0 mass % based on the total of all the fiber components contained in the substrate. Therefore, as the coating solution hardly permeated the substrate, adhesion between the substrate and the inorganic particle layer lowered. In the evaluation of cuttability, fluff slightly remained on the edge surfaces. Further, it was found that the linear pressure had to be raised at the time of controlling the thickness of the substrate to a predetermined value by heat calender, thereby making it difficult to reduce the thickness of the substrate. As a result, the internal resistance of the battery deteriorated.

Out of the substrates manufactured in Examples 2-1 to 2-12, the substrate of Example 2-8 contained the fibrillated heat-resistant fibers (I), the fibrillated heat-resistant fibers (II) and the synthetic resin short fibers and had a total content of the fibrillated heat-resistant fibers (I) and the fibrillated heat-resistant fibers (II) of not less than 2.0 mass % to less than 9.0 mass % and a content of the fibrillated heat-resistant fibers (II) of not less than 4.0 mass % based on the total of all the fiber components contained in the substrate. From comparison between Example 2-5 and Example 2-8, when the fibrillated heat-resistant fibers (IT) were contained in an amount of not less than 4.0 mass %, a large number of thick stem fibers remained, whereby the coating solution hardly permeated the substrate, thereby reducing adhesion between the substrate and the inorganic particle layer. In the evaluation of cuttability, a large amount of fluff remained on the edge surfaces. Further, it was found that the linear pressure had to be raised at the time of controlling the thickness of the substrate to a predetermined value by heat calender, thereby making it difficult to reduce the thickness of the substrate. As a result, the internal resistance of the battery deteriorated.

Out of the substrates manufactured in Examples 2-1 to 2-12, in Example 2-9, the total content of the fibrillated heat-resistant fibers (I) and the fibrillated heat-resistant fibers (IT) was not less than 9.0 mass %, the content of the fibrillated heat-resistant fibers (I) was not less than 5.0 mass %, and the content of the fibrillated heat-resistant fibers (II) was not less than 4.0 mass % based on the total of all the fiber components contained in the substrate. In this case, the coating solution rarely permeated the substrate, whereby adhesion between the substrate and the inorganic particle layer lowered. In the evaluation of cuttability, a large amount of fluff remained on the edge surfaces. Further, it was found that the linear pressure had to be raised to a higher value than those of Examples 2-7 and Example 2-8 in which the total content of the fibrillated heat-resistant fibers (I) and the fibrillated heat-resistant fibers (II) was not less than 2.0 mass % to less than 9.0 mass % at the time of controlling the thickness of the substrate to a predetermined value by heat calender, thereby making it difficult to reduce the thickness of the substrate. As a result, the internal resistance of the battery deteriorated. Further, tensile strength lowered.

Out of the substrates manufactured in Examples 2-1 to 2-12, the substrates of Examples 2-10 and 2-11 contained fibers other than the fibrillated heat-resistant fibers and the synthetic resin short fibers. From comparison between Example 2-10 and Example 2-11, the substrate of Example 2-10 having a content of the synthetic resin short fibers of not less than 90.0 mass % was superior in strength characteristic to the substrate of Example 2-11 having a content of the synthetic resin short fibers of less than 90.0 mass %.

Since the substrates of Comparative Examples 2-1 and 2-2 did not contain heat-resistant fibers, when the basis weight of the substrate was reduced, a leakage current was apt to be produced.

The substrate of Comparative Example 2-3 contained only the fibrillated heat-resistant fibers (II) as the heat-resistant fibers, the substrate of Comparative Example 2-4 contained only the fibrillated heat-resistant fibers (I) as the heat-resistant fibers, and both of the substrates had a content of the heat-resistant fibers of 8.9 mass %. Although the content of the fibrillated heat-resistant fibers was not less than 2.0 mass % to less than 9.0 mass %, when the substrate contained only one of these fibrillated heat-resistant fibers, adhesion between the substrate and the inorganic particle layer lowered (Comparative Example 2-3) and fluff remained on the edge surface in the evaluation of cuttability (Comparative Examples 2-3 and 2-4). Further, it was found that the linear pressure had to be raised at the time of controlling the thickness of the substrate to a predetermined value by heat calender, thereby making it difficult to reduce the thickness of the substrate (Comparative Examples 2-3 and 2-4). As a result, the internal resistance of the battery further deteriorated (Comparative Examples 2-3 and 2-4).

Example 3

Example 3-1

<Manufacture of Substrate>

55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of fibrid made of para-aromatic polyamide having a modified freeness of 88 ml obtained by defibrating and beating with a high-speed homogenizer and 3.5 parts by mass of fibrillated heat-resistant fibers obtained by fibrillating a pulp-like product of wholly aromatic polyamide fibers to a modified freeness of up to 50 ml with a high-pressure homogenizer as heat-resistant fibers were dispersed in water with a pulper to prepare homogeneous papermaking slurry having a concentration of 0.1 mass %, and a wet paper web was obtained by using an inclination type paper machine and dried with a cylinder drier having a surface temperature of 135° C. to obtain a sheet. The obtained sheet was thermally calendered with a heat calender having a steel roll plated with chromium and having a surface temperature of 195° C. as one of the rolls and a resin roll having a hardness of Shore A92 as the other roll and a linear pressure of 100 kN/m to produce a substrate 3-1 having a basis weight of 10 g/m$^2$ and a thickness of 15 μm.

<Preparation of Coating Solution>

100 parts of boehmite having a particle diameter of 0.9 μm and a specific surface area of 5.5 m$^2$/g was mixed with 120 parts of a 0.3% aqueous solution of a carboxymethyl cellulose sodium salt having a viscosity at 25° C. of a 1 mass % aqueous solution thereof of 200 mPa s and fully stirred, and then the resulting solution was mixed with 300 parts of a 0.5% aqueous solution of a carboxymethyl cellulose sodium salt having a viscosity at 25° C. of a 1 mass % aqueous solution thereof of 7,000 mPa·s and 10 parts of a styrene butadiene rubber (SBR)-based binder for lithium ion batteries (TRD2001 of JSR Corporation) (solid concentration of 48%) and stirred to prepare a coding solution.

<Manufacture of Separator>

The coating solution was applied to one side of the above substrate 3-1 with a kiss reverse gravure coater to a coating weight of 12 g/m$^2$ and dried to manufacture a separator having an inorganic particle layer.

Example 3-2

A substrate 3-2 having a basis weight of 10 g/m$^2$ and a thickness of 15 μm was manufactured in the same manner as the substrate 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 3-1 and 2.5 parts by mass of the fibrillated heat-resistant fibers used in Example 3-1 were used. Then, the coating solution prepared in Example 3-1 was applied to a coating weight of 12 g/m$^2$ in the same manner as in Example 3-1 and dried to manufacture a separator.

Example 3-3

A substrate 3-3 having a basis weight of 10 g/m$^2$ and a thickness of 15 μm was manufactured in the same manner as the substrate 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.5 parts by mass of the fibrid used in Example 3-1 and 2.0 parts by mass of the fibrillated heat-resistant fibers used in Example 3-1 were used. Then, the coating solution prepared in Example 3-1 was applied LU a coating weight of 12 g/m$^2$ in the same manner as in Example 3-1 and dried to manufacture a separator.

Example 3-4

A substrate 3-4 having a basis weight of 10 g/m$^2$ and a thickness of 15 μm was manufactured in the same manner as the substrate 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 3.5 parts by mass of the fibrid used in Example 3-1 and 1.0 parts by mass of the fibrillated heat-resistant fibers used in Example 3-1 were used. Then, the coating solution prepared in Example 3-1 was applied to a coating weight of 12 g/m² in the same manner as in Example 3-1 and dried to manufacture a separator.

Example 3-5

A substrate 3-5 having a basis weight of 10 g/m² and a thickness of 15 μm was manufactured in the same manner as the substrate 3-1 except that 59.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 3-1 and 0.6 parts by mass of the fibrillated heat-resistant fibers used in Example 3-1 were used. Then, the coating solution prepared in Example 3-1 was applied to a coating weight of 12 g/m² in the same manner as in Example 3-1 and dried to manufacture a separator.

Example 3-6

A substrate 3-6 having a basis weight of 8 g/m² and a thickness of 12 μm was manufactured in the same manner as the substrate 3-1 except that 56.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 1.0 part by mass of the fibrid used in Example 3-1 and 2.5 parts by mass of the fibrillated heat-resistant fibers used in Example 3-1 were used. Then, the coating solution prepared in Example 3-1 was applied to a coating weight of 12 g/m² in the same manner as in Example 3-1 and dried to manufacture a separator.

Example 3-7

A substrate 3-7 having a basis weight of 6 g/m² and a thickness of 9 μm was manufactured in the same manner as the substrate 3-1 except that 55.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 1.0 part by mass of the fibrid used in Example 3-1 and 3.9 parts by mass of the fibrillated heat-resistant fibers used in Example 3-1 were used. Then, the coating solution prepared in Example 3-1 was applied to a coating weight of 12 g/m² in the same manner as in Example 3-1 and dried to manufacture a separator.

Example 3-8

A substrate 3-8 having a basis weight of 8 g/m² and a thickness of 12 μm was manufactured in the same manner as the substrate 3-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 3-1, 2.5 parts by mass of the fibrillated heat-resistant fibers used in Example 3-1 and 5.5 parts by mass of solvent spun cellulose fibers obtained by refining solvent spun cellulose fibers having an average fiber diameter of 10 μm and a fiber length of 4 mm with a refiner and beating to a modified freeness of 90 ml were used. Then, the coating solution prepared in Example 3-1 was applied to a coating weight of 12 g/m² in the same manner as in Example 3-1 and dried to manufacture a separator.

Example 3-9

A substrate 3-9 having a basis weight of 8 g/m² and a thickness of 12 μm was manufactured in the same manner as the substrate 3-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 3-1, 2.5 parts by mass of the fibrillated heat-resistant fibers used in Example 3-1 and 6.5 parts by mass of the solvent spun cellulose fibers used in Example 3-8 were used. Then, the coating solution prepared in Example 3-1 was applied to a coating weight of 12 g/m² in the same manner as in Example 3-1 and dried to manufacture a separator.

Comparative Example 3-1

A substrate 3-10 having a basis weight of 10 g/m² and a thickness of 15 μm was manufactured in the same manner as the substrate 3-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used. Then, the coating solution prepared in Example 3-1 was applied to a coating weight of 12 g/m² in the same manner as in Example 3-1 and dried to manufacture a separator.

Comparative Example 3-2

A substrate 3-11 having a basis weight of 8 g/m² and a thickness of 12 μm was manufactured in the same manner as the substrate 3-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used. Then, the coating solution prepared in Example 3-1 was applied to a coating weight of 12 g/m² in the same manner as in Example 3-1 and dried to manufacture a separator.

Comparative Example 3-3

A substrate 3-12 having a basis weight of 6 g/m² and a thickness of 9 μm was manufactured in the same manner as the substrate 3-1 except that 55.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.5 parts by mass of the fibrid used in Example 3-1 and 2.5 parts by mass of the fibrillated heat-resistant fibers used in Example 3-1 were used. Then, the coating solution prepared in Example 3-1 was applied to a coating weight of 12 g/m² in the same manner as in Example 3-1 and dried to manufacture a separator.

Comparative Example 3-4

A substrate 3-13 having a basis weight of 8 g/m² and a thickness of 12 μm was manufactured in the same manner as the substrate 3-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 2.0 parts by mass of fibrid made of para-aromatic polyamide having a modified freeness of 310 ml and 2.5 parts by mass of fibrillated heat-resistant fibers having a modified freeness of 320 ml were used and heat calender was carried out at a steel roll surface temperature of 95° C. and a linear pressure of 120 kN/m to make the substrate uniform in thickness. Then, the coating solution prepared in Example 3-1 was applied to a coating weight of 12 g/m² in the same manner as in Example 3-1 and dried to manufacture a separator.

TABLE 5

Table 3-1

| | | | Ex. 3-1 Sub. 3-1 | Ex. 3-2 Sub. 3-2 | Ex. 3-3 Sub. 3-3 | Ex. 3-4 Sub. 3-4 | Ex. 3-5 Sub. 3-5 |
|---|---|---|---|---|---|---|---|
| Fiber blending | oriented crystallized PET-based synthetic resin short fibers 0.06 dtex × 3 mm | pbm | 55.5 | 55.5 | 55.5 | 55.5 | 59.0 |
| | Undrawn PET-based synthetic resin short fibers 0.2 dtex × 3 mm | pbm | 40.0 | 40.0 | 40.0 | 40.0 | 40.0 |
| | Fibrillated heat-resistant fibers | pbm | 3.5 | 2.5 | 2.0 | 1.0 | 0.6 |
| | Fibrid | pbm | 1.0 | 2.0 | 2.5 | 3.5 | 0.4 |
| | Beaten melt spun cellulose fibers | pbm | 0.0 | 0.0 | 0.0 | 0.0 | 0.0 |
| | Content of heat-resistant fibers having a modified freeness of not more than 300 ml | mass % | 4.5 | 4.5 | 4.5 | 4.5 | 1.0 |
| Fibrillated heat-resistant fibers | Modified freeness | ml | 50 | 50 | 50 | 50 | 50 |
| | Mass-weighted average fiber length | mm | 0.58 | 0.58 | 0.58 | 0.58 | 0.58 |
| | Length-weighted average fiber length | mm | 0.33 | 0.33 | 0.33 | 0.33 | 0.33 |
| | Fiber width | μm | 15.5 | 15.5 | 15.5 | 15.5 | 15.5 |
| Fibrid | Modified freeness | ml | 88 | 88 | 88 | 88 | 88 |
| | Mass-weighted average fiber length | mm | 0.52 | 0.52 | 0.52 | 0.52 | 0.52 |
| | Length-weighted average fiber length | mm | 0.32 | 0.32 | 0.32 | 0.32 | 0.32 |
| | Fiber width | μm | 24.1 | 24.1 | 24.1 | 24.1 | 24.1 |
| Linear pressure of heat calender | | kN/m | 100 | 100 | 100 | 100 | 100 |
| Physical properties | Basis weight of substrate | g/m² | 10 | 10 | 10 | 10 | 10 |
| | Thickness of substrate | μm | 15 | 15 | 15 | 15 | 15 |
| | Coating weight of coating layer | g/m² | 12 | 12 | 12 | 12 | 12 |
| | Thickness of separator | μm | 25 | 25 | 25 | 25 | 25 |
| Evaluation | Adhesion between substrate and coating layer | — | ◯ | ◯ | ◯ | ◯ | ◯ |
| | Cuttability of separator | — | ◯ | ◯ | ◯ | ◯ | ◯ |
| | Internal resistance | — | ◉ | ◉ | ◯ | Δ | ◉ |
| | Leakage current | — | ◉ | ◉ | ◉ | ◉ | ◉ |
| | Tensile strength | — | ◉ | ◉ | ◉ | ◉ | ◉ |

Ex.: Example
Sub.: Substrate
pbm: part by mass

TABLE 6

Table 3-2

| | | | Ex. 3-6 Sub. 3-6 | Ex. 3-7 Sub. 3-7 | Ex. 3-8 Sub. 3-8 | Ex. 3-9 Sub. 3-9 |
|---|---|---|---|---|---|---|
| Fiber-blending | oriented crystallized PET-based synthetic resin short fibers 0.06 dtex × 3 mm | pbm | 56.5 | 55.1 | 50.0 | 49.0 |
| | Undrawn PET-based synthetic resin short fibers 0.2 dtex × 3 mm | pbm | 40.0 | 40.0 | 40.0 | 40.0 |

TABLE 6-continued

| | | | | | | |
|---|---|---|---|---|---|---|
| | Fibrillated heat-resistant fibers | pbm | 2.5 | 3.9 | 2.5 | 2.5 |
| | Fibrid | pbm | 1.0 | 1.0 | 2.0 | 2.0 |
| | Beaten melt spun cellulose fibers | pbm | 0.0 | 0.0 | 5.5 | 6.5 |
| | Content of heat-resistant fibers having a modified freeness of not more than 300 ml | mass % | 3.5 | 4.9 | 4.5 | 4.5 |
| Fibrillated heat-resistant fibers | Modified freeness | ml | 50 | 50 | 50 | 50 |
| | Mass-weighted average fiber length | mm | 0.58 | 0.58 | 0.58 | 0.58 |
| | Length-weighted average fiber length | mm | 0.33 | 0.33 | 0.33 | 0.33 |
| | Fiber width | μm | 15.5 | 15.5 | 15.5 | 15.5 |
| Fibrid | Modified freeness | ml | 88 | 88 | 88 | 88 |
| | Mass-weighted average fiber length | mm | 0.52 | 0.52 | 0.52 | 0.52 |
| | Length-weighted average fiber length | mm | 0.32 | 0.32 | 0.32 | 0.32 |
| | Fiber width | μm | 24.1 | 24.1 | 24.1 | 24.1 |
| Linear pressure of heat calender | | kN/m | 100 | 100 | 100 | 100 |
| Physical properties | Basis weight of substrate | g/m² | 8 | 6 | 8 | 8 |
| | Thickness of substrate | μm | 12 | 9 | 12 | 12 |
| | Coating weight of coating layer | g/m² | 12 | 12 | 12 | 12 |
| | Thickness of separator | μm | 22 | 19 | 22 | 22 |
| Evaluation | Adhesion between substrate and coating layer | — | ○ | ○ | ○ | ○ |
| | Cuttability of separator | — | ○ | ○ | ○ | ○ |
| | Internal resistance | — | ◎ | ◎ | ◎ | ◎ |
| | Leakage current | — | ◎ | ◎ | ◎ | ◎ |
| | Tensile strength | — | ○ | ○ | ○ | Δ |

Ex.: Example
Sub.: Substrate
pbm: part by mass

TABLE 7

Table 3-3

| | | | C. Ex. 3-1 Sub. 3-10 | C. Ex. 3-2 Sub. 3-11 | C. Ex. 3-3 Sub. 3-12 | C. Ex. 3-4 Sub. 3-13 |
|---|---|---|---|---|---|---|
| Fiber blending | oriented crystallized PET-based synthetic resin short fibers 0.06 dtex × 3 mm | pbm | 60.0 | 60.0 | 55.0 | 55.5 |
| | Undrawn PET-based synthetic resin short fibers 0.2 dtex × 3 mm | pbm | 40.0 | 40.0 | 40.0 | 40.0 |
| | Fibrillated heat-resistant fibers | pbm | 0.0 | 0.0 | 2.5 | 2.5 |
| | Fibrid | pbm | 0.0 | 0.0 | 2.5 | 2.0 |
| | Beaten melt spun cellulose fibers | pbm | 0 | 0 | 0 | 0 |
| | Content of heat-resistant fibers having a modified freeness of not more than 300 ml | mass % | 0.0 | 0.0 | 5.0 | 0.0 |
| Fibrillated heat-resistant fibers | Modified freeness | ml | — | — | 50 | 320 |
| | Mass-weighted average fiber length | mm | — | — | 0.58 | 1.30 |
| | Length-weighted average fiber length | mm | — | — | 0.33 | 0.59 |
| | Fiber width | μm | — | — | 15.5 | 25.2 |
| Fibrid | Modified freeness | ml | — | — | 88 | 310 |
| | Mass-weighted average fiber length | mm | — | — | 0.52 | 0.78 |

TABLE 7-continued

|  |  |  |  |  |  |  |
|---|---|---|---|---|---|---|
|  | Length-weighted average fiber length | mm | — | — | 0.32 | 0.56 |
|  | Fiber width | μm | — | — | 24.1 | 31.2 |
| Linear pressure of heat calender |  | kN/m | 100 | 100 | 100 | 120 |
| Physical properties | Basis weight of substrate | g/m² | 10 | 8 | 6 | 8 |
|  | Thickness of substrate | μm | 15 | 12 | 9 | 12 |
|  | Coating weight of coating layer | g/m² | 12 | 12 | 12 | 12 |
|  | Thickness of separator | μm | 25 | 22 | 19 | 22 |
| Evaluation | Adhesion between substrate and coating layer | — | ○ | ○ | Δ | Δ |
|  | Cuttability of separator | — | ○ | ○ | ○ | Δ |
|  | Internal resistance | — | ○ | ◎ | Δ | Δ |
|  | Leakage current | — | Δ | X | ○ | Δ |
|  | Tensile strength | — | ◎ | ○ | ○ | Δ |

C. Ex.: Comparative Example
Sub.: Substrate
pbm: part by mass

The substrates manufactured in Examples 3-1 to 3-9 which contained heat-resistant fibers and synthetic resin short fibers contained the fibrillated heat-resistant fibers (I) and the fibrid as the heat-resistant fibers and had a total content of the fibrillated heat-resistant fibers (I) and the fibrid of not less than 1.0 mass % to less than 5.0 mass based on the total of all the fiber components contained in the substrate. The separators having the respective substrates of Examples 3-1 to 3-9 and the inorganic particle layer had high adhesion between the substrate and the coating layer and excellent cuttability. They had low internal resistance and little leakage current. Although the substrates were as thin as not more than 15 μm, they had excellent strength characteristic. Especially the substrates of Examples 3-6 and 3-7 had a content of the fibrillated heat-resistant fibers (I) of 71 mass % and 80 mass % based on the total of the fibrillated heat-resistant fibers (I) and the fibrid, respectively, the number of fiber networks increased, and the fibrid firmly bonded the fiber networks together. Although the basis weights of the substrates were only 8 g/m² and 6 g/m², respectively, the evaluation results of internal resistance and leakage current were satisfactory, and strength characteristic could be maintained.

It was found from comparison between Examples 3-1 to 3-2 and Examples 3-3 to 3-4 that, when the basis weight of the substrate was 10 g/m², in Examples 3-1 and 3-2 in which the ratio of the content of the fibrillated heat-resistant fibers (I) to the total content of the fibrillated heat-resistant fibers (I) and the fibrid was higher, internal resistance was lower and satisfactory.

The substrates of Examples 3-8 and 3-9 contained fibers other than the fibrillated heat-resistant fibers (I), the fibrid and the synthetic resin short fibers. From comparison between Examples 3-8 and Example 3-9, the substrate of Example 3-8 in which the content of the synthetic resin short fibers was not less than 90.0 mass % was superior in strength characteristic.

Since the substrates of Comparative Examples 3-1 and 3-2 did not contain heat-resistant fibers, when the basis weight of the substrate was reduced, a leakage current was apt to be produced.

Although the substrate of Comparative Example 3-3 had a basis weight of 6 g/m² and a total content of the fibrillated heat-resistant fibers (I) and the fibrid of more than 5 mass %, adhesion between the substrate and the coating layer, internal resistance and strength characteristic deteriorated.

Since the modified freeness's of the fibrillated heat-resistant fibers and fibrid of the substrate of Comparative Example 3-4 exceeded 300 ml, the fiber width of the fibrid and the fiber diameter of the stem part of each of the fibrillated heat-resistant fibers were large, whereby the dispersibility of the fibers and entanglement between the fibers became worse, thereby deteriorating the texture of the substrate. As a result, adhesion between the substrate and the coating layer and the cuttability, internal resistance and leakage current of the separator deteriorated. The strength characteristic of the substrate also became worse.

Example 4

Example 4-1

<Manufacture of Substrate>

55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 1.0 part by mass of fibrid made of para-aromatic polyamide having a modified freeness of 88 ml obtained by defibrating and beating with a high-speed homogenizer, 1.0 part by mass of fibrillated heat-resistant fibers (II) obtained by fibrillating a pulp-like product (average fiber length of 1.7 mm, average fiber diameter of 10 μm) of para-aromatic polyamide fibers to a modified freeness of up to 350 ml with a high-pressure homogenizer and 2.5 parts by mass of fibrillated heat-resistant fibers (I) obtained by fibrillating a pulp-like product (average fiber length of 1.7 mm, average fiber diameter of 10 μm) of para-aromatic polyamide fibers to a modified freeness of up to 50 ml with a high-pressure homogenizer as heat-resistant fibers were dispersed in water with a pulper to prepare homogeneous papermaking slurry having a concentration of 0.1 mass %, and a wet paper web was obtained by using an inclination type paper machine and dried with a cylinder drier having a surface temperature of 135° C. to obtain a sheet. The obtained sheet was calendered with a heat calender having a steel roll plated with chromium and having a surface temperature of 195° C. as one of the rolls and a resin roll having a hardness of Shore A92 as the other roll and a linear pressure of 100 kN/m to produce a substrate 4-1 having a basis weight of 10 g/m² and a thickness of 15 μm.

<Preparation of Coating Solution>

100 parts of boehmite having a D50 particle diameter of 0.9 μm and a specific surface area of 5.5 m/g was mixed with 120 parts of a 0.3% aqueous solution of a carboxymethyl cellulose sodium salt having a viscosity at 25° C. of a 1 mass % aqueous solution thereof of 200 mPa·s and fully stirred, and then the resulting solution was mixed with 300 parts of a 0.5% aqueous solution of a carboxymethyl cellulose sodium salt having a viscosity at 25° C. of a 1 mass % aqueous solution thereof of 7,000 mPa·s and 10 parts of a styrene butadiene rubber (SBR)-based binder for lithium ion batteries (TRD2001 of JSR Corporation) (solid concentration of 48%) and stirred to prepare a coating solution.

<Manufacture of Separator>

The coating solution was applied to one side of the above substrate 4-1 with a kiss reverse gravure coater to a coating weight of 12 g/m² and dried to manufacture a separator having an inorganic particle layer.

Example 4-2

A substrate 4-2 having a basis weight of 10 g/m² and a thickness of 15 μm was manufactured in the same manner as the substrate 4-1 except that 55.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 3.5 parts by mass of the fibrillated heat-resistant fibers (II) used in Example 4-1 and 0.6 part by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-3

A substrate 4-3 having a basis weight of 10 g/m² and a thickness of 15 μm was manufactured in the same manner as the substrate 4-1 except that 58.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 1.0 part by mass of the fibrillated heat-resistant fibers (II) used in Example 4-1 and 0.6 part by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-4

A substrate 4-4 having a basis weight of 8 g/m² and a thickness of 12 μm was manufactured in the same manner as the substrate 4-1 except that 55.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 1.0 part by mass of the fibrid used in Example 4-1, 1.5 parts by mass of the fibrillated heat-resistant fibers (II) used in Example 4-1 and 2.5 parts by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-5

A substrate 4-5 having a basis weight of 6 g/m² and a thickness of 9 μm was manufactured in the same manner as the substrate 4-1 except that 51.6 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 3.9 parts by mass of the fibrillated heat-resistant fibers (II) used in Example 4-1 and 2.5 parts by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-6

A substrate 4-6 having a basis weight of 6 g/m² and a thickness of 9 μm was manufactured in the same manner as the substrate 4-1 except that 52.6 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 2.5 parts by mass of the fibrillated heat-resistant fibers (II) used in Example 4-1 and 4.5 parts by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4.7

A substrate 4-7 having a basis weight of 6 g/m² and a thickness of 9 μm was manufactured in the same manner as the substrate 4-1 except that 52.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.5 parts by mass of the fibrid used in Example 4-1, 2.5 parts by mass of the fibrillated heat-resistant fibers (II) used in Example 4-1 and 2.5 parts by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-8

A substrate 4-8 having a basis weight of 6 g/m² and a thickness of 9 μm was manufactured in the same manner as the substrate 4-1 except that 51.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 4.0 parts by mass of the fibrillated heat-resistant fibers (II) used in Example 4-1 and 2.5 parts by mass of the fibrillated heat-resistant fibers (I) used in Example 4-1 were used and heat calender was carried out at a steel roll surface temperature of 195° C. and a linear pressure of 110 kN/m to make the substrate uniform in thickness. Then, the coating solution prepared in Example 4-1 was applied to a coating weight of 12 g/m² in the same manner as in Example 4-1 and dried to manufacture a separator.

Example 4-9

A substrate 4-9 having a basis weight of 6 g/m² and a thickness of 9 μm was manufactured in the same manner as the substrate 4-1 except that 52.5 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 0.4 part by mass of the fibrid used in Example 4-1, 2.5 parts by mass of the fibrillated heat-resistant fibers (II) used in Example 4-1 and 4.6 parts by mass of the fibrillated heat-resistant fibers (I) used in Example 4-1 were used. Then, the coating solution prepared in Example 4-1 was applied to a coating weight of 12 g/m² in the same manner as in Example 4-1 and dried to manufacture a separator.

Example 4-10

A substrate 4-10 having a basis weight of 6 g/m² and a thickness of 9 μm was manufactured in the same manner as the substrate 4-1 except that 51.4 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.5 parts by mass of the fibrid used in Example 4-1, 1.5 parts by mass of the fibrillated heat-resistant fibers (II) used in Example 4-1 and 4.6 parts by mass of the fibrillated heat-resistant fibers (I) used in Example 4-1 were used and heat calender was carried out at a steel roll surface temperature of 195° C. and a linear pressure of 110 kN/m to make the substrate uniform in thickness. Then, the coating solution prepared in Example 4-1 was applied to a coating weight of 12 g/m² in the same manner as in Example 4-1 and dried to manufacture a separator.

Example 4-11

A substrate 4-11 having a basis weight of 7 g/m² and a thickness of 11 μm was manufactured in the same manner as the substrate 4-1 except that 50.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 2.5 parts by mass of the fibrillated heat-resistant fibers (II) used in Example 4-1, 2.5 parts by mass of the fibrillated heat-resistant fibers (I) used in Example 4-1 and 3.0 parts by mass of solvent spun cellulose fibers obtained by refining solvent spun cellulose fibers having an average fiber diameter of 10 μm and a fiber length of 4 mm with a refiner and beating to a modified freeness of 90 ml were used. Then, the coating solution prepared in Example 4-1 was applied to a coating weight of 12 g/m² in the same manner as in Example 4-1 and dried to manufacture a separator.

Example 4-12

A substrate 4-12 having a basis weight of 7 g/m² and a thickness of 11 μm was manufactured in the same manner as the substrate 4-1 except that 49.0 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.0 parts by mass of the fibrid used in Example 4-1, 2.5 parts by mass of the fibrillated heat-resistant fibers (II) used in Example 4-1, 2.5 parts by mass of the fibrillated heat-resistant fibers (I) used in Example 4-1 and 4.0 parts by mass of the solvent spun cellulose fibers used in Example 4-11 were used. Then, the coating solution prepared in Example 4-1 was applied to a coating weight of 12 g/m² in the same manner as in Example 4-1 and dried to manufacture a separator.

Comparative Example 4-1

A substrate 4-13 having a basis weight of 8 g/m² and a thickness of 12 μm was manufactured in the same manner as the substrate 4-1 except that 60.0 parts by mass of oriented crystallized PET-based synthetic resin short fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used. Then, the coating solution prepared in Example 4-1 was applied to a coating weight of 12 g/m² in the same manner as in Example 4-1 and dried to manufacture a separator.

Comparative Example 4-2

A substrate 4-14 having a basis weight of 6 g/m² and a thickness of 9 μm was manufactured in the same manner as the substrate 4-1 except that 60.0 parts by mass of oriented crystallized PET-based synthetic resin snort fibers having a fineness of 0.06 dtex and a fiber length of 3 mm and 40.0 parts by mass of undrawn PET-based synthetic resin short fibers for single-component binders having a fineness of 0.2 dtex and a fiber length of 3 mm (softening point of 120° C., melting point of 230° C.) were used. Then, the coating solution prepared in Example 4-1 was applied to a coating weight of 12 g/m² in the same manner as in Example 4-1 and dried to manufacture a separator.

Comparative Example 4-3

A substrate 4-15 having a basis weight of 6 g/m² and a thickness of 9 μm was manufactured in the same manner as the substrate 4-1 except that 50.9 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm, 2.4 parts by mass of the fibrid used in Example 4-1, 3.9 parts by mass of the fibrillated heat-resistant fibers (II) used in Example 4-1 and 2.8 parts by mass of the fibrillated heat-resistant fibers (I) used in Example 4-1 were used and heat calender was carried out at a steel roll surface temperature of 195° C. and a linear pressure of 120 kN/m to make the substrate uniform in thickness. Then, the coating solution prepared in Example 4-1 was applied to a coating weigh of 12 g/m² in the same manner as in Example 4-1 and dried to manufacture a separator.

Comparative Example 4-4

A substrate 4-16 having a basis weight of 6 g/m² and a thickness of 9 μm was manufactured in the same manner as the substrate 4-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrid used in Example 4-1 were used. Then, the coating solution prepared in Example 4-1 was applied to a coating weight of 12 g/m² in the same manner as in Example 4-1 and dried to manufacture a separator.

Comparative Example 4-5

A substrate 4-1.7 having a basis weight of 6 g/m² and a thickness of 9 μm was manufactured in the same manner as the substrate 4-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrillated heat-resistant fibers (II) used in Example 4-1 were used and heat calender was carried out at a steel roll surface temperature of 195° C. and a linear pressure of 120 kN/m to make the substrate uniform in thickness. Then, the coating solution prepared in Example 4-1 was applied to a coating weight of 12 g/m² in the same manner as in Example 4-1 and dried to manufacture a separator.

Comparative Example 4-6

A substrate 4-18 having a basis weight of 6 g/m² and a thickness of 9 μm was manufactured in the same manner as the substrate 4-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.) and 8.9 parts by mass of the fibrillated heat-resistant fibers (I) used in Example 4-1 were used and heat calender was carried out at a steel roll surface temperature of 195° C. and a linear pressure of 120 kN/m to make the substrate uniform in thickness. Then, the coating solution prepared in Example 4-1 was applied to a coating weight of 12 g/m² in the same manner as in Example 4-1 and dried to manufacture a separator.

Comparative Example 4-7

A substrate 4-19 having a basis weight of 6 g/m² and a thickness of 9 μm was manufactured in the same manner as the substrate 4-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 3.9 parts by mass of the fibrid used in Example 4-1 and 5.0 parts by mass of the fibrillated heat-resistant fibers (I) used in Example 4-1 were used and heat calender was carried out at a steel roll surface temperature of 195° C. and a linear pressure of 120 kN/m to make the substrate uniform in thickness. Then, the coating solution prepared in Example 4-1 was applied to a coating weight of 12 g/m² in the same manner as in Example 4-1 and dried to manufacture a separator.

Comparative Example 4-8

A substrate 4-20 having a basis weight of 6 g/m² and a thickness of 9 μm was manufactured in the same manner as the substrate 4-1 except that 51.1 parts by mass of oriented crystallized PET-based synthetic resin short fibers having a fineness of 0.06 dtex and a fiber length of 3 mm, 40.0 parts by mass of undrawn PET-based synthetic resin short fibers for single-component binders having a fineness of 0.2 dtex and a fiber length of 3 mm (softening point of 120° C., melting point of 230° C.), 3.9 parts by mass of the fibrid used in Example 4-1 and 5.0 parts by mass of the fibrillated heat-resistant fibers (II) used in Example 4-1 were used and heat calender was carried out at a steel roll surface temperature of 195° C. and a linear pressure of 120 kN/m to make the substrate uniform in thickness. Then, the coating solution prepared in Example 4-1 was applied to a coating weight of 12 g/m² in the same manner as in Example 4-1 and dried to manufacture a separator.

TABLE 8

Table 4-1

| | | | Ex. 4-1 Sub. 4-1 | Ex. 4-2 Sub. 4-2 | Ex. 4-3 Sub. 4-3 | Ex. 4-4 Sub. 4-4 | Ex. 4-5 Sub. 4-5 | Ex. 4-6 Sub. 4-6 |
|---|---|---|---|---|---|---|---|---|
| Fiber blending | oriented crystallized PET-based synthetic resin short fibers 0.06 dtex × 3 mm | pbm | 55.5 | 55.5 | 58.0 | 55.0 | 51.6 | 52.6 |
| | Undrawn PET-based synthetic resin short fibers 0.2 dtex × 3 mm | pbm | 40.0 | 40.0 | 40.0 | 40.0 | 40.0 | 40.0 |
| | Fibrillated heat-resistant fibers (I) | pbm | 2.5 | 0.6 | 0.6 | 2.5 | 2.5 | 4.5 |

TABLE 8-continued

Table 4-1

| | | | Ex. 4-1 Sub. 4-1 | Ex. 4-2 Sub. 4-2 | Ex. 4-3 Sub. 4-3 | Ex. 4-4 Sub. 4-4 | Ex. 4-5 Sub. 4-5 | Ex. 4-6 Sub. 4-6 |
|---|---|---|---|---|---|---|---|---|
| | Fibrillated heat-resistant fibers (II) | pbm | 1.0 | 3.5 | 1.0 | 1.5 | 3.9 | 2.5 |
| | Fibrid | pbm | 1.0 | 0.4 | 0.4 | 1.0 | 2.0 | 0.4 |
| | heat-resistant fiber | pbm | 4.5 | 4.5 | 2.0 | 5.0 | 8.4 | 7.4 |
| | Beaten melt spun cellulose fibers | pbm | 0.0 | 0.0 | 0.0 | 0.0 | 0.0 | 0.0 |
| Fibrillated heat-resistant fibers (I) | Modified freeness | ml | 50 | 50 | 50 | 50 | 50 | 50 |
| | Mass-weighted average fiber length | mm | 0.58 | 0.58 | 0.58 | 0.58 | 0.58 | 0.58 |
| | Length-weighted average fiber length | mm | 0.33 | 0.33 | 0.33 | 0.33 | 0.33 | 0.33 |
| | Fiber width | μm | 15.5 | 15.5 | 15.5 | 15.5 | 15.5 | 15.5 |
| Fibrillated heat-resistant fibers (II) | Modified freeness | ml | 350 | 350 | 350 | 350 | 350 | 350 |
| | Mass-weighted average fiber length | mm | 1.30 | 1.30 | 1.30 | 1.30 | 1.30 | 1.30 |
| | Length-weighted average fiber length | mm | 0.59 | 0.59 | 0.59 | 0.59 | 0.59 | 0.59 |
| | Fiber width | μm | 25.2 | 25.2 | 25.2 | 25.2 | 25.2 | 25.2 |
| Fibrid | Modified freeness | ml | 88 | 88 | 88 | 88 | 88 | 88 |
| | Mass-weighted average fiber length | mm | 0.52 | 0.52 | 0.52 | 0.52 | 0.52 | 0.52 |
| | Length-weighted average fiber length | mm | 0.32 | 0.32 | 0.32 | 0.32 | 0.32 | 0.32 |
| | Fiber width | μm | 24.1 | 24.1 | 24.1 | 24.1 | 24.1 | 24.1 |
| Linear pressure of heat calender | | kN/m | 100 | 100 | 100 | 100 | 100 | 100 |
| Physical properties | Basis weight of substrate | g/m² | 10 | 10 | 10 | 8 | 6 | 6 |
| | Thickness of substrate | μm | 15 | 15 | 15 | 12 | 9 | 9 |
| | Coating weight of coating layer | g/m² | 12 | 12 | 12 | 12 | 12 | 12 |
| | Thickness of separator | μm | 25 | 25 | 25 | 22 | 19 | 19 |
| Evaluation | Adhesion between substrate and coating layer | — | ○ | ○ | ○ | ○ | ○ | ○ |
| | Cuttability of separator | — | ○ | ○ | ○ | ○ | ○ | ○ |
| | Internal resistance | — | ◎ | ◎ | ◎ | ◎ | ◎ | ◎ |
| | Leakage current | — | ◎ | ◎ | ◎ | ◎ | ◎ | ◎ |
| | Tensile strength | — | ◎ | ◎ | ◎ | ○ | ○ | ○ |

Ex.: Example
Sub.: Substrate
pbm: part by mass

TABLE 9

Table 4-2

| | | | Ex. 4-7 Sub. 4-7 | Ex. 4-8 Sub. 4-8 | Ex. 4-9 Sub. 4-9 | Ex. 4-10 Sub. 4-10 | Ex. 4-11 Sub. 4-11 | Ex. 4-12 Sub. 4-12 |
|---|---|---|---|---|---|---|---|---|
| Fiber blending | oriented crystallized PET-based synthetic resin short fibers 0.06 dtex × 3 mm | pbm | 52.5 | 51.5 | 52.5 | 51.4 | 50.0 | 49.0 |
| | Undrawn PET-based synthetic resin short fibers 0.2 dtex × 3 mm | pbm | 40.0 | 40.0 | 40.0 | 40.0 | 40.0 | 40.0 |

TABLE 9-continued

Table 4-2

|  |  |  | Ex. 4-7 Sub. 4-7 | Ex. 4-8 Sub. 4-8 | Ex. 4-9 Sub. 4-9 | Ex. 4-10 Sub. 4-10 | Ex. 4-11 Sub. 4-11 | Ex. 4-12 Sub. 4-12 |
|---|---|---|---|---|---|---|---|---|
|  | Fibrillated heat-resistant fibers (I) | pbm | 2.5 | 2.5 | 4.6 | 4.6 | 2.5 | 2.5 |
|  | Fibrillated heat-resistant fibers (II) | pbm | 2.5 | 4.0 | 2.5 | 1.5 | 2.5 | 2.5 |
|  | Fibrid | pbm | 2.5 | 2.0 | 0.4 | 2.5 | 2.0 | 2.0 |
|  | heat-resistant fiber | pbm | 7.5 | 8.5 | 7.5 | 8.6 | 7.0 | 7.0 |
|  | Beaten melt spun cellulose fibers | pbm | 0.0 | 0.0 | 0.0 | 0.0 | 3.0 | 4.0 |
| Fibrillated heat-resistant fibers (I) | Modified freeness | ml | 50 | 50 | 50 | 50 | 50 | 50 |
|  | Mass-weighted average fiber length | mm | 0.58 | 0.58 | 0.58 | 0.58 | 0.58 | 0.58 |
|  | Length-weighted average fiber length | mm | 0.33 | 0.33 | 0.33 | 0.33 | 0.33 | 0.33 |
|  | Fiber width | μm | 15.5 | 15.5 | 15.5 | 15.5 | 15.5 | 15.5 |
| Fibrillated heat-resistant fibers (II) | Modified freeness | ml | 350 | 350 | 350 | 350 | 350 | 350 |
|  | Mass-weighted average fiber length | mm | 1.30 | 1.30 | 1.30 | 1.30 | 1.30 | 1.30 |
|  | Length-weighted average fiber length | mm | 0.59 | 0.59 | 0.59 | 0.59 | 0.59 | 0.59 |
|  | Fiber width | μm | 25.2 | 25.2 | 25.2 | 25.2 | 25.2 | 25.2 |
| Fibrid | Modified freeness | ml | 88 | 88 | 88 | 88 | 88 | 88 |
|  | Mass-weighted average fiber length | mm | 0.52 | 0.52 | 0.52 | 0.52 | 0.52 | 0.52 |
|  | Length-weighted average fiber length | mm | 0.32 | 0.32 | 0.32 | 0.32 | 0.32 | 0.32 |
|  | Fiber width | μm | 24.1 | 24.1 | 24.1 | 24.1 | 24.1 | 24.1 |
| Linear pressure of heat calender |  | kN/m | 100 | 110 | 100 | 110 | 100 | 100 |
| Physical properties | Basis weight of substrate | g/m² | 6 | 6 | 6 | 6 | 7 | 7 |
|  | Thickness of substrate | μm | 9 | 9 | 9 | 9 | 11 | 11 |
|  | Coating weight of coating layer | g/m² | 12 | 12 | 12 | 12 | 12 | 12 |
|  | Thickness of separator | μm | 19 | 19 | 19 | 19 | 21 | 21 |
| Evaluation | Adhesion between substrate and coating layer | — | ○ | ○ | △ | △ | ○ | ○ |
|  | Cuttability of separator | — | ○ | △ | ○ | ○ | ○ | ○ |
|  | Internal resistance | — | △ | ○ | ○ | △ | ◎ | ◎ |
|  | Leakage current | — | ◎ | ◎ | ◎ | ◎ | ◎ | ◎ |
|  | Tensile strength | — | ○ | ○ | ○ | ○ | ○ | △ |

Ex.: Example
Sub.: Substrate
pbm: part by mass

TABLE 10

Table 4-3

|  |  |  | C. Ex. 4-1 Sub. 4-13 | C. Ex. 4-2 Sub. 4-14 | C. Ex. 4-3 Sub. 4-15 | C. Ex. 4-4 Sub. 4-16 |
|---|---|---|---|---|---|---|
| Fiber blending | oriented crystallized PET-based synthetic resin short fibers 0.06 dtex × 3 mm | pbm | 60.0 | 60.0 | 50.9 | 51.1 |

TABLE 10-continued

Table 4-3

|  |  |  |  |  |  |  |
|---|---|---|---|---|---|---|
|  | Undrawn PET-based synthetic resin short fibers 0.2 dtex × 3 mm | pbm | 40.0 | 40.0 | 40.0 | 40.0 |
|  | Fibrillated heat-resistant fibers (I) | pbm | 0.0 | 0.0 | 2.8 | 0.0 |
|  | Fibrillated heat-resistant fibers (II) | pbm | 0.0 | 0.0 | 3.9 | 0.0 |
|  | Fibrid | pbm | 0.0 | 0.0 | 2.4 | 8.9 |
|  | heat-resistant fiber | pbm | 0.0 | 0.0 | 9.1 | 8.9 |
|  | Beaten melt spun cellulose fibers | pbm | 0.0 | 0.0 | 0.0 | 0.0 |
| Fibrillated heat-resistant fibers (I) | Modified freeness | ml | — | — | 50 | — |
|  | Mass-weighted average fiber length | mm | — | — | 0.58 | — |
|  | Length-weighted average fiber length | mm | — | — | 0.33 | — |
|  | Fiber width | μm | — | — | 15.5 | — |
| Fibrillated heat-resistant fibers (II) | Modified freeness | ml | — | — | 350 | — |
|  | Mass-weighted average fiber length | mm | — | — | 1.30 | — |
|  | Length-weighted average fiber length | mm | — | — | 0.59 | — |
|  | Fiber width | μm | — | — | 25.2 | — |
| Fibrid | Modified freeness | ml | — | — | 88 | 88 |
|  | Mass-weighted average fiber length | mm | — | — | 0.52 | 0.52 |
|  | Length-weighted average fiber length | mm | — | — | 0.32 | 0.32 |
|  | Fiber width | μm | — | — | 24.1 | 24.1 |
| Linear pressure of heat calender |  | kN/m | 100 | 100 | 120 | 100 |
| Physical properties | Basis weight of substrate | g/m² | 8 | 6 | 6 | 6 |
|  | Thickness of substrate | μm | 12 | 9 | 9 | 9 |
|  | Coating weight of coating layer | g/m² | 12 | 12 | 12 | 12 |
|  | Thickness of separator | μm | 21 | 19 | 19 | 19 |
| Evaluation | Adhesion between substrate and coating layer | — | ○ | ○ | X | X |
|  | Cuttability of separator | — | ○ | ○ | Δ | Δ |
|  | Internal resistance | — | ○ | ○ | X | X |
|  | Leakage current | — | X | X | ○ | ◎ |
|  | Tensile strength | — | ○ | ○ | Δ | ○ |

|  |  |  | C. EX. 4-5 Sub. 4-17 | C. Ex. 4-6 Sub. 4-18 | C. Ex. 4-7 Sub. 4-19 | C. Ex. 4-8 Sub. 4-20 |
|---|---|---|---|---|---|---|
| Fiber blending | oriented crystallized PET-based synthetic resin short fibers 0.06 dtex × 3 mm | pbm | 51.1 | 51.1 | 51.1 | 51.1 |
|  | Undrawn PET-based synthetic resin short fibers 0.2 dtex × 3 mm | pbm | 40.0 | 40.0 | 40.0 | 40.0 |
|  | Fibrillated heat-resistant fibers (I) | pbm | 0.0 | 8.9 | 5.0 | 0.0 |
|  | Fibrillated heat-resistant fibers (II) | pbm | 8.9 | 0.0 | 0.0 | 5.0 |

TABLE 10-continued

Table 4-3

| | | | | | | |
|---|---|---|---|---|---|---|
| | Fibrid | pbm | 0.0 | 0.0 | 3.9 | 3.9 |
| | heat-resistant fiber | pbm | 8.9 | 8.9 | 8.9 | 8.9 |
| | Beaten melt spun cellulose fibers | pbm | 0.0 | 0.0 | 0.0 | 0.0 |
| Fibrillated heat-resistant fibers (I) | Modified freeness | ml | — | 50 | 50 | — |
| | Mass-weighted average fiber length | mm | — | 0.58 | 0.58 | — |
| | Length-weighted average fiber length | mm | — | 0.33 | 0.33 | — |
| | Fiber width | μm | — | 15.5 | 15.5 | — |
| Fibrillated heat-resistant fibers (II) | Modified freeness | ml | 350 | — | — | 350 |
| | Mass-weighted average fiber length | mm | 1.30 | — | — | 1.30 |
| | Length-weighted average fiber length | mm | 0.59 | — | — | 0.59 |
| | Fiber width | μm | 25.2 | — | — | 25.2 |
| Fibrid | Modified freeness | ml | — | — | 88 | 88 |
| | Mass-weighted average fiber length | mm | — | — | 0.52 | 0.52 |
| | Length-weighted average fiber length | mm | — | — | 0.32 | 0.32 |
| | Fiber width | μm | — | — | 24.1 | 24.1 |
| Linear pressure of heat calender | | kN/m | 120 | 120 | 120 | 120 |
| Physical properties | Basis weight of substrate | g/m² | 6 | 6 | 6 | 6 |
| | Thickness of substrate | μm | 9 | 9 | 9 | 9 |
| | Coating weight of coating layer | g/m² | 12 | 12 | 12 | 12 |
| | Thickness of separator | μm | 19 | 19 | 19 | 19 |
| Evaluation | Adhesion between substrate and coating layer | — | Δ | Δ | X | Δ |
| | Cuttability of separator | — | X | X | X | Δ |
| | Internal resistance | — | X | X | X | X |
| | Leakage current | — | ○ | ◎ | ◎ | ○ |
| | Tensile strength | — | Δ | Δ | Δ | Δ |

C. Ex.: Comparative Example
Sub.: Substrate
pbm: part by mass

The substrates manufactured in Examples 4-1 to 4-12 contained the fibrillated heat-resistant fibers (I), the fibrillated heat-resistant fibers (II), the fibrid and synthetic resin short fibers, and the total content of the fibrillated heat-resistant fibers (I) and (II) and the fibrid was not less than 2.0 mass % to less than 9.0 mass % based on the total of all the fiber components contained in the substrates. The separators having the respective substrates of Examples 4-1 to 4-12 and the inorganic particle layer had high adhesion between the substrate and the inorganic particle layer and excellent cuttability. Further, they had low internal resistance, little leakage current and excellent strength characteristic though the substrates were as thin as not more than 15 μm. The separators having the respective substrates of Examples 4-1 to 4-6 and Examples 4-11 to 4-12 in which the total content of the fibrillated heat-resistant fibers (I) and (II) and the fibrid was not less than 2.0 mass % to less than 9.0 mass %, the content of the fibrid was not less than 0.4 mass % to less than 2.5 mass %, the content of the fibrillated heat-resistant fibers (II) was not less than 1.0 mass % to less than 4.0 mass % and the content of the fibrillated heat-resistant fibers (I) was not less than 0.6 mass % to less than 4.6 mass % and the inorganic particle layer had high adhesion between the substrate and the inorganic particle layer and excellent cuttability. Further, they had low internal resistance, little leakage current and excellent strength characteristic though the substrate was as thin as 15 μm.

Out of the substrates manufactured in Examples 4-1 to 4-12, the substrate of Example 4-7 had a total content of the fibrillated heat-resistant fibers (I) and (II) and the fibrid of not less than 2.0 mass % to less than 9.0 mass %, a content of the fibrillated heat-resistant fibers (I) of not less than 0.6 mass % to less than 4.6 mass % and a content of the fibrillated heat-resistant fibers (II) of not less than 1.0 mass % to less than 4.0 mass % but a content of the fibrid of not less than 2.5 mass %. Therefore, the separator including the substrate was excellent in leakage current but slightly deteriorated in internal resistance.

Out of the substrates manufactured in Examples 4-1 to 4-12, the substrate of Example 4-8 had a total content of the fibrillated heat-resistant fibers (I) and (II) and the fibrid of not less than 2.0 mass % to less than 9.0 mass %, a content of the fibrillated heat-resistant fibers (I) of not less than 0.6 mass % to less than 4.6 mass % and a content of the fibrid of not less than 0.4 mass % to less than 2.5 mass % but a content of the fibrillated heat-resistant fibers (II) of not less than 4.0 mass %. Therefore, as a large number of thick para-aromatic polyamide stem fibers remained, fluff slightly remained on the edge surfaces. Further, it was found that a high linear pressure had to be applied at the time of controlling the thickness of the substrate to a predetermined value by heat calender, thereby making it difficult to reduce the thickness of the substrate. Since the basis weight was 6 g/m$^2$, internal resistance was satisfactory.

Out of the substrates manufactured in Examples 4-1 to 4-12, the substrate of Example 4-9 had a total content of the fibrillated heat-resistant fibers (I) and (II) and the fibrid of not less than 2.0 mass % to less than 9.0 mass %, a content of the fibrid of not less than 0.4 mass % to less than 2.5 mass % and a content of the fibrillated heat-resistant fibers (II) of not less than 1.0 mass % to less than 4.0 mass % but a content of the fibrillated heat-resistant fibers (I) of not less than 4.6 mass %. The total content of the fibrid and the fibrillated heat-resistant fibers (I) was not less than 5.0 mass %. Therefore, as the coating solution hardly permeated the substrate, adhesion between the substrate and the inorganic particle layer lowered.

Out of the substrates manufactured in Examples 4-1 to 4-12, the substrate of Example 10 had a total content of the fibrillated heat-resistant fibers (I) and (II) and the fibrid of not less than 2.0 mass % to less than 9.0 mass %, a content of the fibrillated heat-resistant fibers (II) of not less than 1.0 mass % to less than 4.0 mass % but a content of the fibrid of not less than 2.5 mass % and a content of the fibrillated heat-resistant fibers (I) of not less than 4.6 mass %. Therefore, as the coating solution hardly permeated the substrate, adhesion between the substrate and the inorganic particle layer lowered. Further, since the total content of the fibrid and the fibrillated heat-resistant fibers (I) was not less than 5.0 mass %, internal resistance deteriorated though the basis weight was only 6 g/m$^2$.

The substrates of Examples 4-11 and 4-12 contained fibers other than the fibrid, the fibrillated heat-resistant fibers (II), the fibrillated heat-resistant fibers (I) and the synthetic resin short fibers. From comparison between Example 4-11 and Example 4-12, the substrate of Example 4-11 having a content of the synthetic resin short fibers of not less than 90.0 mass % was superior in strength characteristic.

Since the substrates of Comparative Examples 4-1 and 4-2 did not contain the fibrillated heat-resistant fibers (I) and (II) and the fibrid, when the basis weight of the substrate was reduced, a leakage current became worse.

In Comparative Example 4-3, the content of the fibrillated heat-resistant fibers (I) was not less than 0.6 mass % to less than 4.6 mass %, the content of the fibrillated heat-resistant fibers (II) was not less than 1.0 mass % to less than 4.0 mass %, the content of the fibrid was not less than 0.4 mass % to less than 2.5 mass %, and the total content of the fibrillated heat-resistant fibers (I) and (II) and the fibred exceeded 9.0 mass %. Therefore, as the coating solution hardly permeated the substrate, adhesion between the substrate and the coating solution lowered. In the evaluation of cuttability, fluff slightly remained on the edge surfaces. Further, it was found that a high linear pressure had to be applied at the time of controlling the thickness of the substrate to a predetermined value by heat calender, thereby making it difficult to reduce the thickness of the substrate. As a result, internal resistance deteriorated.

In Comparative Example 4-4, only the fibrid was contained in an amount of 8.9 mass %. Although the total content of the heat-resistant fibers was not less than 2.0 mass % to less than 9.0 mass, when only the fibrid was contained, the coating solution hardly permeated the substrate, thereby reducing adhesion between the substrate and the coating solution. In the evaluation of cuttability, fluff slightly remained on the edge surface. Since the fibrous form of the fibrid was thin leaf-like, internal resistance deteriorated.

In Comparative Example 4-5, only the fibrillated heat-resistant fibers (II) were contained in an amount of 8.9 mass %. Although the total content of the heat-resistant fibers was not less than 2.0 mass % to less than 9.0 mass %, when only the fibrillated heat-resistant fibers (II) were contained, the coating solution hardly permeated the substrate, thereby reducing adhesion between the substrate and the coating solution. Since a large number of thick stem fibers of the fibrillated heat-resistant fibers (II) remained, cutting was difficult and fluff remained on the edge surfaces. Further, it was found that a high linear pressure had to be applied at the time of controlling the thickness of the substrate to a predetermined value by heat calender, thereby making it difficult to reduce the thickness of the substrate. As a result, internal resistance deteriorated. Since there are a large number of thick stem fibers of the fibrillated heat-resistant fibers (II), a fiber network became weak, thereby deteriorating strength characteristic.

In Comparative Example 4-6, only the fibrillated heat-resistant fibers (I) were contained in an amount of 8.9 mass %. Although the total content of the heat-resistant fibers was not less than 2.0 mass % to less than 9.0 mass %, when only the fibrillated heat-resistant fibers (I) were contained, the number of fine fibrillated fibers greatly increased, whereby the coating solution hardly permeated the substrate with the result that adhesion between the substrate and the coating solution lowered, cutting was difficult, and fluff remained on the edge surfaces. Further, it was found that a high linear pressure had to be applied at the time of controlling the thickness of the substrate to a predetermined value by heat calender, thereby making it difficult to reduce the thickness of the substrate. As a result, internal resistance deteriorated. Since the number of fine fibril fibers increased too much, bonding between fibers became loose, thereby deteriorating strength characteristic.

In Comparative Example 4-7, 5.0 mass % of the fibrillated heat-resistant fibers (I) and 3.9 mass % of the fibrid were contained. Although the total content of the heat-resistant fibers was not less than 2.0 mass % to less than 9.0 mass %, the coating solution hardly permeated the substrate, whereby adhesin between the substrate and the coating solution lowered, cutting was difficult, and fluff remained on the edge surfaces. Further, it was found that a high linear pressure had to be applied at the time of controlling the thickness of the substrate to a predetermined value by heat calender, thereby making it difficult to reduce the thickness of the substrate. As a result, internal resistance deteriorated. Since the number of fine fibril fibers increased too much, bonding between fibers became loose, thereby deteriorating strength characteristic.

In Comparative Example 4-8, 5.0 mass % of the fibrillated heat-resistant fibers (II) and 3.9 mass % of the fibrid were contained. Although the total content of the heat-resistant fibers was not less than 2.0 mass % to less than 9.0 mass %, the coating solution hardly permeated the substrate, whereby adhesin between the substrate and the coating solution lowered, cutting was difficult, and fluff remained on the edge surfaces. Further, it was found that a high linear pressure had to be applied at the time of controlling the thickness of the substrate to a predetermined value by heat calender, thereby making it difficult to reduce the thickness of the substrate. As a result, internal resistance deteriorated. Since the number of thick stem fibers increased, bonding between fibers became loose, thereby deteriorating strength characteristic.

In <<Example 5>> and <<Example 6>>, the following physical properties of substrates for lithium ion battery separators and lithium ion battery separators were measured and evaluated.

<Basis Weight of Substrate and Coating Weight of Inorganic Particle Layer>

The basis weights of the substrates and the separators were measured in accordance with JIS P8124. The coating weight of the inorganic particle layer was calculated by subtracting the basis weight of the substrate from the basis weight of the separator.

<Thicknesses of Substrate and Separator>

The thicknesses of the substrate and the separator were measured under a load of 5 N by using an external micrometer specified in JIS B7502.

[Evaluation of Pinhole]

Each A4-sized separator was checked visually for the state of a pinhole by using transmitted light and evaluated based on the following criteria.

○: no pinhole is seen
Δ: transmitted light is partially seen slightly
X: many transmitted light is seen obviously

[Evaluation of Strength of Inorganic Particle Layer]

A test piece measuring 100 mm in a width direction×200 m in a flow direction was cut out from each separator, folded at a position 100 mm in the flow direction and bent at 180°. Thereafter, it was unfolded to return to the original state three times, and a crack in the inorganic particle layer was checked visually and evaluated based on the following criteria. In <<Example 5>>, the test piece was bent in such a manner that the substrate surface was located on the inner side and the inorganic particle layer surface was located on the outer side. In <<Example 6>>, the test piece was bent in such a manner that the inorganic particle layer A was located on the inner side and the inorganic particle layer B was located on the outer side.

○: damage to fold of inorganic particle layer is not seen
X: a large number of cracks are seen in fold of inorganic particle layer

[Cuttability of Separator]

Each separator was slit into 8 rolls measuring 50 mm in a width direction×200 m in a flow direction to check the both edge surfaces visually and evaluated based on the following criteria.

○: no fluff is seen on both edge surfaces
X: fluff is seen on both edge surfaces

[Heat Resistance of Separator]

A test piece measuring 100 mm in a width direction×100 mm in a flow direction was cut out from each separator and left to stand in a 200° C. constant-temperature drier for 1 hour to measure the length of a central part in the flow direction. The length was compared with the length before the test to obtain the percentage of a reduction in length as thermal shrinkage and evaluate heat resistance based on the following criteria.

○: thermal shrinkage is less than 1.0%
X: thermal shrinkage is not less than 1.0%

[Manufacture of Battery for Evaluation]

Each separator was used to manufacture a battery for evaluation having a design capacity of 30 mAh by using a three-element cathode material ($LiNi_{0.5}Co_{0.2}Mn_{0.3}O_2$) as a cathode, graphite as an anode and a 1 mol/L ethylene carbonate (EC)/diethyl carbonate (DEC)/dimethyl carbonate (DMC) (volume ratio of 1/1/1) mixed solvent solution of lithium hexafluorophosphate ($LiPF_6$) as an electrolytic solution. In <<Example 5>>, the inorganic particle layer surface was opposed to the anode. In <<Example 6>>, the inorganic particle layer B was opposed to the anode.

[Evaluation of Internal Resistance]

After three cycles of shake-down charging/discharging, each consisting of "30 mA constant current charging, 4.2 V constant voltage charging (1 hour), 30 mA constant current discharging and next cycle when the voltage became 2.7 V", were carried out for each battery, "30 mA constant current charging, 4.2V constant voltage charging (1 hour), 30 minutes of 6 mA constant current discharging (discharge amount of 3 mAh), the measurement of voltage (voltage "a") right before the end of discharging, 30 mA constant current charging, 4.2 V constant voltage charging (1 hour), 72 seconds of 150 mA constant current discharging (discharge amount of 3 mAh), and the measurement of voltage (voltage "b") right before the end of discharging" were carried out to obtain internal resistance from the expression "internal resistance Ω=(voltage "a"–voltage "b")/(150 mA–6 mA)".

○: internal resistance of less than 2.8 Ω
Δ: internal resistance of not less than 2.8Ω to less than 3.5Ω
X: internal resistance of not less than 3.5Ω

Example 5

<Preparation of Coating Solution a1>

100 parts of magnesium hydroxide having an average particle diameter of 2.0 μm was dispersed in 150 parts by mass of water. Then, 75 parts by mass of a 2 mass % aqueous solution of a carboxymethyl cellulose sodium salt having a viscosity a 25° C. of a 1 mass % aqueous solution thereof of 200 mPa·s was added to and mixed with the dispersion under agitation. Subsequently, 10 parts by mass of a carboxy modified styrene-butadiene copolymer resin emulsion having a glass transition point of –18° C. and an average particle diameter of 0.2 μm (solid concentration of 50 mass %) was added to and mixed with the resulting mixture under agitation. Finally, conditioned water was added to a solid concentration of 25 mass % to prepare a coating solution a1.

<Preparation of Coating Solution a2>

A coating solution a2 was prepared in the same manner as the preparation of the coating solution a1 except that magnesium hydroxide having an average particle diameter of 3.0 μm was used in place of magnesium hydroxide having an average particle diameter of 2.0 μm.

<Preparation of Coating Solution a3>

A coating solution a3 was prepared in the same manner as the preparation of the coating solution a1 except that magnesium hydroxide having an average particle diameter of 4.0 μm was used in place of magnesium hydroxide having an average particle diameter of 2.0 μm.

<Preparation of Coating Solution b1>

100 parts of magnesium hydroxide having an average particle diameter of 0.5 μm was dispersed in 150 parts by mass of water. Then, 75 parts by mass of a 2 mass % aqueous solution of a carboxymethyl cellulose sodium salt having a viscosity at 25° C. of a 1 mass % aqueous solution thereof of 200 mPa's was added to and mixed with the dispersion under agitation. Subsequently, 10 parts by mass of a carboxy modified styrene-butadiene copolymer resin emulsion having a glass transition point of −18° C. and an average particle diameter of 0.2 μm (solid concentration of 50 mass %) was added to and mixed with the resulting mixture under agitation. Finally, conditioned water was added to a solid concentration of 25 mass % to prepare a coating solution b1.

<Preparation of Coating Solution b2>

A coating solution b2 was prepared in the same manner as the preparation of the coating solution b1 except that magnesium hydroxide having an average particle diameter of 1.0 μm was used in place of magnesium hydroxide having an average particle diameter of 0.5 μm.

<Preparation of Coating Solution b3>

A coating solution b3 was prepared in the same manner as the preparation of the coating solution b1 except that magnesium hydroxide having an average particle diameter of 1.5 μm was used in place of magnesium hydroxide having an average particle diameter of 0.5 μm.

<Lithium Ion Battery Separator>

Example 5-1

After the coating solution a2 was applied to the substrate 1-1 to a coating weight of 5.0 g/m² with a kiss reverse gravure coater and dried to form an inorganic particle layer A, the coating solution b2 was applied to the same coating surface to a coating weight of 10.0 g/m² with a kiss reverse gravure coater and dried to form an inorganic particle layer B, thereby obtaining the separator of Example 5-1.

Example 5-2

After the coating solution a2 was applied to the substrate 1-2 to a coating weight of 6.5 g/m² with a kiss reverse gravure coater and dried to form an inorganic particle layer A, the coating solution b2 was applied to the same coating surface to a coating weight of 7.5 g/m² with a kiss reverse gravure coater and dried to form an inorganic particle layer B, thereby obtaining the separator of Example 5-2.

Example 5-3

After the coating solution a1 was applied to the substrate 1-4 to a coating weight of 3.0 g/m² with a kiss reverse gravure coater and dried to form an inorganic particle layer A, the coating solution b1 was applied to the same coating surface to a coating weight of 3.5 g/m² with a kiss reverse gravure coater and dried to form an inorganic particle layer B, thereby obtaining the separator of Example 5-3.

Example 5-4

After the coating solution a2 was applied to the substrate 1-3 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Example 5-4.

Example 5-5

After the coating solution a1 was applied to the substrate 1-14 to a coating weight of 2.0 g/m² with a kiss reverse gravure coater and dried to form an inorganic particle layer A, the coating solution b1 was applied to the same coating surface to a coating weight of 2.5 g/m² with a kiss reverse gravure coater and dried to form an inorganic particle layer B, thereby obtaining the separator of Example 5-5.

Example 5-6

After the coating solution a3 was applied to the substrate 1-15 to a coating weight of 10.0 g/m² with a kiss reverse gravure coater and dried to form an inorganic particle layer A, the coating solution b3 was applied to the same coating surface to a coating weight of 10.0 g/m⁷ with a kiss reverse gravure coater and dried to form an inorganic particle layer B, thereby obtaining the separator of Example 5-6.

Example 5-7

After the coating solution a2 was applied to the substrate 1-11 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Example 5-7.

Example 5-8

After the coating solution a2 was applied to the substrate 1-1 to a coating weight of 10.0 g/m² with a kiss reverse gravure coater and dried to form an inorganic particle layer A, the coating solution b2 was applied to the same coating surface to a coating weight of 5.0 g/m² with a kiss reverse gravure coater and dried to form an inorganic particle layer B, thereby obtaining the separator of Example 5-8.

Example 5-9

After the coating solution a2 was applied to the substrate 1-1 to a coating weight of 7.5 g/m² with a kiss reverse gravure coater and dried to form an inorganic particle layer A, the coating solution b2 was applied to the same coating surface to a coating weight of 7.5 g/m² with a kiss reverse gravure coater and dried to form an inorganic particle layer B, thereby obtaining the separator of Example 5-9.

Comparative Example 5-1

After the coating solution a2 was applied to the substrate 1-5 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Comparative Example 5-1.

Comparative Example 5-2

After the coating solution a2 was applied to the substrate 1-6 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Comparative Example 5-2.

Comparative Example 5-3

After the coating solution a2 was applied to the substrate 1-7 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Comparative Example 5-3.

Comparative Example 5-4

After the coating solution a2 was applied to the substrate 1-8 to a coating weight of 5.0 g/m² with a kiss reverse gravure coater and dried to form an inorganic particle layer A, the coating solution b2 was applied to the same coating surface to a coating weight of 6.0 g/m² with a kiss reverse gravure coater and dried to form an inorganic particle layer B, thereby obtaining the separator of Comparative Example 5-4.

TABLE 11

| | | | Ex. 5-1 Sub. 1-1 | Ex. 5-2 Sub. 1-2 | Ex. 5-3 Sub. 1-4 | Ex. 5-4 Sub. 1-3 | Ex. 5-5 Sub. 1-14 |
|---|---|---|---|---|---|---|---|
| Fiber blending | oriented crystallized PET-based synthetic resin short fibers 0.06 dtex × 3 mm | pbm | 55.5 | 59.0 | 55.5 | 55.5 | 57.0 |
| | Undrawn PET-based synthetic resin short fibers 0.2 dtex × 3 mm | pbm | 40.0 | 40.0 | 40.0 | 40.0 | 40.0 |
| | Fibrillated heat-resistant fibers | pbm | 4.5 | 1.0 | 4.5 | 4.5 | 3.0 |
| | Beaten melt spun cellulose fibers | pbm | 0.0 | 0.0 | 0.0 | 0.0 | 0.0 |
| Fibrillated heat-resistant fibers | Modified freeness | ml | 50 | 50 | 250 | 50 | 50 |
| | Mass-weighted average fiber length | mm | 0.58 | 0.58 | 0.82 | 0.58 | 0.58 |
| | Length-weighted average fiber length | mm | 0.33 | 0.33 | 0.45 | 0.33 | 0.33 |
| | Fiber width | μm | 15.5 | 15.5 | 19.5 | 15.5 | 15.5 |
| Linear pressure of heat calender | | kN/m | 100 | 100 | 100 | 100 | 100 |
| Physical properties | Basis weight of substrate | g/m² | 10 | 10 | 8 | 8 | 7 |
| | Thickness of substrate | μm | 15 | 15 | 11 | 11 | 10 |
| | Coating weight of inorganic particle layer A | g/m² | 5.0 | 6.5 | 3.0 | 5.0 | 2.0 |
| | Coating weight of inorganic particle layer B | g/m² | 10.0 | 7.5 | 3.5 | 6.0 | 2.5 |
| | Thickness of separator | μm | 26 | 26 | 16 | 20 | 13 |
| Evaluation | pinhole | — | ○ | ○ | ○ | ○ | Δ |
| | strength of inorganic particle layer | — | ○ | ○ | ○ | ○ | ○ |
| | Cuttability of separator | — | ○ | ○ | ○ | ○ | ○ |
| | heat resistance | — | ○ | ○ | ○ | ○ | ○ |
| | Internal resistance | — | ○ | ○ | ○ | ○ | ○ |
| | | | Ex. 5-6 Sub. 1-15 | Ex. 5-7 Sub. 1-11 | Ex. 5-8 Sub. 1-1 | Ex. 5-9 Sub. 1-1 | |
| Fiber blending | oriented crystallized PET-based synthetic resin short fibers 0.06 dtex × 3 mm | pbm | 56.0 | 50.0 | 55.5 | 55.5 | |
| | Undrawn PET-based synthetic resin short fibers 0.2 dtex × 3 mm | pbm | 40.0 | 40.0 | 40.0 | 40.0 | |
| | Fibrillated heat-resistant fibers | pbm | 4.0 | 4.5 | 4.5 | 4.5 | |
| | Beaten melt spun cellulose fibers | pbm | 0.0 | 5.5 | 0.0 | 0.0 | |

TABLE 11-continued

Table 5

|  |  |  |  |  |  |  |
|---|---|---|---|---|---|---|
| Fibrillated heat-resistant fibers | Modified freeness | ml | 50 | 50 | 50 | 50 |
|  | Mass-weighted average fiber length | mm | 0.58 | 0.58 | 0.58 | 0.58 |
|  | Length-weighted average fiber length | mm | 0.33 | 0.33 | 0.33 | 0.33 |
|  | Fiber width | μm | 15.5 | 15.5 | 15.5 | 15.5 |
| Linear pressure of heat calender |  | kN/m | 100 | 100 | 100 | 100 |
| Physical properties | Basis weight of substrate | g/m² | 12 | 8 | 10 | 10 |
|  | Thickness of substrate | μm | 18 | 11 | 15 | 15 |
|  | Coating weight of inorganic particle layer A | g/m² | 10.0 | 5.0 | 10.0 | 7.5 |
|  | Coating weight of inorganic particle layer B | g/m² | 10.0 | 6.0 | 5.0 | 7.5 |
|  | Thickness of separator | μm | 35 | 20 | 28 | 27 |
| Evaluation | pinhole | — | ○ | ○ | ○ | ○ |
|  | strength of inorganic particle layer | — | ○ | ○ | ○ | ○ |
|  | Cuttability of separator | — | ○ | ○ | ○ | ○ |
|  | heat resistance | — | ○ | ○ | ○ | ○ |
|  | Internal resistance | — | Δ | ○ | ○ | ○ |

|  |  |  | C. Ex. 5-1 Sub. 1-5 | C. Ex. 5-2 Sub. 1-6 | C. Ex. 5-3 Sub. 1-7 | C. Ex. 5-4 Sub. 1-8 |
|---|---|---|---|---|---|---|
| Fiber blending | oriented crystallized PET-based synthetic resin short fibers 0.06 dtex × 3 mm | pbm | 60.0 | 55.0 | 50.0 | 55.5 |
|  | Undrawn PET-based synthetic resin short fibers 0.2 dtex × 3 mm | pbm | 40.0 | 40.0 | 40.0 | 40.0 |
|  | Fibrillated heat-resistant fibers | pbm | 0.0 | 5.0 | 10.0 | 4.5 |
|  | Beaten melt spun cellulose fibers | pbm | 0.0 | 0.0 | 0.0 | 0.0 |
| Fibrillated heat-resistant fibers | Modified freeness | ml | — | 50 | 50 | 320 |
|  | Mass-weighted average fiber length | mm | — | 0.58 | 0.58 | 1.30 |
|  | Length-weighted average fiber length | mm | — | 0.33 | 0.33 | 0.59 |
|  | Fiber width | μm | — | 15.5 | 15.5 | 25.2 |
| Linear pressure of heat calender |  | kN/m | 100 | 120 | 175 | 100 |
| Physical properties | Basis weight of substrate | g/m² | 8 | 8 | 8 | 8 |
|  | Thickness of substrate | μm | 11 | 11 | 11 | 11 |
|  | Coating weight of inorganic particle layer A | g/m² | 5.0 | 5.0 | 5.0 | 5.0 |
|  | Coating weight of inorganic particle layer B | g/m² | 6.0 | 6.0 | 6.0 | 6.0 |
|  | Thickness of separator | μm | 20 | 20 | 20 | 20 |
| Evaluation | pinhole | — | ○ | ○ | ○ | ○ |
|  | strength of inorganic particle layer | — | ○ | ○ | ○ | ○ |

TABLE 11-continued

| Table 5 | | | | | |
|---|---|---|---|---|---|
| Cuttability of separator | — | ○ | X | X | X |
| heat resistance | — | X | ○ | ○ | ○ |
| Internal resistance | — | ○ | X | X | ○ |

Ex.: Example
C. Ex.: Comparative Example
Sub.: Substrate
pbm: part by mass

Since the separators manufactured in Examples 5-1 to 5-9 contained the fibrillated heat-resistant fibers (I) and the synthetic resin short fibers and had such constitution that the inorganic particle layer A containing magnesium hydroxide having an average particle diameter of 2.0 to 4.0 μm and the inorganic particle layer B containing magnesium hydroxide having an average particle diameter of not less than 0.5 μm to less than 2.0 μm were formed on one side of the substrate having a content of the fibrillated heat-resistant fibers (I) of not less than 1.0 mass % to less than 5.0 mass % based on the total of all the fiber component contained in the substrate in the mentioned order, they were excellent in pinhole, the strength of the inorganic particle layers, cuttability, heat resistance and internal resistance.

Meanwhile, since the separator manufactured in Comparative Example 5-1 did not contain the fibrillated heat-resistant fibers (I), it was inferior in heat resistance.

Since the separators manufactured in Comparative Examples 5-2 and 5-3 had a content of the fibrillated heat-resistant fibers (I) of not less than 5.0 mass %, they were inferior in cuttability and internal resistance.

Since the separator manufactured in Comparative Example 5-4 did not contain the fibrillated heat-resistant fibers (t) but contained only the fibrillated heat-resistant fibers (TI), it was inferior in cuttability.

Since the separator manufactured in Example 5-5 had rather low coating weights of the inorganic particle layer A and the inorganic particle layer B, as compared with the separators of Examples 5-1 to 5-4 and Examples 5-6 to 5-9, transmitted light was partially seen slightly in the evaluation of a pinhole but there was no problem with actual use.

Since the separator manufactured in Example 5-6 had rather high coating weights of the inorganic particle layer A and the inorganic particle B, as compared with the separators of Examples 5-1 to 5-5 and Examples 5-7 to 5-9, internal resistance was slightly high but there was no problem with actual use.

The separators manufactured in Example 5-1, Example 5-8 and Example 5-9 had the same total coating weight of the inorganic particle layer A and the inorganic particle layer B but differed in the ratio of the coating weight of the inorganic particle layer A to the coating weight of the inorganic particle layer B. Since the average particle diameter of magnesium hydroxide contained in the inorganic particle layer A is larger than the average particle diameter of magnesium hydroxide contained in the inorganic particle layer B, the inorganic particle layer A becomes thicker than the inorganic particle layer B in the case of the same coating weight. Therefore, as for the thickness of the separator, the separator of Example 5-1 in which the coating weight of the inorganic particle layer A was lower than the coating weight of the inorganic particle layer B was thinner than the separator of Example 5-9 in which the coating weight of the inorganic particle layer A and the coating weight of the inorganic particle layer B were the same, and the separator of the Example 5-9 was thinner than the separator of Example 5-8 in which the coating weight of the inorganic particle layer A was higher than the coating weight of the inorganic particle layer B.

Example 6

<Lithium Ion Battery Separator>

Example 6-1

After the coating solution a2 was applied to the substrate 1-1 to a coating weight of 5.0 g/m² with a kiss reverse gravure coater and dried to form an inorganic particle layer A, the coating solution b2 was applied to the other side of the substrate 1-1 to a coating weight of 10.0 g/m² with a kiss reverse gravure coater and dried to form an inorganic particle layer B, thereby obtaining the separator of Example 6-1.

Example 6-2

After the coating solution a2 was applied to the substrate 1-2 to a coating weight of 6.5 g/m² with a kiss reverse gravure coater and dried to form an inorganic particle layer A, the coating solution b2 was applied to the other side of the substrate 1-2 to a coating weight of 7.5 g/m² with a kiss reverse gravure coater and dried to form an inorganic particle layer B, thereby obtaining the separator of Example 6-2.

Example 6-3

After the coating solution a1 was applied to the substrate 1-4 to a coating weight of 3.0 g/m² with a kiss reverse gravure coater and dried to form an inorganic particle layer A, the coating solution b1 was applied to the other side of the substrate 1-4 to a coating weight of 3.5 g/m² with a kiss reverse gravure coater and dried to form an inorganic particle layer B, thereby obtaining the separator of Example 6-3.

Example 6-4

After the coating solution a2 was applied to the substrate 1-3 to a coating weight of 5.0 g/m² with a kiss reverse gravure coater and dried to form an inorganic particle layer A, the coating solution b2 was applied to the other side of the substrate 1-3 to a coating weight of 6.0 g/m² with a kiss reverse gravure coater and dried to form an inorganic particle layer B, thereby obtaining the separator of Example 6-4.

Example 6-5

After the coating solution a1 was applied to the substrate 1-14 to a coating weight of 2.0 g/m² with a kiss reverse gravure coater and dried to form an inorganic particle layer A, the coating solution b1 was applied to the other side of the substrate 1-14 to a coating weight of 2.5 g/m² with a kiss reverse gravure coater and dried to form an inorganic particle layer B, thereby obtaining the separator of Example 6-5.

Example 6-6

After the coating solution a3 was applied to the substrate 1-15 to a coating weight of 10.0 g/m² with a kiss reverse gravure coater and dried to form an inorganic particle layer A, the coating solution b3 was applied to the other side of the substrate 1-15 to coating weight of 10.0 g/m² with a kiss reverse gravure coater and dried to form an inorganic particle layer B, thereby obtaining the separator of Example 6-6.

Example 6-7

After the coating solution a2 was applied to the substrate 1-11 to a coating weight to 5.0 g/m² with a kiss reverse gravure coater and dried to form an inorganic particle layer A, the coating solution b2 was applied to the other side of the substrate 1-11 to a coating weight of 6.0 g/m² with a kiss reverse gravure coater and dried to form an inorganic particle layer B, thereby obtaining the separator of Example 6-7.

Example 6-8

After the coating solution a2 was applied to the substrate 1-1 to a coating weight of 10.0 g/m² with a kiss reverse gravure coater and dried to form an inorganic particle layer A, the coating solution b2 was applied to the other side of the substrate 1-1 to a coating weight of 5.0 g/m² with a kiss reverse gravure coater and dried to form an inorganic particle layer B, thereby obtaining the separator of Example 6-8.

Example 6-9

After the coating solution a2 was applied to the substrate 1-1 to a coating weight of 7.5 g/m² with a kiss reverse gravure coater and dried to form an inorganic particle layer A, the coating solution b2 was applied to the other side of the substrate 1-1 to a coating weight of 7.5 g/m² with a kiss reverse gravure coater and dried to form an inorganic particle layer B, thereby obtaining the separator of Example 6-9.

Comparative Example 6-1

After the coating solution a2 was applied to the substrate 1-5 to a coating weight of 5.0 g/m² with a kiss reverse gravure coater and dried to form an inorganic particle layer A, the coating solution b2 was applied to the other side of the substrate 1-5 to a coating weight of 6.0 g/m² with a kiss reverse gravure coater and dried to form an inorganic particle layer B, thereby obtaining the separator of Comparative Example 6-1.

Comparative Example 6-2

After the coating solution a2 was applied to the substrate 1-6 to a coating weight of 5.0 g/m² with a kiss reverse gravure coater and dried to form an inorganic particle layer A, the coating solution b2 was applied to the other side of the substrate 1-6 to a coating weight of 6.0 g/m² with a kiss reverse gravure coater and dried to form an inorganic particle layer B, thereby obtaining the separator of Comparative Example 6-2.

Comparative Example 6-3

After the coating solution a2 was applied to the substrate 1-7 to a coating weight of 5.0 g/m² with a kiss reverse gravure coater and dried to form an inorganic particle layer A, the coating solution b2 was applied to the other side of the substrate 1-7 to a coating weight of 6.0 g/m² with a kiss reverse gravure coater and dried to form an inorganic particle layer 3, thereby obtaining the separator of Comparative Example 6-3.

Comparative Example 6-4

After the coating solution a2 was applied to the substrate 1-8 to a coating weight of 5.0 g/m² with a kiss reverse gravure coater and dried to form an inorganic particle layer A, the coating solution b2 was applied to the other side of the substrate 1-8 to a coating weight of 6.0 g/m² with a kiss reverse gravure coater and dried to form an inorganic particle layer B, thereby obtaining the separator of Comparative Example 6-4.

TABLE 12

Table 6

| | | | Ex. 6-1 Sub. 1-1 | Ex. 6-2 Sub. 1-2 | Ex. 6-3 Sub. 1-4 | Ex. 6-4 Sub. 1-3 | Ex. 6-5 Sub. 1-14 |
|---|---|---|---|---|---|---|---|
| Fiber blending | oriented crystallized PET-based synthetic resin short fibers 0.06 dtex × 3 mm | pbm | 55.5 | 59.0 | 55.5 | 55.5 | 57.0 |
| | Undrawn PET-based synthetic resin short fibers 0.2 dtex × 3 mm | pbm | 40.0 | 40.0 | 40.0 | 40.0 | 40.0 |
| | Fibrillated heat-resistant fibers | pbm | 4.5 | 1.0 | 4.5 | 4.5 | 3.0 |
| | Beaten melt spun cellulose fibers | pbm | 0.0 | 0.0 | 0.0 | 0.0 | 0.0 |

TABLE 12-continued

Table 6

| | | | | | | | |
|---|---|---|---|---|---|---|---|
| Fibrillated heat-resistant fibers | Modified freeness | ml | 50 | 50 | 250 | 50 | 50 |
| | Mass-weighted average fiber length | mm | 0.58 | 0.58 | 0.82 | 0.58 | 0.58 |
| | Length-weighted average fiber length | mm | 0.33 | 0.33 | 0.45 | 0.33 | 0.33 |
| | Fiber width | μm | 15.5 | 15.5 | 19.5 | 15.5 | 15.5 |
| Linear pressure of heat calender | | kN/m | 100 | 100 | 100 | 100 | 100 |
| Physical properties | Basis weight of substrate | g/m² | 10 | 10 | 8 | 8 | 7 |
| | Thickness of substrate | μm | 15 | 15 | 11 | 11 | 10 |
| | Coating weight of inorganic particle layer A | g/m² | 5.0 | 6.5 | 3.0 | 5.0 | 2.0 |
| | Coating weight of inorganic particle layer B | g/m² | 10.0 | 7.5 | 3.5 | 6.0 | 2.5 |
| | Thickness of separator | μm | 25 | 25 | 15 | 19 | 13 |
| Evaluation | pinhole | — | ○ | ○ | ○ | ○ | Δ |
| | strength of inorganic particle layer | — | ○ | ○ | ○ | ○ | ○ |
| | Cuttability of separator | — | ○ | ○ | ○ | ○ | ○ |
| | heat resistance | — | ○ | ○ | ○ | ○ | ○ |
| | Internal resistance | — | ○ | ○ | ○ | ○ | ○ |

| | | | Ex. 6-6 Sub. 1-15 | Ex. 6-7 Sub. 1-11 | Ex. 6-8 Sub. 1-1 | Ex. 6-9 Sub. 1-1 |
|---|---|---|---|---|---|---|
| Fiber blending | oriented crystallized PET-based synthetic resin short fibers 0.06 dtex × 3 mm | pbm | 56.0 | 50.0 | 55.5 | 55.5 |
| | Undrawn PET-based synthetic resin short fibers 0.2 dtex × 3 mm | pbm | 40.0 | 40.0 | 40.0 | 40.0 |
| | Fibrillated heat-resistant fibers | pbm | 4.0 | 4.5 | 4.5 | 4.5 |
| | Beaten melt spun cellulose fibers | pbm | 0.0 | 5.5 | 0.0 | 0.0 |
| Fibrillated heat-resistant fibers | Modified freeness | ml | 50 | 50 | 50 | 50 |
| | Mass-weighted average fiber length | mm | 0.58 | 0.58 | 0.58 | 0.58 |
| | Length-weighted average fiber length | mm | 0.33 | 0.33 | 0.33 | 0.33 |
| | Fiber width | μm | 15.5 | 15.5 | 15.5 | 15.5 |
| Linear pressure of heat calender | | kN/m | 100 | 100 | 100 | 100 |
| Physical properties | Basis weight of substrate | g/m² | 12 | 8 | 10 | 10 |
| | Thickness of substrate | μm | 18 | 11 | 15 | 15 |
| | Coating weight of inorganic particle layer A | g/m² | 10.0 | 5.0 | 10.0 | 7.5 |
| | Coating weight of inorganic particle layer B | g/m² | 10.0 | 6.0 | 5.0 | 7.5 |
| | Thickness of separator | μm | 35 | 19 | 27 | 26 |
| Evaluation | pinhole | — | ○ | ○ | ○ | ○ |
| | strength of inorganic particle layer | — | ○ | ○ | ○ | ○ |
| | Cuttability of separator | — | ○ | ○ | ○ | ○ |
| | heat resistance | — | ○ | ○ | ○ | ○ |
| | Internal resistance | — | Δ | ○ | ○ | ○ |

TABLE 12-continued

Table 6

|  |  |  | C. Ex. 6-1 Sub. 1-5 | C. Ex. 6-2 Sub. 1-6 | C. Ex. 6-3 Sub. 1-7 | C. Ex. 6-4 Sub. 1-8 |
|---|---|---|---|---|---|---|
| Fiber blending | oriented crystallized PET-based synthetic resin short fibers 0.06 dtex × 3 mm | pbm | 60.0 | 55.0 | 50.0 | 55.5 |
|  | Undrawn PET-based synthetic resin short fibers 0.2 dtex × 3 mm | pbm | 40.0 | 40.0 | 40.0 | 40.0 |
|  | Fibrillated heat-resistant fibers | Pbm | 0.0 | 5.0 | 10.0 | 4.5 |
|  | Beaten melt spun cellulose fibers | pbm | 0.0 | 0.0 | 0.0 | 0.0 |
| Fibrillated heat-resistant fibers | Modified freeness | ml | — | 50 | 50 | 320 |
|  | Mass-weighted average fiber length | mm | — | 0.58 | 0.58 | 1.30 |
|  | Length-weighted average fiber length | mm | — | 0.33 | 0.33 | 0.59 |
|  | Fiber width | μm | — | 15.5 | 15.5 | 25.2 |
| Linear pressure of heat calender |  | kN/m | 100 | 120 | 175 | 100 |
| Physical properties | Basis weight of substrate | g/m² | 8 | 8 | 8 | 8 |
|  | Thickness of substrate | μm | 11 | 11 | 11 | 11 |
|  | Coating weight of inorganic particle layer A | g/m² | 5.0 | 5.0 | 5.0 | 5.0 |
|  | Coating weight of inorganic particle layer B | g/m² | 6.0 | 6.0 | 6.0 | 6.0 |
|  | Thickness of separator | μm | 19 | 19 | 19 | 19 |
| Evaluation | pinhole | — | ○ | ○ | ○ | ○ |
|  | strength of inorganic particle layer | — | ○ | ○ | ○ | ○ |
|  | Cuttability of separator | — | ○ | X | X | X |
|  | heat resistance | — | X | ○ | ○ | ○ |
|  | Internal resistance | — | ○ | X | X | ○ |

Ex.: Example
C. Ex.: Comparative Example
Sub.: Substrate
pbm: part by mass

The separators manufactured in Examples 6-1 to 6-9 had the substrate which contained the fibrillated heat-resistant fibers (I) and the synthetic resin short fibers and had a content of the fibrillated heat-resistant fibers (I) of not less than 1.0 mass % to less than 5 mass % based on the total of all the fiber components contained in the substrate, the inorganic particle layer A containing magnesium hydroxide having an average particle diameter of 2.0 to 4.0 μm on one side of the substrate and the inorganic particle layer B containing magnesium hydroxide having an average particle diameter of not less than 0.5 μm to less than 2.0 μm on the other side. Therefore, they were excellent in pinhole, the strength of inorganic particle layers, cuttability, heat resistance and internal resistance.

Meanwhile, since the separator manufactured in Comparative Example 6-1 did not contain the fibrillated heat-resistant fibers (I), it was inferior in heat resistance.

Since the separators manufactured in Comparative Examples 6-2 and 6-3 had a content of the fibrillated heat-resistant fibers (I) of not less than 5.0 mass %, they were inferior in cuttability and internal resistance.

Since the separator manufactured in Comparative Example 6-4 did not contain the fibrillated heat-resistant fibers (I) but contained only the fibrillated heat-resistant fibers (II), it was inferior in cuttability.

Since the separator manufactured in Example 6-5 had rather low coating weights of the inorganic particle A and the inorganic particle B, as compared with the separators of Examples 6-1 to 6-4 and Examples 6-6 to 6-9, transmitted light was partially seen slightly in the evaluation of a pinhole but there was no problem with actual use.

Since the separator manufactured in Example 6-6 had rather high coating weights of the inorganic particle layer A and the inorganic particle layer B, as compared with the separators of Examples 6-1 to 6-5 and Examples 6-7 to 6-9, internal resistance was a little higher but there was no problem with actual use.

The separators manufactured in Example 6-1, Example 6-8 and Example 6-9 had the same total coating weight of the inorganic particle layer A and the inorganic particle layer B but differed in the ratio of the coating weight of the inorganic particle layer A to the coating weight of the inorganic particle layer B. Since the average particle diameter of magnesium hydroxide contained in the inorganic particle layer A is larger than the average particle diameter of magnesium hydroxide contained in the inorganic particle layer B, in the case of the same coating weight, the inorganic particle layer A becomes thicker than the inorganic particle layer B. As for the thickness of the separator, the separator of Example 6-1 in which the coating weight of the inorganic particle layer A was lower than the coating weight of the inorganic particle layer B was thinner than the separator of Example 6-9 in which the coating weight of the inorganic particle layer A and the coating weight of the inorganic particle layer B were the same, and the separator of Example 6-9 was thinner than the separator of Example 6-8 in which the coating weight of the inorganic particle layer A was higher than the coating weight of the inorganic particle layer B.

INDUSTRIAL FEASIBILITY

The substrate for lithium ion battery separators of the present invention and the lithium ion battery separator of the present invention can be advantageously used in lithium ion secondary batteries such as lithium ion secondary batteries and lithium ion polymer secondary batteries.

EXPLANATION OF REFERENCE NUMERALS 1 fibrillated heat-resistant fibers having a modified freeness of not more than 300 ml
2 fibrillated heat-resistant fibers having a modified freeness of more than 300 ml
3 fibrid
4 synthetic resin short fibers

The invention claimed is:

1. A substrate for lithium ion battery separators, comprising:
   heat-resistant fibers, and
   synthetic resin short fibers,
   wherein the heat-resistant fibers comprise
      fibrillated heat-resistant fibers, having a modified freeness of not more than 300 ml, and
   wherein the content of the fibrillated heat-resistant fibers is not less than 1.0 mass % to less than 5.0 mass % based on a total of all fiber components contained in the substrate,
   wherein the modified freeness is a value measured in accordance with JIS P8121-2:2012 except that an 80-mesh wire net having a wire diameter of 0.14 mm and an opening of 0.18 mm is used as a screening plate and the concentration of a sample is 0.1%, and
   wherein the synthetic resin short fibers are non-fibrillated and have a fiber length of 1 to 10 mm, and
   wherein the content of the synthetic resin short fibers is 90.0 to 99.0 mass % based on the total of all fiber components contained in the substrate.

2. The substrate for lithium ion battery separators according to claim 1, wherein the content of the synthetic resin short fibers is more than 95.0 mass % to not more than 99.0 mass % based on the total of all fiber components contained in the substrate.

3. A lithium ion battery separator which is a combination of at least one composite selected from the group consisting of an inorganic particle layer containing inorganic particles, organic particle layer containing organic particles, porous film, microfiber layer, solid electrolyte and gel-like electrolyte and the substrate for lithium ion battery separators according to claim 1.

* * * * *